(12) United States Patent
Umemoto et al.

(10) Patent No.: US 12,330,510 B2
(45) Date of Patent: Jun. 17, 2025

(54) CART

(71) Applicant: MAKITA CORPORATION, Anjo (JP)

(72) Inventors: Ryo Umemoto, Anjo (JP); Hirokatsu Yamamoto, Anjo (JP); Shingo Kaminokado, Anjo (JP)

(73) Assignee: MAKITA CORPORATION, Anjo (JP)

( * ) Notice: Subject to any disclaimer, the term of this patent is extended or adjusted under 35 U.S.C. 154(b) by 296 days.

(21) Appl. No.: 17/855,410

(22) Filed: Jun. 30, 2022

(65) Prior Publication Data

US 2023/0013915 A1     Jan. 19, 2023

(30) Foreign Application Priority Data

Jul. 15, 2021     (JP) ................................. 2021-117081

(51) Int. Cl.
*B60L 15/30*        (2006.01)
*B60L 3/00*        (2019.01)
*B62B 5/00*        (2006.01)

(52) U.S. Cl.
CPC ............ *B60L 15/30* (2013.01); *B60L 3/0015* (2013.01); *B62B 5/0033* (2013.01); *B62B 5/0076* (2013.01)

(58) Field of Classification Search
None
See application file for complete search history.

(56) References Cited

U.S. PATENT DOCUMENTS

| | | | |
|---|---|---|---|
| 6,327,219 B1 | 12/2001 | Zhang et al. | |
| 2019/0023265 A1* | 1/2019 | Takeda | B60W 10/18 |
| 2019/0299947 A1 | 10/2019 | Higashitani et al. | |
| 2020/0215955 A1* | 7/2020 | Aljallis | B60Q 1/04 |

(Continued)

FOREIGN PATENT DOCUMENTS

| | | |
|---|---|---|
| JP | H8-194537 A | 7/1996 |
| JP | 2000-181538 A | 6/2000 |
| JP | 2001-147716 A | 5/2001 |

(Continued)

OTHER PUBLICATIONS

Translation of JP-4912257 (Year: 2012).*
Mar. 4, 2025 Office Action issued in Japanese Patent Application No. 2021-117081.

*Primary Examiner* — Peter D Nolan
*Assistant Examiner* — Michael F Whalen
(74) *Attorney, Agent, or Firm* — Oliff PLC

(57) ABSTRACT

The cart may include: a driving wheel; a motor configured to rotate the driving wheel; a motor drive circuit configured to drive the motor; a control device configured to control the motor via the motor drive circuit so that a travelling speed of the cart becomes equal to or lower than an upper limit travelling speed; and an operation member arranged on the cart and configured to receive an operation by a user. The cart may be configured to operate in a manual mode where the motor is driven when the operation member is on and the motor is stopped when the operation member is off, and in an automatic mode were the motor is driven regardless of whether the operation member is on or off. The upper limit travelling speed in the automatic mode may be set lower than the upper limit travelling speed in the manual mode.

6 Claims, 43 Drawing Sheets

(56) References Cited

U.S. PATENT DOCUMENTS

2021/0137339 A1\* 5/2021 Knuth ................. A47L 11/4011
2021/0206416 A1\* 7/2021 Kim .................... G05D 1/0238

FOREIGN PATENT DOCUMENTS

| JP | 2003-038695 A | 2/2003 |
| --- | --- | --- |
| JP | 2007-221843 A | 8/2007 |
| JP | 4912257 B2 \* | 4/2012 |
| JP | 2019-171971 A | 10/2019 |

\* cited by examiner

FIG. 16
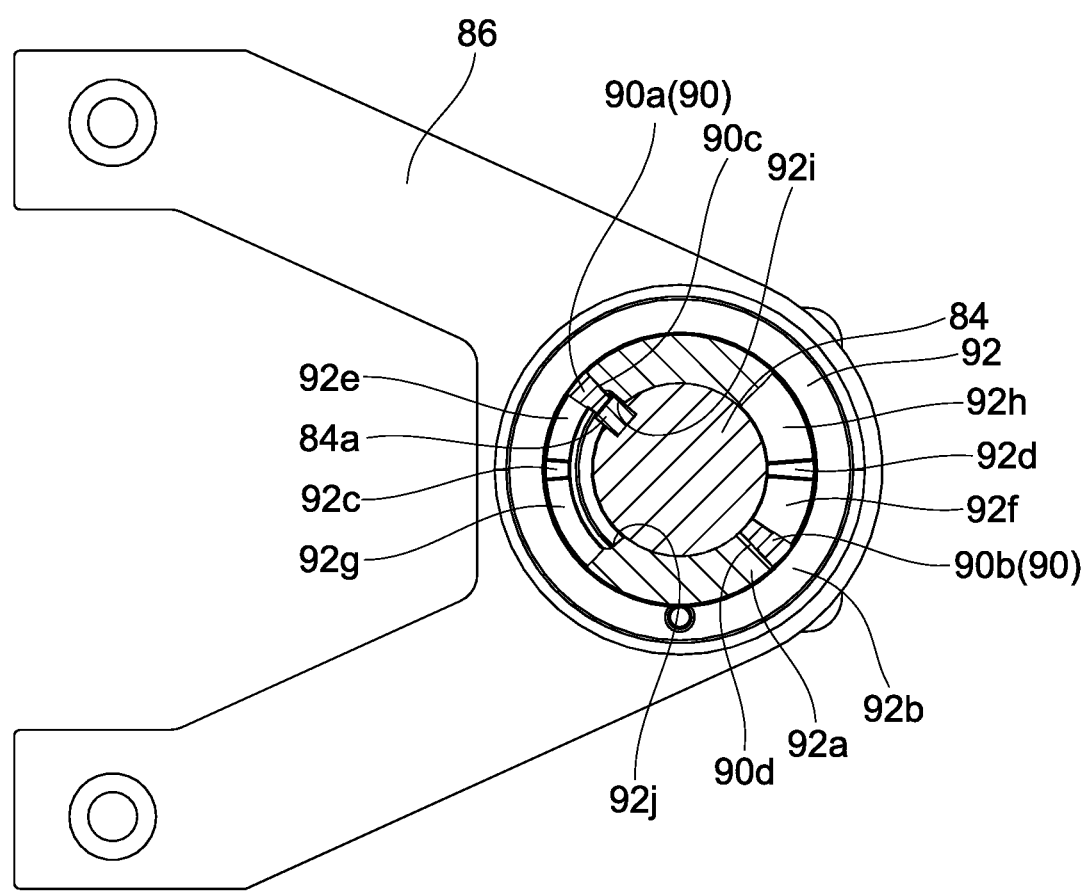
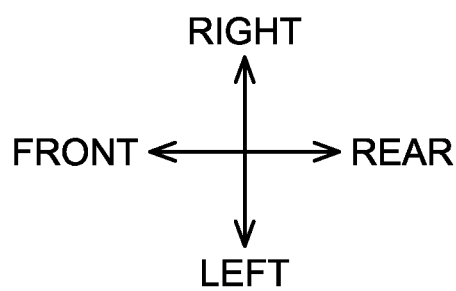

CART

CROSS-REFERENCE TO RELATED APPLICATION

This application claims priority to Japanese patent application No. 2021-117081, filed on Jul. 15, 2021, the entire contents of which are incorporated herein by reference.

TECHNICAL FIELD

The art disclosed in the description herein relates to a cart.

BACKGROUND

Japanese Patent Application Publication No. 2003-038695 describes a cart. This cart includes a driving wheel, a motor configured to rotate the driving wheel, a motor drive circuit configured to drive the motor, a control device configured to control the motor via the motor drive circuit so that a travelling speed of the cart becomes equal to or lower than an upper limit travelling speed, and an operation member arranged on the cart and configured to receive an operation by a user. The cart is configured to operate in a manual mode and an automatic mode. In the manual mode, the motor is driven when the operation member is on and the motor is stopped when the operation member is off, and in the automatic mode, the motor is driven regardless of whether the operation member is on or off.

SUMMARY

When the cart operates in the automatic mode, higher safety is required as compared to a case where the cart operates in the manual mode. The description herein provides an art configured to increase safety of a cart when the cart operates in an automatic mode.

The cart disclosed herein may comprise: a driving wheel; a motor configured to rotate the driving wheel; a motor drive circuit configured to drive the motor, a control device configured to control the motor via the motor drive circuit so that a travelling speed of the cart becomes equal to or lower than an upper limit travelling speed; and an operation member arranged on the cart and configured to receive an operation by a user. The cart may be configured to operate in a manual mode and an automatic mode, wherein in the manual mode, the motor is driven when the operation member is on, and the motor is stopped when the operation member is off, and in the automatic mode, the motor is driven regardless of whether the operation member is on or off. The upper limit travelling speed in the automatic mode may be set lower than the upper limit travelling speed in the manual mode.

According to the above configuration, since the upper limit travelling speed for a case where the cart operates in the automatic mode is set lower than the upper limit travelling speed for a case where the cart operates in the manual mode, safety for the cart in the case of operating in the automatic mode can be increased.

BRIEF DESCRIPTION OF DRAWINGS

FIG. 16 is a cross-sectional view seeing the lower part of the handle unit 8 of the embodiment in a cross section along the front-rear direction and the left-right direction in a state where an operation of steering rightward is performed on the handle unit 8.

DETAILED DESCRIPTION

Figure 1:
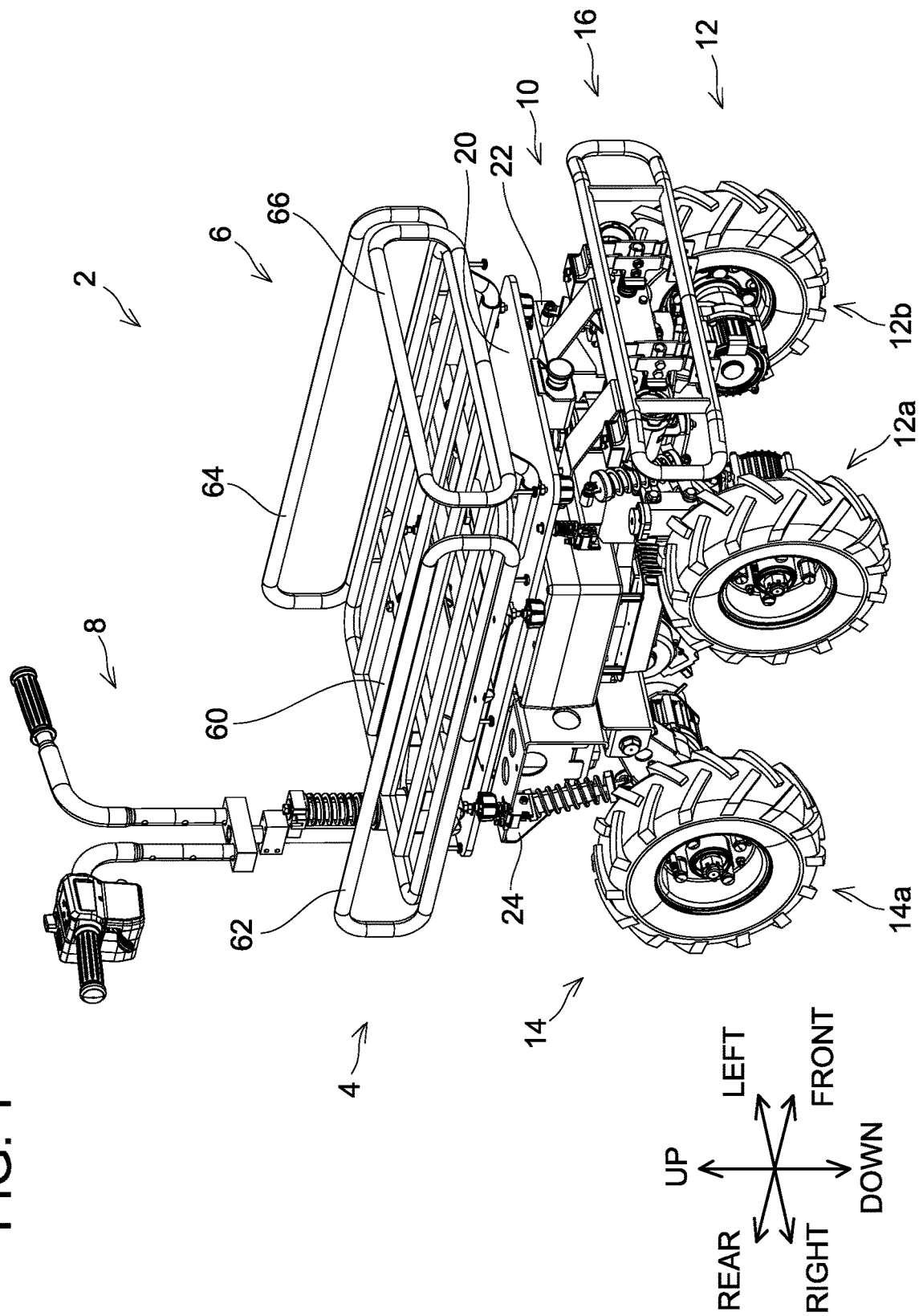
FIG. 1 is a perspective view seeing a cart 2 of an embodiment from front right upper side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved carts, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a cart nay comprise: a driving wheel; a motor configured to rotate the driving wheel; a motor drive circuit configured to drive the motor; a control device configured to control the motor via the motor drive circuit so that a travelling speed of the cart becomes equal to or lower than an upper limit travelling speed; and an operation member arranged on the cart and configured to receive an operation by a user. The cart may be configured to operate in a manual mode and an automatic mode, wherein in the manual mode, the motor is driven when the operation member is on, and the motor is stopped when the operation member is off, and in the automatic mode, the motor is driven regardless of whether the operation member is on or off. The upper limit travelling speed in the automatic mode may be set lower than the upper limit travelling speed in the manual mode.

According to the above configuration, since the upper limit travelling speed for the case where the cart operates in the automatic mode is set lower than the upper limit travelling speed for the case where the cart operates in the manual mode, the safety for the cart in the case of operating in the automatic mode can be increased.

In one or more embodiments, the cart may further comprise an overload detection sensor configured to detect an overload. In the automatic mode, when the overload is detected by the overload detection sensor, the cart may be prohibited from travelling. In the manual mode, even when the overload is detected by the overload detection sensor, the cart may be allowed to travel.

According to the above configuration, since the cart is allowed to travel even when the overload is detected in the manual mode, whereas in the automatic mode, the cart is prohibited from travelling when the overload is detected, the safety for the cart in the case of operating in the automatic mode can be increased.

In one or more embodiments, the cart may further comprise a collision detection sensor configured to detect frontal collision to the cart. In the automatic mode, when the frontal collision is detected by the collision detection sensor while the cart is moving backward, the cart may be prohibited from travelling. In the manual mode, even when the frontal collision is detected by the collision detection sensor while the cart is moving backward, the cart may be allowed to travel.

According to the above configuration, the cart is allowed to travel even when the frontal collision to the cart is detected while the cart is moving backward in the manual mode, whereas in the automatic mode, the cart is prohibited from travelling when the frontal collision to the cart is detected while the cart is moving backward. Thus, the safety for the cart in the case of operating in the automatic mode can be increased.

In one or more embodiments, the cart may further comprise a collision detection sensor configured to detect rear-end collision to the cart. In the automatic mode, when the rear-end collision is detected by the collision detection sensor while the cart is moving forward, the cart may be prohibited from travelling. In the manual mode, even when the rear-end collision is detected by the collision detection sensor while the cart is moving forward, the cart may be allowed to travel.

According to the above configuration the cart is allowed to travel even when the rear-end collision to the cart is detected while the cart is moving forward in the manual mode, whereas in the automatic mode, the cart is prohibited from travelling when the rear-end collision to the cart is detected while the cart is moving forward. Thus, the safety for the cart in the case of operating in the automatic mode can be increased.

In one or more embodiments, in the automatic mode, the cart may be configured to execute a tracking operation and a remote control operation, wherein in the tracking operation, the cart moves to track a beacon carried by the user, and in the remote control operation, the cart moves according to an instruction from a remote controller operated by the user.

According to the above configuration, safety for the cart in cases of executing the tracking operation and the remote control operation in the automatic mode can further be increased.

EMBODIMENTS

A cart 2 shown in FIG. 1 comprises a carriage unit 4, a luggage carrier unit 6, a handle unit 8, a steering unit 10, a front wheel unit 12, a rear wheel unit 14, and a bumper unit 16. The cart 2 is configured to carry objects placed on the luggage carrier unit 6. The cart 2 comprises a receiver (not shown) installed in the carriage unit 4. The cart 2 is configured to operate in either a manual mode, an automatic mode, or a parking mode. In the manual mode, the cart 2 is configured to move forward or backward in accordance with an operation by a user in a state where the user standing behind the handle unit 8 is holding the handle unit 8. In the automatic mode, the cart 2 is configured to move by tracking a beacon (not shown) which the user standing in front of the carriage unit 4 is holding, or execute a remote control operation of moving in accordance with instructions from a remote controller (not shown) which the user operates. In this case, the cart 2 receives radio waves from the beacon or the remote controller by the receiver. In the parking mode, the can 2 is configured to lock the rear wheel unit 14 and stay parked on spot.

(Carriage Unit 4)

Figure 2:
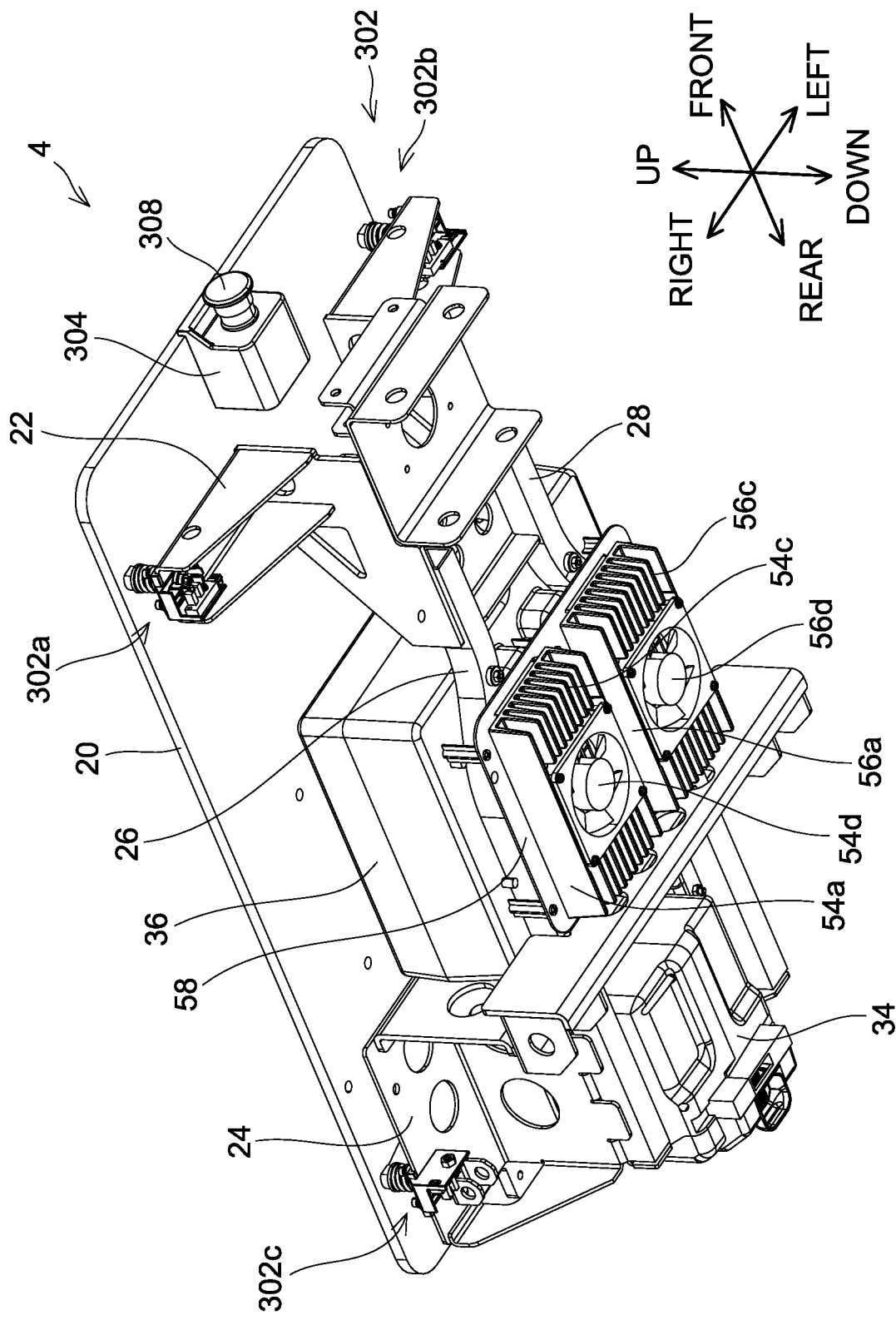
FIG. 2 is a perspective view seeing a carriage unit 4 of the embodiment from front right lower side.
Figure 3:
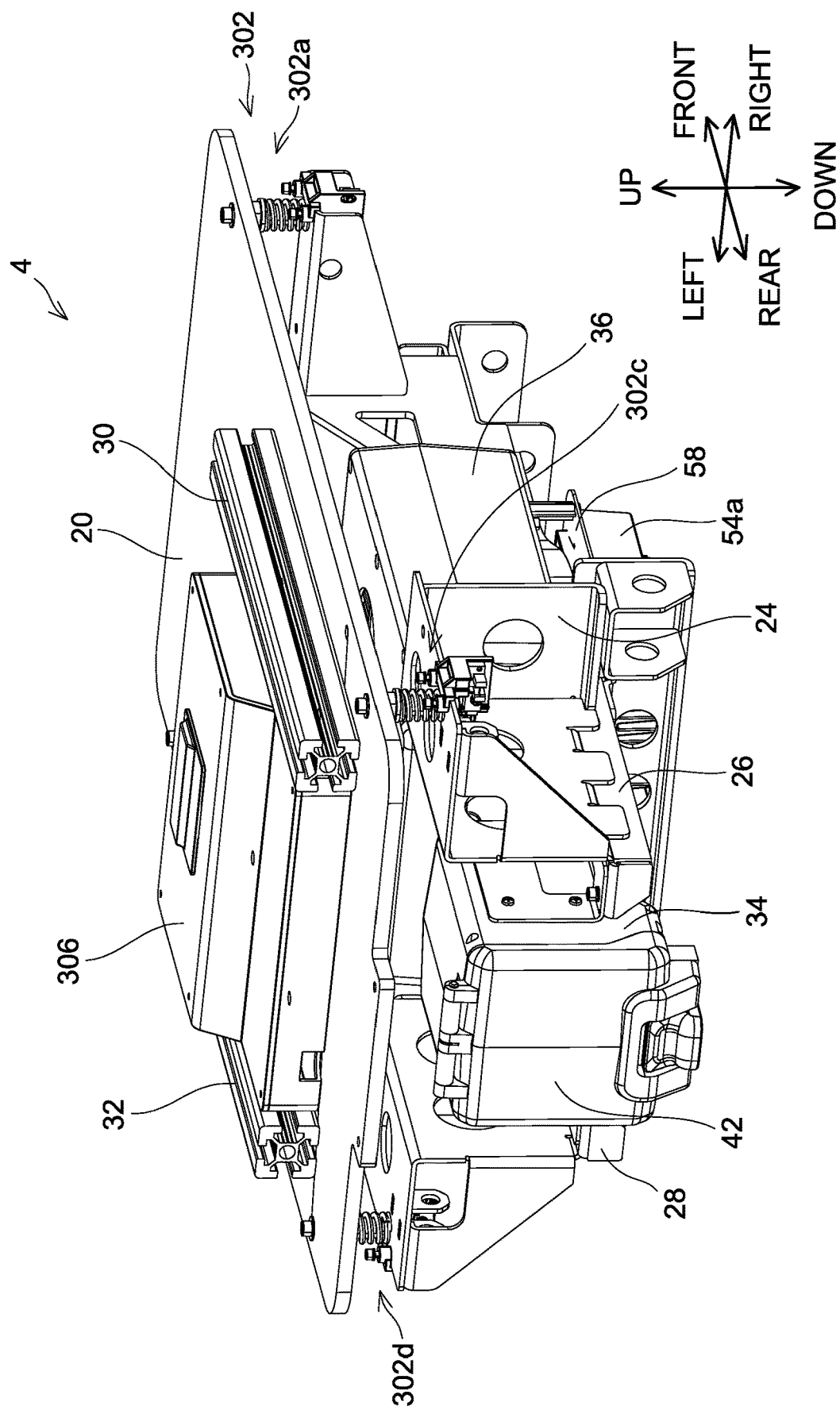
FIG. 3 is a perspective view seeing the carriage unit 4 of live embodiment from rear right upper side.

As shown in FIGS. 2 and 3, the carriage unit 4 comprises a base plate 20, a front support member 22, a rear support member 24, a right lower frame 26, a left lower frame 28, a right upper frame 30, a left upper frame 32, a battery box 34, an overload detection mechanism 302, an emergency stop switch casing 304, an upper controller casing 306, and a lower controller casing 36. The overload detection mechanism 302 comprises a right front overload detection mechanism 302a, a left front overload detection mechanism 302b, a right rear overload detection mechanism 302c, and a left rear overload detection mechanism 302d.

As shown in FIG. 2, the base plate 20 is a member constituted of aluminum, and has a substantially rectangular flat plate shape having its longitudinal direction along a front-rear direction and its short direction along the left-right direction. The emergency stop switch casing 304 is a member constituted of resin, and is fixed to a lower surface of the base plate 20 at a front end of the base plate 20. An emergency stop switch 308 which the user can operate by pressing the same is arranged on a front surface of the emergency stop switch casing 304. The emergency stop switch 308 is normally off, and turns on when it is press-operated by the user. The emergency stop switch 308 is electrically connected to a main control circuit hoard 44 to be described later. The emergency stop switch casing 304 may be arranged at a rear, right, or left end of the base plate 20, and the emergency slop switch 308 may be arranged on a rear, right, or left surface of the emergency stop switch casing 304 in accordance with the arrangement thereof.

The front support member 22 is a member constituted of steel, and is attached to the lower surface of the base plate 20 via the right front overload detection mechanism 302a and the left front overload detection mechanism 302b at a front portion of the base plate 20. As shown in FIG. 3, the rear support member 24 is a member constituted of steel, and is attached to the lower surface of the base plate 20 via the right rear overload detection mechanism 302c and the left rear overload detection mechanism 302d at a rear portion of tin-base plate 20. The right lower frame 26 and the left lower frame 28 are both members constituted of steel, and each extend in a front-rear direction below the base plate 20. A front portion of the right lower frame 26 and a front portion of the left lower frame 28 are each fixed to the front support member 22. A rear portion of the right lower frame 26 and a rear portion of the left lower frame 28 are each fixed to the rear support member 24.

Figure 4:
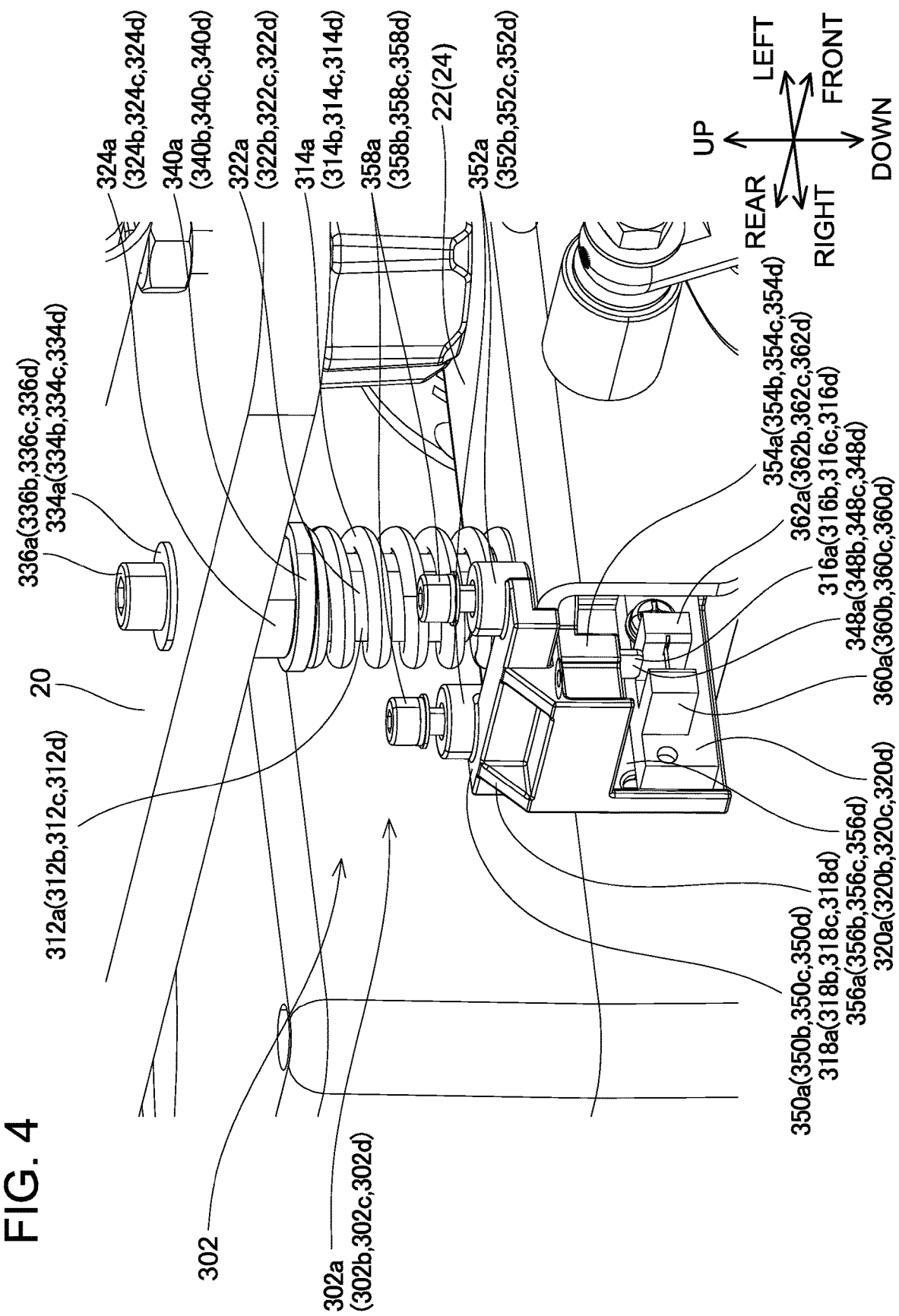
FIG. 4 is a perspective view seeing a right front overload detection mechanism 302a of the carriage unit 4 of the embodiment from the front right upper side.
Figure 5:
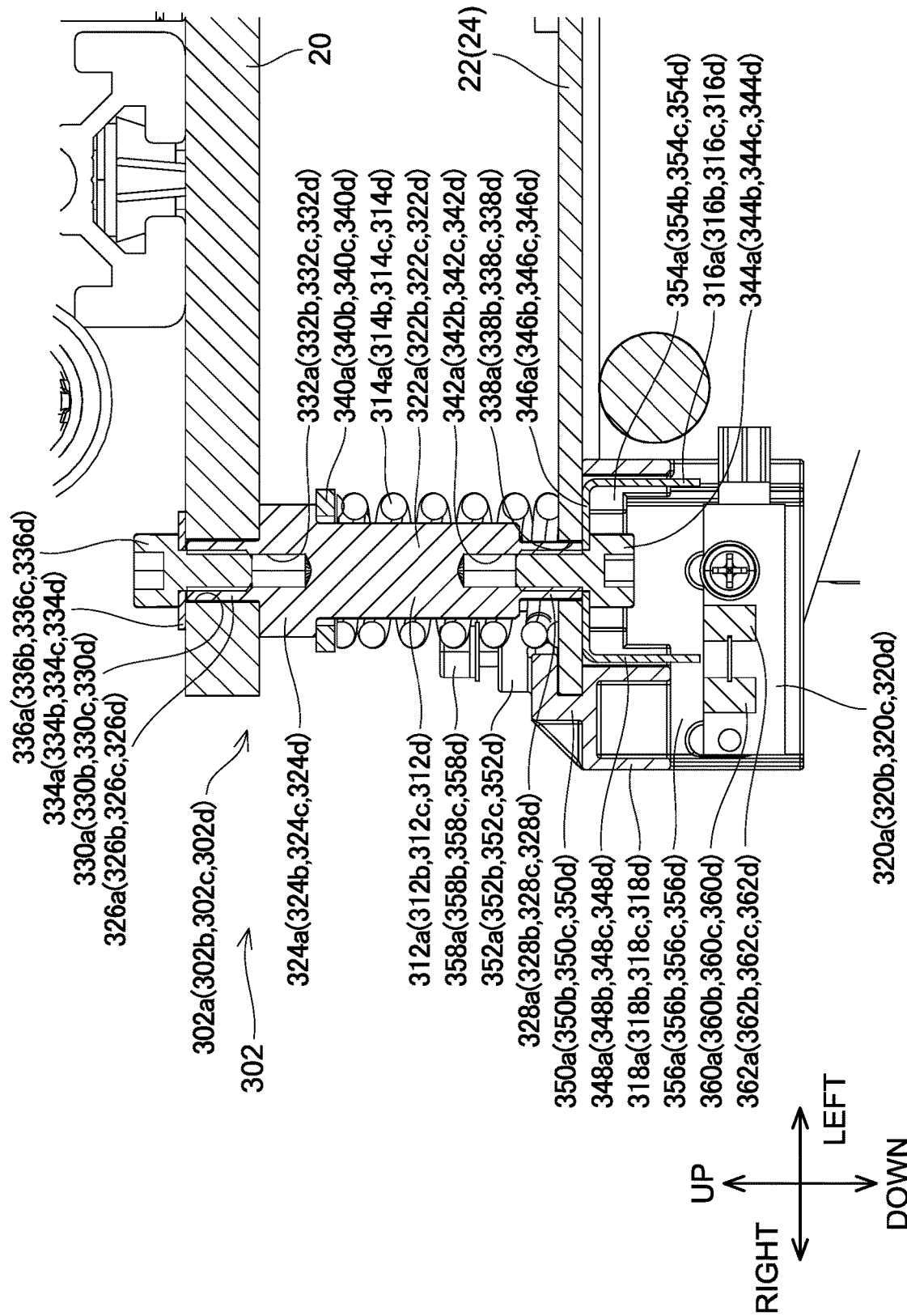
FIG. 5 is a vertical cross-sectional view of the right front overload detection mechanism 302a in a state where an overload detection sensor 320a is in an off-state in the carriage unit 4 of the embodiment.

The right front overload detection mechanism 302a, the left front overload detection mechanism 302b, the right rear overload detection mechanism 302c, and the left rear overload detection mechanism 302d have same configuration as one another, which will collectively be explained (for the configuration of one of the overload detection mechanisms). As shown in FIG. 4, the right front overload detection mechanism 302a, the left front overload detection mechanism 302b, the right rear overload detection mechanism 302c, and the left rear overload detection mechanism 302d each comprises a pillar member 312a, 312b, 312c, 312d, a coil spring 314a, 314b, 314c, 314d, a detection plate 316a, 316b, 316c, 316d, a base member 318a, 318b, 318c, 318d, and an overload detection sensor 320a, 320b, 320c, 320d. As shown in FIG. 5, the pillar member 312a, 312b, 312c, 312d includes a circular column 322a, 322b, 322c, 322d, a flange 324a, 324b, 324c, 324d, an upper small-diameter portion 326a, 326b, 326c, 326d, and a lower small-diameter portion 328a, 328b, 328c, 328d. The circular column 322a, 322b, 322c, 322d has a substantially circular column shape of which axial direction extends along an up-down direction. The flange 324a, 324b, 324c, 324d is arranged above the circular column 322a, 322b, 322c, 322d, and has a shape protruding radially outward than the circular column 322a, 322b, 322c, 322d. The upper small-diameter portion 326a, 326b, 326c, 326d is arranged above the flange 324a, 324b, 324c, 324d, and has a substantially round columnar shape with a smaller diameter than the circular column 322a, 322b, 322c, 322d. The lower small-diameter portion 328a, 328b, 328c, 328d is arranged below the circular column 322a, 322*b*, 322*c*, 322*d*, and has a substantially round columnar shape with a smaller diameter than the circular column 322*a*, 322*b*, 322*c*, 322*d*.

The upper small-diameter portion 326*a*, 326*b*, 326*c*, 326*d* is inserted from below into a through bole 330*a*, 330*b*, 330*c*, 330*d* defined in the base plate 20. A threaded hole 332*a*, 332*b*, 332*c*, 332*d* is defined at an upper end of the pillar member 312*a*, 312*b*, 312*c*, 312*d*. A boll 336*a*, 336*b*, 336*c*, 336*d* is screw-fitted in the threaded hole 332*a*, 332*b*, 332*c*, 332*d* via a washer 334*a*, 334*b*, 334*c*, 334*d*. In a state where the bolt 336*a*, 336*b*, 336*c*, 336*d* is screw-fitted in the threaded hole 332*a*, 332*b*, 332*c*, 332*d*, the base plate 20 is held between the washer 334*a*, 334*b*, 334*c*, 334*d* and the flange 324*a*, 324*b*, 324*c*, 324*d*. Since an inner diameter of the through hole 20*a*, 20*b*, 20*c*, 20*d* is slightly larger than an outer diameter of the upper small-diameter portion 326*a*, 326*b*, 326*c*, 326*d*, the pillar member 312*a*, 312*b*, 312*d*, 312*d* is allowed to slightly tilt relative to the base plate 20.

The lower small-diameter portion 328*a*, 328*b*, 328*c*, 328*d* is inserted from above into a through hole 338*a*, 338*b*, 338*c*, 338*d* defined in the front support member 22 (or the rear support member 24). Since an inner diameter of the through hole 338*a*, 338*b*, 338*c*, 338*d* is slightly larger than an outer diameter of the lower small-diameter portion 328*a*, 328*b*, 328*c*, 328*d*, the pillar member 312*a*, 312*b*, 312*c*, 312*d* is allowed to slightly tilt relative to the front support member 22 (or the rear support member 24). The coil spring 314*a*, 314*b*, 314*c*, 314*d* is attached to the pillar member 312*a*, 312*b*, 312*c*, 312*d*. An upper end of the coil spring 314*a*, 314*b*, 314*c*, 314*d* abuts a lower surface of the washer 340*a*, 340*b*, 340*c*, 340*d*. An upper surface of the washer 340*a*, 340*b*, 340*c*, 340*d* abuts a lower surface of the flange 324*a*, 324*b*, 324*c*, 324*d*. A lower end of the coil spring 314*a*, 314*b*, 314*c*, 314*d* abuts an upper surface of the front support member 22 (or the rear support member 24). The coil spring 314*a*, 314*b*, 314*c*, 314*d* biases the pillar member 312*a*, 312*b*, 312*c*, 312*d* upward relative to the front support member 22 (or the rear support member 24).

A threaded hole 342*a*, 342*b*, 342*c*, 342*d* is defined at a lower end of the pillar member 312*a*, 312*b*, 312*c*, 312*d*. A bolt 344*a*, 344*b*, 344*c*, 344*d* is screw-fitted in the threaded hole 342*a*, 342*b*, 342*c*, 342*d* via the detection plate 316*a*, 316*b*, 316*c*, 316*d*. The detection plate 316*a*, 316*b*, 316*c*, 316*d* includes a support portion 346*a*, 346*b*, 346*c*, 346*d* having a substantially flat plate shape along the front-rear direction and the left-right direction, and a detection portion 348*a*, 348*b*, 348*c*, 348*d* bent downward from an end of the support portion 346*a*, 346*b*, 346*c*, 346*d* and having a substantially flat plate shape along the front-rear direction and the up-down direction.

The base member 318*a*, 318*b*, 318*c*, 318*d* includes an engagement portion 350*a*, 350*b*, 350*c*, 350*d*, a nut 352*a*, 352*b*, 352*c*, 352*d*, a guide portion 354*a*, 354*b*, 354*c*, 354*d*, and a sensor holder portion 356*a*, 356*b*, 356*c*, 356*d*. The engagement portion 350*a*, 350*b*, 350*c*, 350*d* is configured to engage with the front support member 22 (or the rear support member 24). A bolt 358*a*, 358*b*, 358*c*, 358*d* is screw-fitted in the nut 352*a*, 352*b*, 352*c*, 352*d*. A lower end of the bolt 358*a*, 358*b*, 358*c*, 358*d* penetrates the nut 352*a*, 352*b*, 352*c*, 352*d* and abuts an upper surface of the front support member 22 (or the rear support member 24). The base member 318*a*, 318*b*, 318*c*, 318*d* is fixed to the front support member 22 (or the rear support member 24) by tightening the bolt 358*a*, 358*b*, 358*c*, 358*d* relative to the nut 352*a*, 352*b*, 352*c*, 352*d* in a state of having the engagement portion 350*a*, 350*b*, 350*c*, 350*d* engaged with the front support member 22 (or the rear support member 24). The guide portion 354*a*, 354*b*, 354*c*, 354*d* has a shape for guiding movement of the detection plate 316*a*, 316*b*, 316*c*, 316*d* in the up-down direction. The overload detection sensor 320*a*, 320*b*, 320*c*, 320*d* is attached to the sensor holder portion 356*a*, 356*b*, 356*c*, 356*d*. A position along the up-down direction for attaching the overload detection sensor 320*a*, 320*b*, 320*c*, 320*d* to the sensor holder portion 356*a*, 356*b*, 356*c*, 356*d* is configured adjustable.

The overload detection sensor 320*a*, 320*b*, 320*c*, 320*d* of the present embodiment is a so-called photo interrupter. The overload detection sensor 320*a*, 320*b*, 320*c*, 320*d* includes a light emitting element 360*a*, 360*b*, 360*c*, 360*d* and a light receiving element 362*a*, 362*b*, 362*c*, 362*d* arranged to lace each other. The overload detection sensor 320*a*, 320*b*, 320*c*, 320*d* is in an off-state when the light entitling element 360*a*, 360*b*, 360*c*, 360*d* is not blocked from the light receiving element 362*a*, 362*b*, 362*c*, 362*d* and is in an on-state when the light emitting element 360*a*, 360*b*, 360*c*, 360*d* is blocked from the light receiving element 362*a*, 362*b*. 362*c*, 362*d*. The overload detection sensor 320*a*, 320*b*, 320*c*, 320*d* is electrically connected to the main control circuit board 44 to be described later (see FIG. 9).

As shown in FIG. 5, in a state where no object is placed on the luggage carrier unit 6 and thus a load from the luggage carrier unit 6 is not applied to the base plate 20, an upper surface of the support portion 346*a*, 346*b*, 346*c*, 346*d* of the detection plate 316*a*, 316*b*, 316*c*, 316*d* abuts the lower surface of the front support member 22 (or the rear support member 24) by a biasing force of the coil spring 314*a*, 314*b*, 314*c*, 314*d*. In this state, since the detection portion 348*a*, 348*b*, 348*c*, 348*d* of the detection plate 316*a*, 316*b*, 316*c*, 316*d* does not block the light emitting element 360*a*, 360*b*, 360*c*, 360*d* from the light receiving element 362*a*, 362*b*, 362*c*, 362*d*, the overload detection sensor 320*a*, 320*b*, 320*c*, 320*d* is in the off-state.

Figure 6:
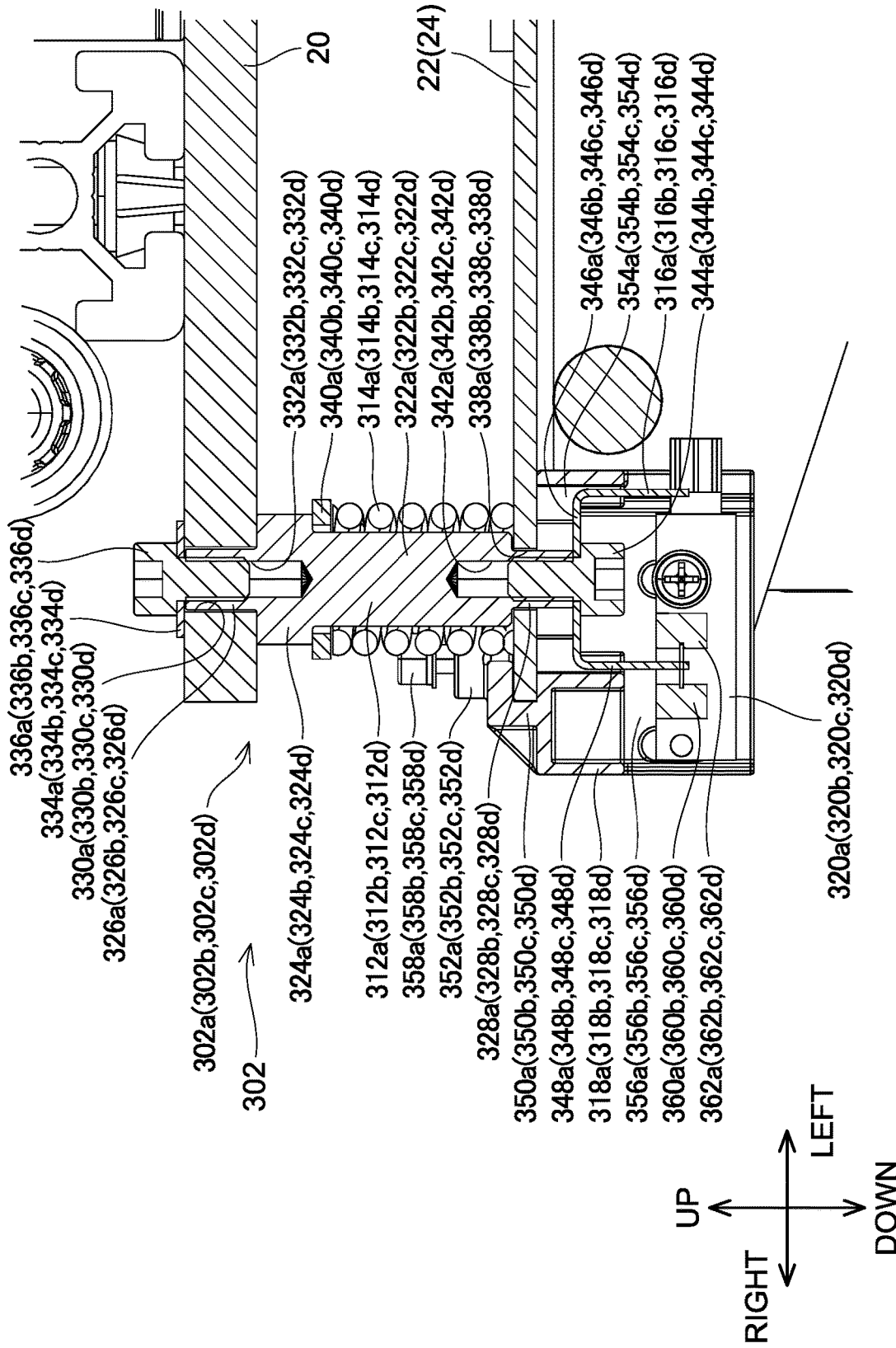
FIG. 6 is a vertical cross-sectional view of the right front overload detection mechanism 302a in a state where the overload detection sensor 320a is in an on-state in the carriage unit 4 of the embodiment.

From the state shown in FIG. 5, when an object is placed on the luggage carrier unit 6 and a load of the luggage carrier unit 6 is applied to the base plate 20, the pillar member 312*a*, 312*b*, 312*c*, 312*d* and the detection plate 316*a*, 316*b*, 316*c*, 316*d* move downward relative to the front support member 22 (or the rear support member 24) against the biasing force of the coil spring 314*a*, 314*b*, 314*c*, 314*d*. At this occasion, when a load that is equal to or greater than a predetermined upper limit load (such as 25 kgf) is applied to the pillar member 312*a*, 312*b*, 312*c*, 312*d*, the detection plate 316*a*, 316*b*, 316*c*, 316*d* blocks the light emitting element 360*a*, 360*b*, 360*c*, 360*d* from the light receiving element 362*a*, 362*b*, 362*c*, 362*d* as shown in FIG. 6, and the overload detection sensor 320*a*, 320*b*, 320*c*, 320*d* shifts from the off-state to the on-state. The pillar member 312*a*, 312*b*, 312*c*, 312*d* and the detection plate 316*a*, 316*b*, 316*c*, 316*d* are configured capable of moving downward relative to the base plate 20 until a lower surface of the circular column 322*a*, 322*b*, 322*c*, 322*d* abuts an upper surface of the base plate 20. By configuring as such, the overload detection mechanism 302 is enabled to detect an overload on the luggage carrier unit 6. For example, in a case where the upper limit load of each of the right front overload detection mechanism 302*a*, the left front overload detection mechanism 302*b*, the right rear overload detection mechanism 302*c*, and the left rear overload detection mechanism 302*d* is 25 kgf, the overload detection mechanism 302 detects the overload on the luggage carrier unit 6 when object(s) exceeding 100 kg is placed on the luggage carrier unit 6.

As above, the overload detection sensors 320*a*, 320*b*, 320*c*, 320*d* are contactless detection sensors. Due to this, the overload detection sensors 320*a*, 320*b*, 320*c*, 320*d* can be suppressed from being damaged by transmission of vibration or impact applied on the luggage carrier unit 6 to the overload detection sensors 320a, 320b, 320c, 320d.

Figure 7:
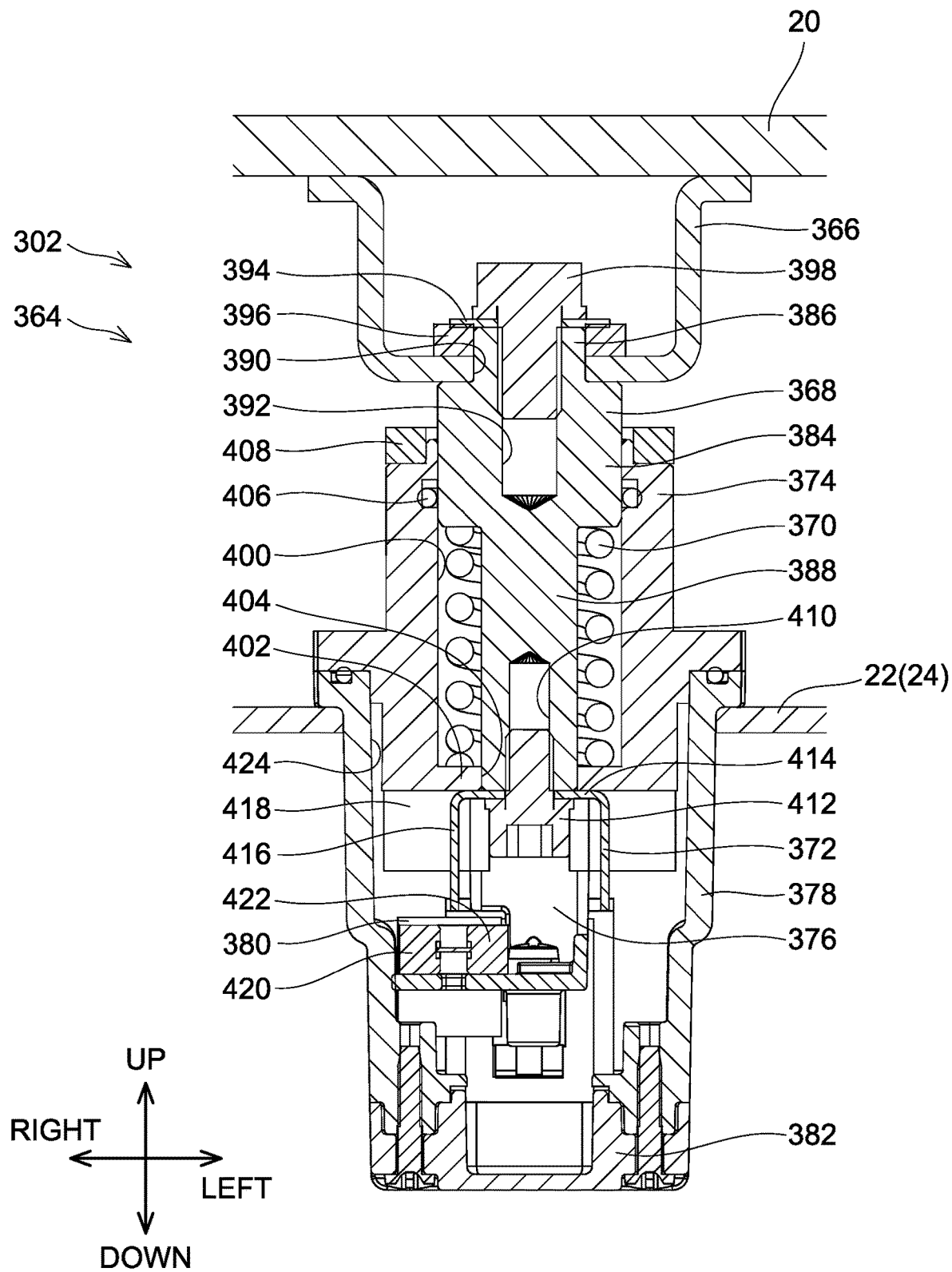
FIG. 7 is a vertical cross-sectional view of an overload detection mechanism 364 in a state where an overload detection sensor 380 is in an off-state in a carriage unit 4 of a variant.

An overload detection mechanism 364 as shown in FIG. 7 may be used as each of the right front overload detection mechanism 302a the left front overload detection mechanism 302b, the right rear overload detection mechanism 302c, and the left rear overload detection mechanism 302d. The overload detection mechanism 364 includes a support member 366, a pillar member 368, a coil spring 370, a detection plate 372, an upper housing 374, a sensor holder member 376, a lower housing 378, an overload detection sensor 380, and a cap 382.

The support member 366 is fixed to the lower surface of the base plate 20. The pillar member 368 includes a circular column 384, an upper small-diameter portion 386, and a lower small-diameter portion 388. The circular column 384 has a substantially circular column shape of which axial direction extends along an up-down direction. The upper small-diameter portion 386 is arranged above the circular column 384, and has a substantially round columnar shape with a smaller diameter than the circular column 384. The lower small-diameter portion 388 is arranged below the circular column 384, and has a substantially round columnar shape with a smaller diameter than the circular column 384. The upper small-diameter portion 386 is inserted from below into a through hole 390 defined in the support member 366. A threaded hole 392 is defined at an upper end of the pillar member 368. A bolt 398 is screw-fitted in the threaded hole 392 via washers 394, 396. In a state where the bolt 398 is screw-fitted in the threaded hole 392, the support member 366 is held between the washer 396 and the circular column 384. Since an inner diameter of the through hole 390 is slightly larger than an outer diameter of the upper small-diameter portion 386, the pillar member 368 is allowed to slightly tilt relative to the support member 366.

The lower small-diameter portion 388 and the circular column 384 are inserted from above into a housing chamber 400 defined in the upper housing 374. The lower small-diameter portion 388 is inserted from above into a through hole 404 defined in a bottom wall 402 of the housing chamber 400. Since an inner diameter of the through hole 404 is slightly larger than an outer diameter of the lower small-diameter portion 388, the pillar member 368 is allowed to slightly tilt relative to the upper housing 374. The coil spring 370 is attached to the pillar member 368. An upper end of the coil spring 370 abuts a lower surface of the circular column 384. A lower end of the coil spring 370 abuts an upper surface of the bottom wall 402. The coil spring 370 biases the pillar member 368 upward relative to the upper housing 374. An inner diameter of the housing chamber 400 is slightly larger than an outer diameter of the circular column 384. A sealing member 406 configured to slidably abut a side surface of the circular column 384 is arranged in the vicinity of an upper end of the housing chamber 400. The sealing member 406 may for example be a resin O ring. Foreign matters are suppressed from entering into the housing chamber 400 by the sealing member 406. Further, a ring-shaped cushion 408 is arranged at an upper end of the upper housing 374.

A threaded hole 410 is defined at a lower end of the pillar member 368. A bolt 412 is screw-fitted in the threaded hole 410 via the detection plate 372. The detection plate 372 includes a support portion 414 having a substantially flat plate shape along the front-rear direction and the left-right direction, and a detection portion 416 that is bent downward from an end of the support portion 414 and having a substantially flat plate shape along the front-rear direction and the up-down direction. A guide portion 418 for guiding movement of the detection plate 372 in the up-down direction is arranged at a lower portion of the upper housing 374.

The sensor holder member 376 is fixed to a lower end of the upper housing 374. The overload detection sensor 380 is attached to the sensor holder member 376. The overload detection sensor 380 of the present embodiment is a so-called photo interrupter. The overload detection sensor 380 includes a light emitting element 420 and a light receiving element 422 arranged to face each other. The overload detection sensor 380 is in an off-state when the light emitting element 420 is not blocked from the light receiving element 422 and is in an on-state when the light emitting element 420 is blocked from the light receiving element 422. The overload detection sensor 380 is electrically connected to the main control circuit board 44 to be described later (see FIG. 9).

A housing space 424 vertically penetrating the lower housing 378 is defined in the lower housing 378. A lower portion of the upper housing 374 is inserted from above into the housing space 424 of the lower housing 378. The detection plate 372, the sensor holder member 376, and the overload detection sensor 380 are housed in the housing space 424. The lower housing 378 is fixed together with the upper housing 374 to the front support member 22 (or the rear support member 24). The cap 382 is detachably attached to a lower end of the lower housing 378.

As shown in FIG. 7, in the state where no object is placed on the luggage carrier unit 6 and thus a load from the luggage carrier unit 6 is not applied to the base plate 20, an upper surface of the support portion 414 of the detection plate 372 abuts a lower surface of the bottom wall 402 of the upper housing 374 by a biasing force of the coil spring 370. In this state, since the detection portion 416 of the detection plate 372 does not block the light emitting element 420 from the light receiving element 422, the overload detection sensor 380 is in the off-state.

Figure 8:
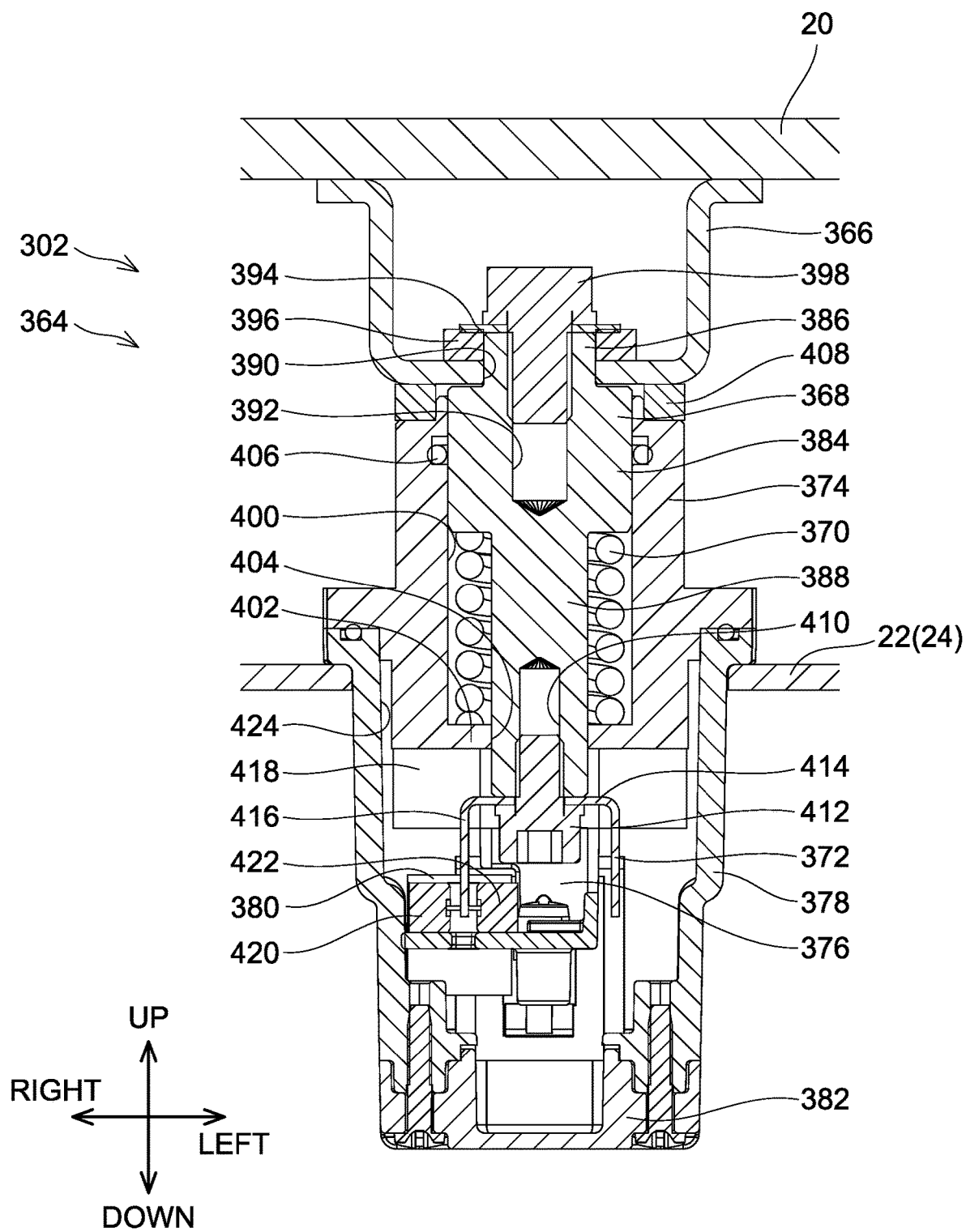
FIG. 8 is a vertical cross-sectional view of the overload detection mechanism 364 in a state w here the overload detection sensor 380 is in an on-state in the carriage unit 4 of the variant.

From the state shown in FIG. 7, when an object is placed on the luggage carrier unit 6 and a load from the luggage carrier unit 6 is applied to the base plate 20, the pillar member 368 and the detection plate 372 move downward relative to the upper housing 374 against the biasing force of the coil spring 370. At this occasion, when a load that is equal to or greater than the predetermined upper limit load (such as 25 kgf) is applied to the pillar member 368, the detection plate 372 blocks the light emitting, element 420 from the light receiving element 422 as shown in FIG. 8, and the overload detection sensor 380 shifts from the off-state to the on-state. The pillar member 368 and the detection plate 372 are configured capable of moving downward relative to the base plate 20 until a lower surface of the support member 366 abuts an upper surface of the cushion 408. By configuring as such, the overload detection mechanism 364 is enabled to detect an overload on the luggage carrier unit 6.

As above, the overload detection sensor 380 is a contactless detection sensor. Due to this, the overload detection sensor 380 can be suppressed from being damaged by transmission of vibration or impact applied on the luggage carrier unit 6 to the overload detection sensor 380.

In the overload detection mechanism 364, peripheries of the coil spring 370, the detection plate 372, and the overload detection sensor 380 are surrounded by the upper housing 374, the lower housing 378, and the cap 382. By configuring as such, foreign matters can be suppressed from adhering to the coil spring 370, the detection plate 372, and the overload detection sensor 380 and an operation of the overload detection mechanism 364 can be suppressed from being adversely affected.

Figure 9:
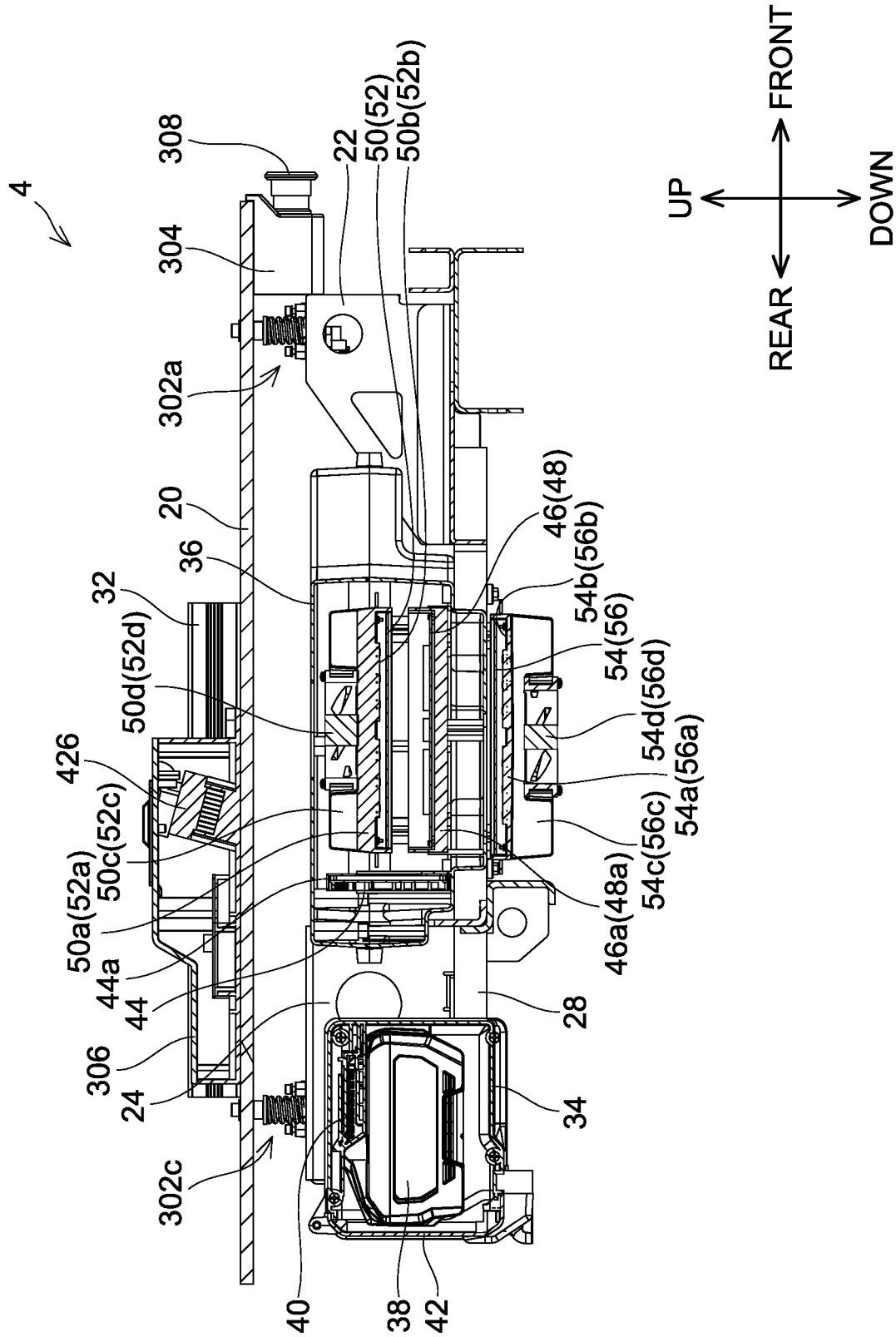
FIG. 9 is a cross-sectional view seeing the carriage unit 4 of the embodiment in a cross section along a front-rear direction and an up-down direction.

As shown in FIG. 3, the right upper frame 30 and the left upper frame 32 are both members constituted of aluminum, and extend in the front-rear direction above the base plate 20. The right upper frame 30 and the left upper frame 32 are respectively fixed to the upper surface of the base plate 20. The upper controller casing 306 is a member constituted of resin, and is fixed to the upper surface of the base plate 20 between the right upper frame 30 and the left upper frame 32. As shown in FIG. 9, an automatic driving control circuit board 426 is housed in the upper controller casing 3306. A wireless interface (hereinbelow may be abbreviated as I/F) 428 (see FIG. 30) electrically connected to the receiver mounted in the carriage unit 4, and an automatic driving micro-controller unit (hereinbelow may be termed MCU) 430 (see FIG. 30) electrically connected to the wireless I/F 428 are mounted on the automatic driving control circuit board 426. The automatic driving control circuit board 426 is electrically connected to the main control circuit board 44 to be described later.

As shown in FIG. 3, the battery box 34 is a member constituted of resin, and is arranged below the base plate 20 in the vicinity of the rear portion of the base plate 20. The battery box 34 is fixed to the rear support member 24. As shown in FIG. 9, a battery receptacle 40 to which a battery pack 38 can detachably be attached is arranged inside the battery box 34. The battery pack 38 includes secondary battery cells such as lithium ion battery cells. The cart 2 is configured to operate by power supplied from the battery pack 38 attached to the battery receptacle 40. An openable battery cover 42 is arranged at a rear portion of the battery box 34. The battery pack 38 can be attached to or detached from the battery receptacle 40 by sliding the battery pack 38 in the front-rear direction relative to the battery receptacle 40 in a state of having the battery cover 42 opened.

Figure 10:
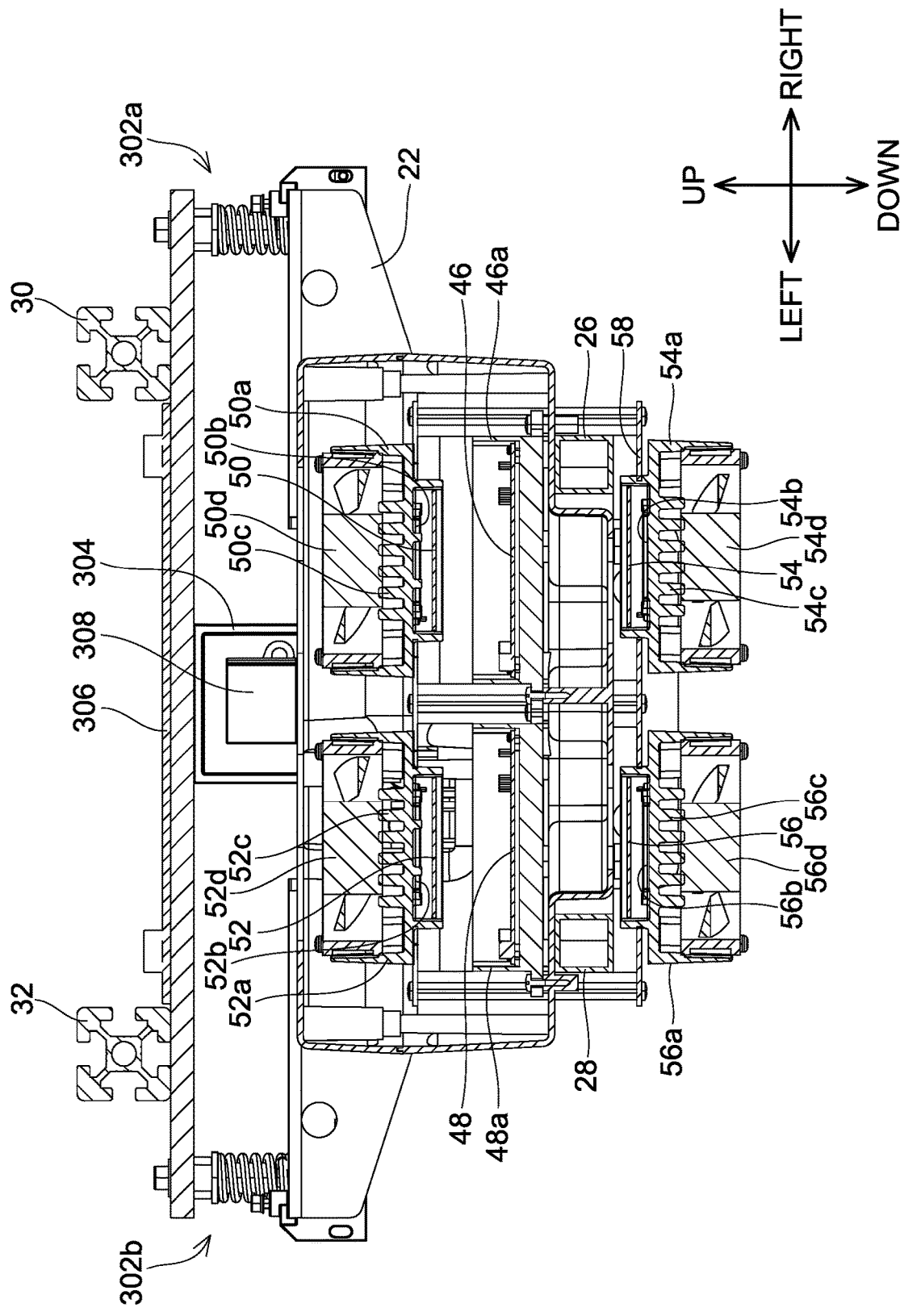
FIG. 10 is a cross-sectional view seeing the carriage unit 4 of the embodiment in a cross section along a left-right direction and the up-down direction.

As shown in FIG. 2, the lower controller casing 36 is a member constituted of resin, and is arranged below the base plate 20 in the vicinity of a center of the base plate 20. The lower controller casing 36 is fixed to the right lower frame 26 and the left lower frame 28 in a state of being placed on an upper surface of the right lower frame 26 and an upper surface of the left lower frame 28. As shown in FIGS. 9 and 10, the lower controller casing 36 holds one main control circuit board 44, two drive control circuit boards 46, 48, and four electrical brake circuit boards 50, 52, 54, 56.

As shown in FIG. 9, the main control circuit board 44 is housed in a circuit board casing 44a. The circuit board casing 44a is housed on a back side within the lower controller casing 36. The circuit board casing 44a is arranged such that the main control circuit board 44 is arranged along the up-down direction and the left-right direction. A control power supply circuit 432, a main MCU 434, a switch circuit 436, shutoff circuits 438, 440, 442 (see FIG. 30) to be described later are mounted on the main control circuit board 44.

As shown in FIG. 10, the drive control circuit boards 46, 48 are respectively housed inside circuit board casings 46a, 48a. As shown in FIG. 9, the circuit board casings 46a, 48a are housed on a front lower side within the lower controller casing 36. The circuit board casings 46a, 48a are respectively arranged such that the drive control circuit boards 46, 48 are arranged along the front-rear direction and the left-right direction. The drive control circuit boards 46, 48 are electrically connected to the main control circuit board 44. Motor MCUs 444, 448, 452, motor drivers 454, 458, 462 and an electromagnetic brake driver 464 (see FIG. 30) to be described later are mounted on the drive control circuit board 46. Motor MCUs 446, 450, 452, motor drivers 456, 460, and an electromagnetic brake driver 466 (sec FIG. 30) to be described later are mounted on the drive control circuit board 48.

As shown in FIG. 10, the electrical brake circuit boards 50, 52, 54, 56 are respectively attached to heat dissipating casings 50a, 52a, 54a, 56a. The heat dissipating casings 50a, 52a, 54a, 56a respectively include circuit board housings 50b, 52b, 54b, 56b housing the electrical brake circuit boards 50, 52, 54, 56, heat dissipating fins 50c, 52c, 54c, 56c, and cooling fans 50d, 52d, 54d, 56d. The heat dissipating casings 50a, 52a are housed at a front upper side within the lower controller casing 36. The heat dissipating casings 50a, 52a are arranged such that the electrical brake circuit boards 50, 52 are arranged along the front-rear direction and the left-right direction and the cooling fans 50d, 52d are oriented upward. The heat dissipating casings 54a, 56a are fixed to a heat dissipating plate 58 fixed to the lower controller casing 36 on an outer side thereof at a front lower portion of the lower controller casing 36. The heat dissipating casings 54a, 56a are arranged such that the electrical brake circuit boards 54, 56 are arranged along the front-rear direction and the left-right direction and the cooling fans 54d, 56d are oriented downward. The electrical brake circuit boards 50, 54 and the cooling fans 50d, 54d are electrically connected to the drive control circuit board 46. The electrical brake circuit boards 52, 56 and the cooling fans 52d, 56d are electrically connected to the drive control circuit board 48. Brake circuits 468, 470, 472, 474 (see FIG. 30) to be described later are mounted respectively on lire electrical brake circuit boards 50, 52, 54, 56.

(Platform Unit 6)

As shown in FIG. 1, the luggage carrier unit 6 includes a main frame 60, a right guard 62, a left guard 64, and a front guard 66. The main frame 60, the right guard 62, the left guard 64, and the front guard 66 are respectively constituted of steel round pipes. The main frame 60 is arranged above the base plate 20 of the carriage unit 4 and along the front-rear direction and lire left-right direction. The main frame 60 is fixed to the right upper frame 30 and the left upper frame 32 in a state of being placed on upper surfaces of the right upper frame 30 and the left upper frame 32 of the carriage unit 4. An object to be carried by the cart 2 is to be placed on an upper surface of the main frame 60. The right guard 62 is attached to a right end of the main frame 60 so as to protrude higher than the upper surface of the main frame 60. The right guard 62 is arranged along the front-rear direction and the up-down direction. The left guard 64 is attached to a left end of the main frame 60 so as to protrude higher than the upper surface of the main frame 60. The left guard 64 is arranged along the front-rear direction and the up-down direction. The front guard 66 is attached to a front end of the main frame 60 so as to protrude higher than the upper surface of the main frame 60. The front guard 66 is arranged along the left-right direction and the up-down direction.

(Handle Unit 8)

Figure 11:
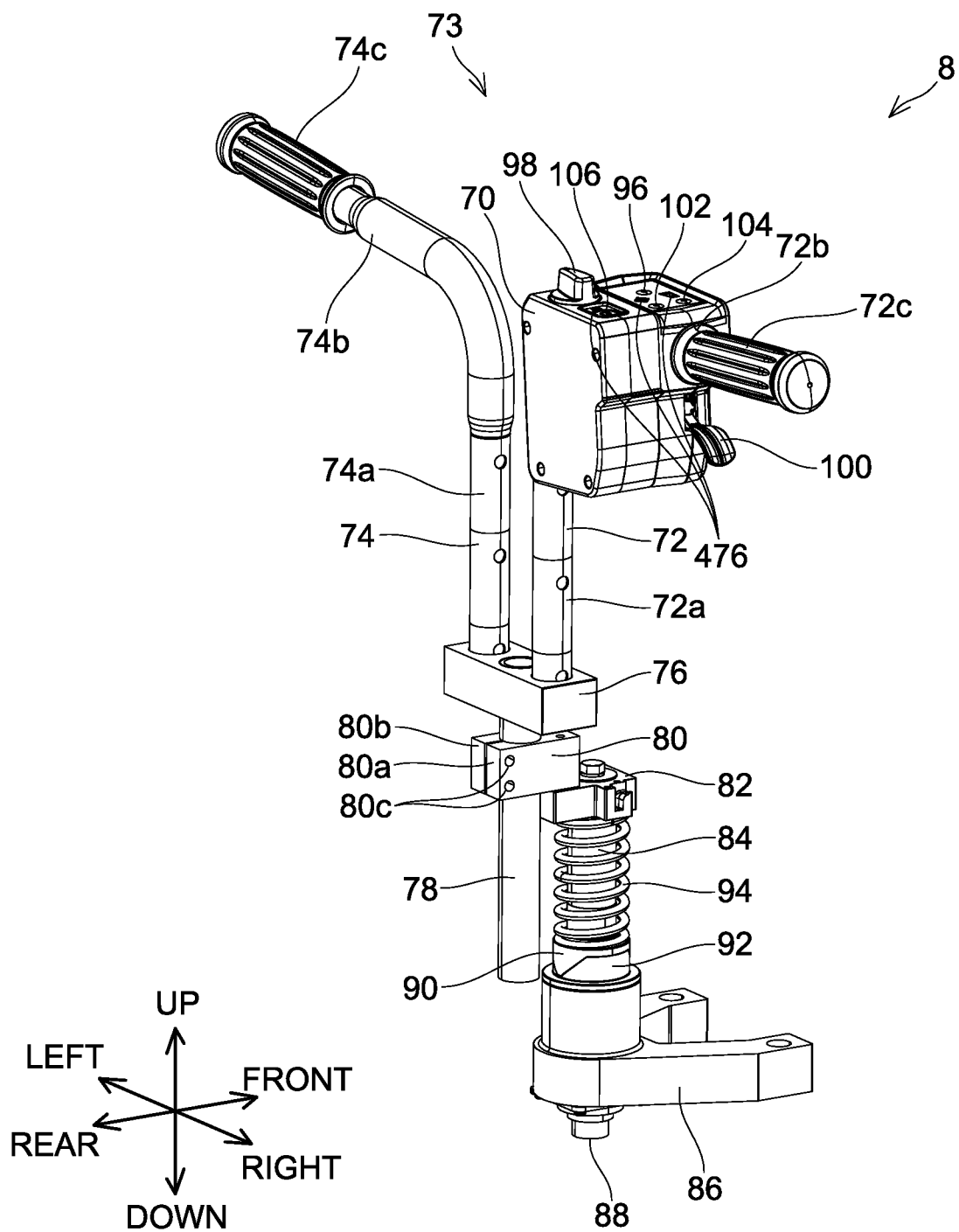
FIG. 11 is a perspective view seeing a handle unit 8 of the embodiment from the rear right upper side.

As shown in FIG. 11, the handle unit 8 includes a switch box 70, a right handle 72, a left handle 74, a handle arm 76, a support pipe 78, a clamping member 80, a fixing member 82, a handle shaft 84, a base member 86, a rotation angle sensor 88, a movable cam member 90, a fixed cam member 92, and a coil spring 94. Hereinbelow, the right handle 72, the left handle 74, the handle arm 76, and the support pipe 78 may collectively be termed a steering handle 73.

The switch box 70 includes a main power switch 96, a mode shifter switch 98, a trigger switch 100, a travelling direction shifter switch 102, a speed shifter switch 104, a horn switch 106, and LEDs 476. The main power switch 96 is configured to switch main power of the cart 2 between on and off. The mode shifter switch 98 is configured to switch an operation mode of the cart 2 between the manual mode, the automatic mode, and the parking mode. The trigger switch 100 is configured to switch on/off of a forward motion and a backward motion of the cart 2 in the manual mode, and to adjust a travelling speed of the can 2. The travelling direction shifter switch 102 is configured to switch a travelling direction of the cart 2 in the manual mode. The speed shifter switch 104 is configured to switch an upper limit travelling speed of the cart 2 in the manual mode. The horn switch 106 is configured to sound a horn using a buzzer 478 (see FIG. 30) incorporated in the switch box 70. The LEDs 476 are configured to display on/off of the main power of the cart 2, and also the travelling direction and the upper limit travelling speed that are currently set. The main power switch 96, the mode shifter switch 98, the trigger switch 100, the travelling direction shifter switch 102, the speed shifter switch 104, the horn switch 106, the LEDs 476, and the buzzer 478 are respectively electrically connected to the main control circuit board 44 (see FIG. 9).

The right handle 72 comprises a support portion 72a extending in the up-down direction and a handle portion 72b that is bent rightward from an upper end of the support portion 72a. A lower end of the support portion 72a is fixed to the handle arm 76. A right grip 72c is arranged at a right end of the handle portion 72b. The switch box 70 is fixed to the handle portion 72b on the left side of the right grip 72c. The left handle 74 comprises a support portion 74a extending in the up-down direction and a handle portion 74b that is bent leftward from an upper end of live support portion 74a. A lower end of the support portion 74a is fixed to the handle arm 76. A left grip 74c is arranged at a left end of the handle portion 74b. An upper end of the support pipe 78 is fixed to the handle arm 76. The support pipe 78 extends in the up-down direction. The clamping member 80 includes clamping parts 80a, 80b configured to clamp the support pipe 78 from both left and right sides. A tightening part 80c that is tightened by a lightening tool (not shown) is arranged at rear ends of the clamping parts 80a, 80b. When the tightening tool of the tightening part 80c is tightened, the clamping parts 80a, 80b are firmly pressed against an outer surface of the support pipe 78, and the support pipe 78 is thereby fixed relative to the clamping member 80. When the tightening tool of the lightening part 80c is loosened, the clamping parts 80a, 80b are no longer pressed against the outer surface of the support pipe 78, and the support pipe 78 thereby becomes movable in the up-down direction relative to the clamping member 80, and also pivotable about the up-down direction. A position and an angle of the support pipe 78 relative to the clamping member 80 can be fixed by adjusting the support pipe 78 to a desired position and angle relative to the clamping member 80 in a state of having the tightening tool of the tightening part 80c loosened, and thereafter tightening the tightening tool of the tightening part 80c.

Figure 12:
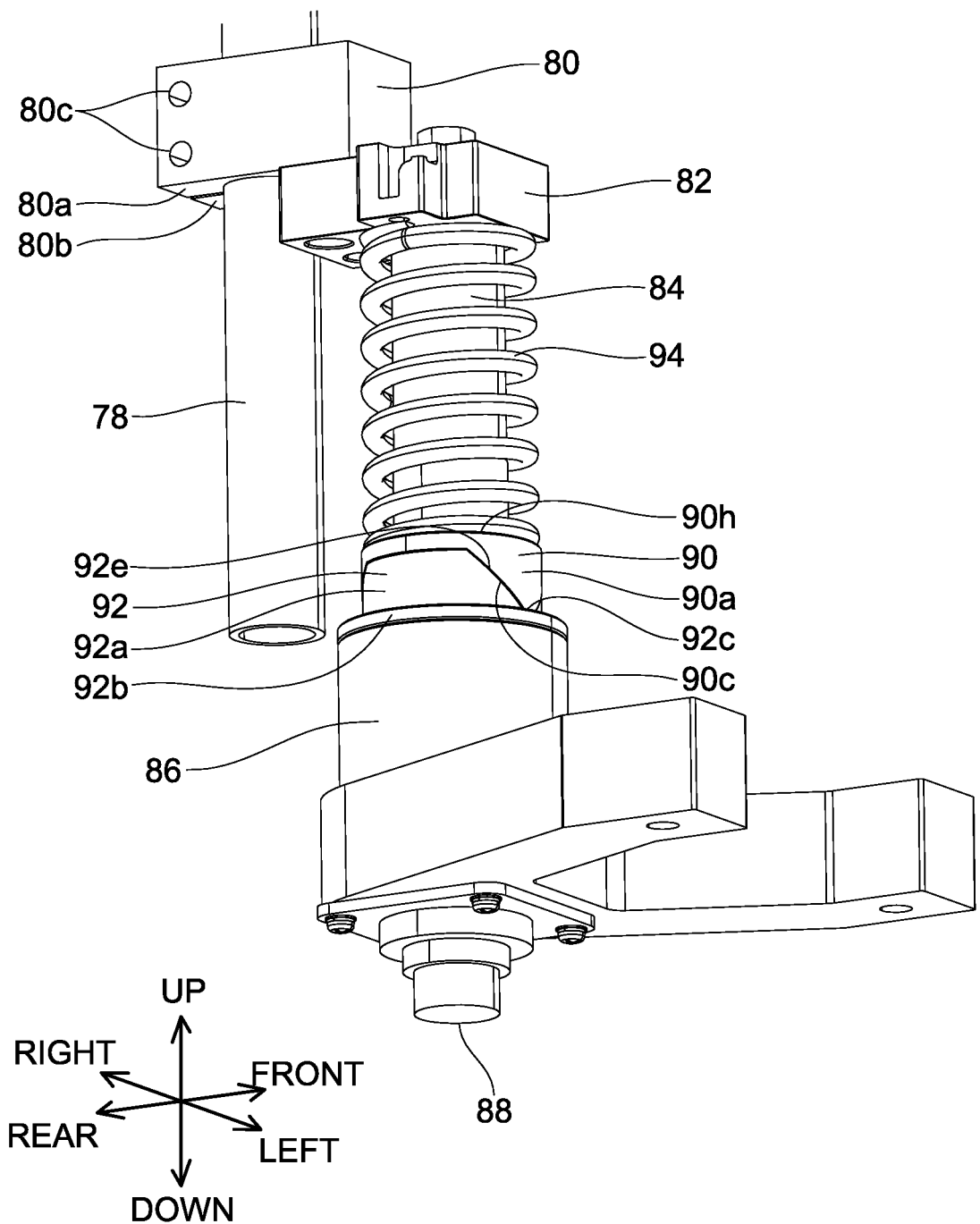
FIG. 12 is a perspective view seeing a lower part of the handle unit 8 of the embodiment from the front right lower side.

As shown in FIG. 12, a front portion of the clamping member 80 is fixed to the fixing member 82. An upper end of the handle shaft 84 is fixed to the fixing member 82. A lower end of the handle shaft 84 is pivotably supported by the base member 86. The base member 86 is fixed 10 the upper surface of the base plate 20 of the carriage unit 4. The rotation angle sensor 88 is fixed under the base member 86.

The rotation angle sensor 88 is coupled to the lower end of the handle shaft 84. The rotation angle sensor 88 is configured to detect a rotation angle of the handle shaft 84 relative to the base member 86. The rotation angle sensor 88 may for example be a potentiometer configured to detect a change in an electric resistance value that is obtained in accordance with a change in a rotation angle. Alternatively, the rotation angle sensor 88 may be a magnetic rotary sensor including a Hall element of which position is fixed relative to the base member 86 and a permanent magnet of which position is fixed relative to the handle shaft 84. The rotation angle sensor 88 is electrically connected to the main control circuit board 44 (see FIG. 9).

Figure 13:
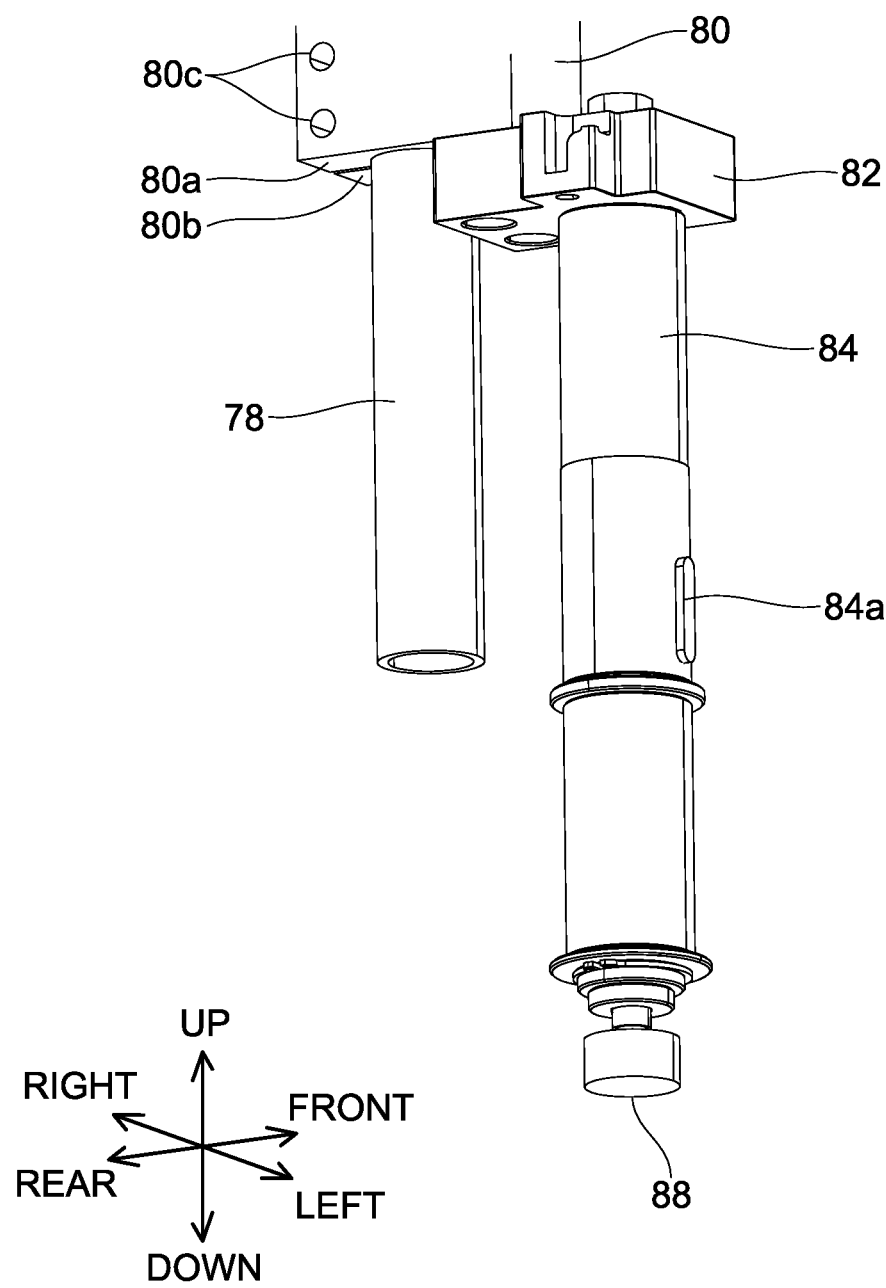
FIG. 13 is a perspective view seeing a support pipe 78, a clamping member 80, a fixing member 82, a handle shaft 84, and a rotation angle sensor 88 of the handle unit 8 of the embodiment from the front right lower side.

As shown in FIG. 13, the handle shaft 84 includes a guiding protrusion 84a. The guiding protrusion 84a extends radially outward from in outer circumferential surface of the handle shaft 84, and extends along an axial direction of the handle shaft 84.

Figure 14:
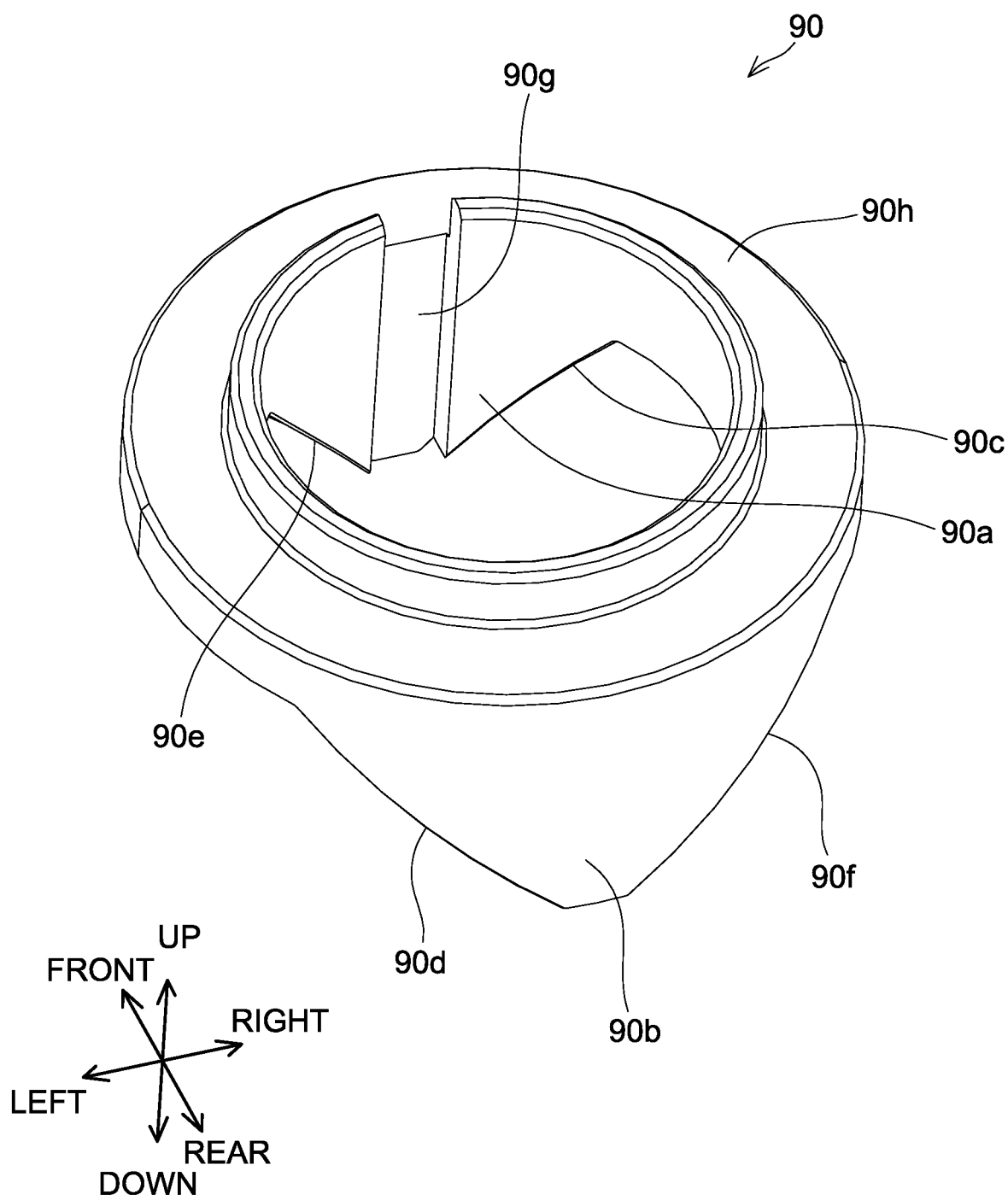
FIG. 14 is a perspective view seeing a movable cam member 90 of the handle unit 8 of the embodiment from rear left upper side.

As shown in FIG. 14, the movable cam member 90 has a substantially cylindrical shape. Cam projections 90a, 90b extending downward are arranged at a lower portion of the movable cam member 90. The cam projections 90a, 93b respectively include a first cam surface 90c, 90d and a second cam surface 90e, 90f. The first cam surface 90c, 90d is inclined downward at an increasing degree in a clockwise direction in a top view of the movable cam member 90. The second cam surface 90e, 90f is inclined upward at an increasing degree in a counterclockwise direction in the top view of the movable cam member 90. A guiding groove 90g is defined on an inner circumferential surface of the movable cam member 90. The guiding groove 90g has a width corresponding to the guiding protrusion 84a (see FIG. 13), and extends in a direction parallel to a center axis of the movable cam member 90. When the movable cam member 90 is to be attached to the handle shaft 84, the guiding protrusion 84a engages with the guiding groove 90g in a suite of being slidable in the up-down direction. Due to this, the movable cam member 90 is held by the handle shaft 84 so as to be movable in the up-down direction. A spring receiving portion 90h configured to support the coil spring 94 is arranged at an upper portion of the movable cam member 90. As shown in FIG. 12, the coil spring 94 is configured to bias the movable cam member 90 downward relative to the fixing member 82.

Figure 15:
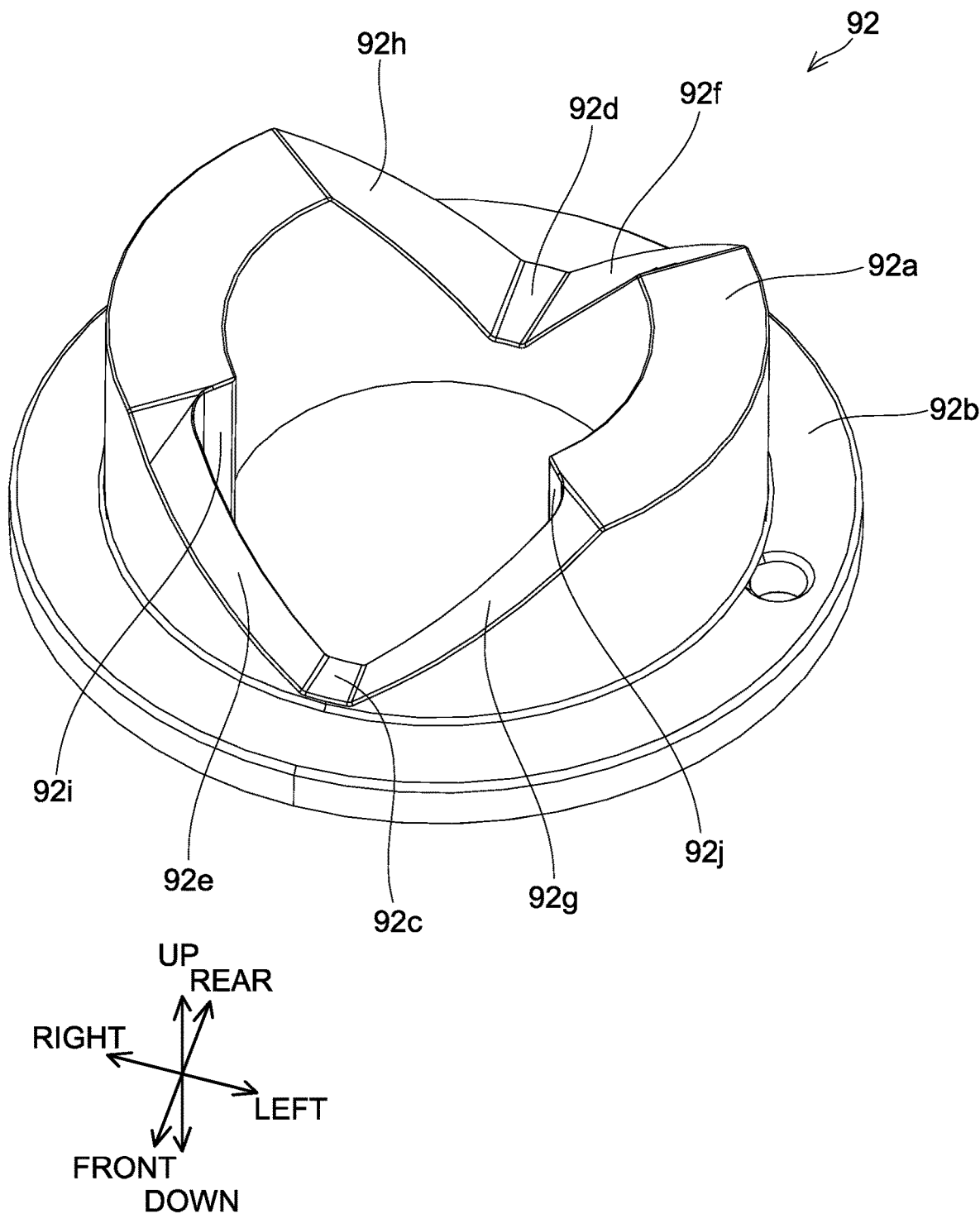
FIG. 15 is a perspective view seeing a fixed cam member 92 of the handle unit 8 of the embodiment from front left upper side.

As shown in FIG. 15, the fixed cam member 92 includes a cylinder portion 92a having a substantially cylindrical shape and a flange 92b extending radially outward from a lower end of the cylinder portion 92a. The fixed cam member 92 is fixed to the base member 86 by having the flange 92b fastened on an upper surface of the base member 86 (sec FIG. 12) by a fastening member (not shown). Cam recesses 92c. 92d corresponding to the cam projections 90a, 90b of the movable cam member 90 are defined at an upper portion of the cylinder portion 92a. The cam recesses 92c, 92d respectively have a first cam surface 92e, 92f and a second cam surface 92g, 92h. The first cam surface 92e. 92f corresponds to its corresponding first cam surface 90c, 90d of the movable cam member 90. The second cam surface 92g, 92h corresponds to its corresponding second cam surface 90e, 90f of the movable cam member 90, further, stopper portions 92i, 92j are arranged on an inner circumferential surface of the cylinder portion 92a. As shown in FIG. 16, the stopper portions 92i, 92j are configured to restrict a rotatable pivotable range of the handle shaft 84 by coming into abutment with the guiding protrusion 84a of the handle shaft 84 when the handle shaft 84 pivots relative to the fixed cam member 92.

Figure 17:
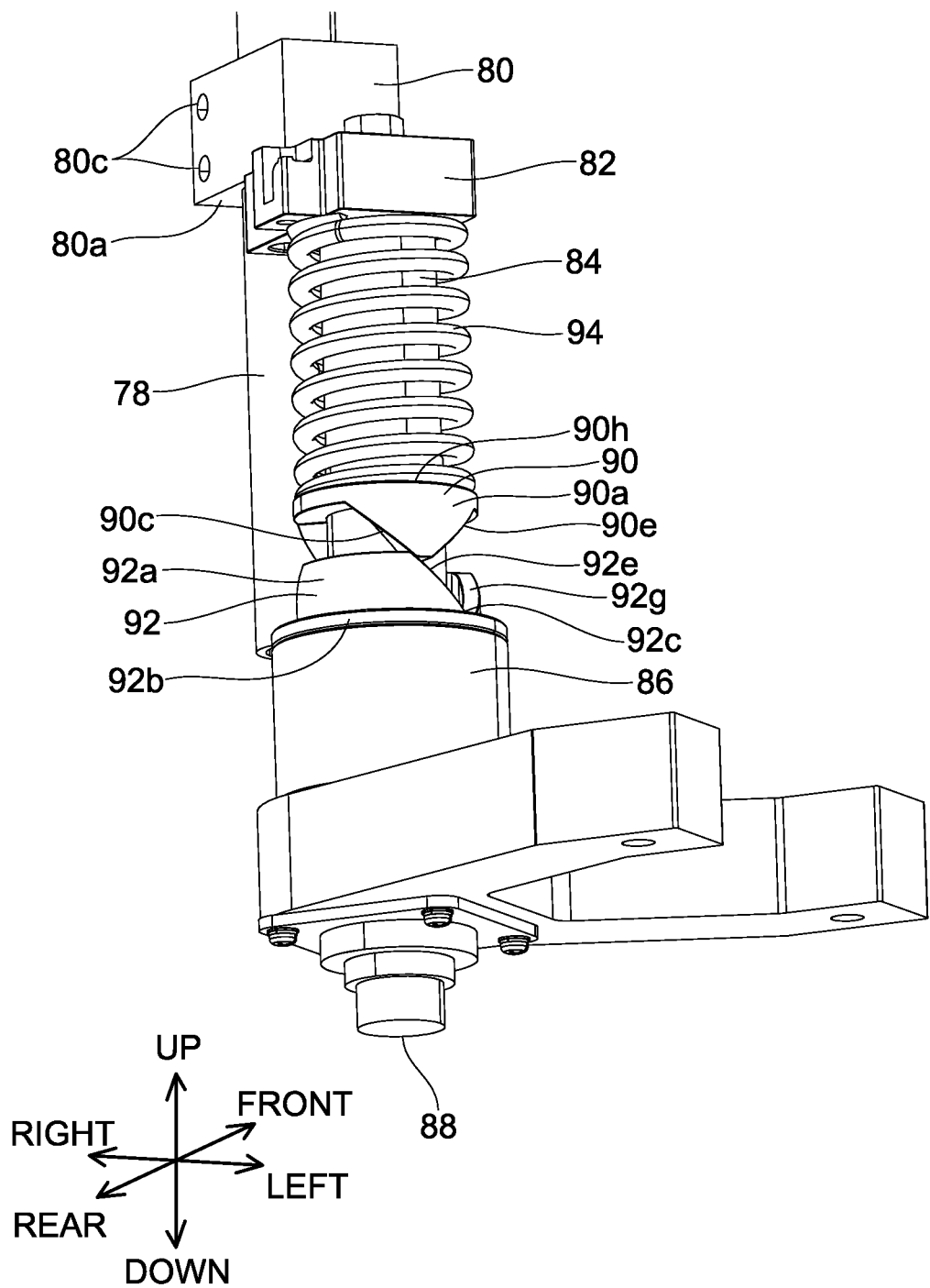
FIG. 17 is a perspective view seeing the lower part of the handle unit 8 of the embodiment from the front right lower side in a state where the operation of steering rightward is performed on the handle unit 8.

In the handle unit 8 shown in FIG. 11, when the user rotates the steering handle 73 in a clockwise (or counterclockwise) direction as seen from above, the handle shaft 84 pivots in the clockwise (or counterclockwise) direction. At this occasion, as shown in FIG. 17, due to the movable cam member 90 pivoting integrally with the handle shaft 84, the first cam surface 90*c*, 90*d* (or the second cam surface 90*e*, 90*f*) of the movable cam member 90 slides relative to the first cam surface 92*e*, 92*f* (or the second cam surface 92*g*, 92*h*) of the fixed cam member 92, as a result of which the movable cam member 90 moves upward against the biasing force of the coil spring 94 as it pivots relative to the fixed cam member 92. In operating as such, torque generated by a reaction force which the movable cam member 90 receives from the fixed cam member 92 acts on the user rotating the steering handle 73.

(Steering Unit 10)

Figure 18:
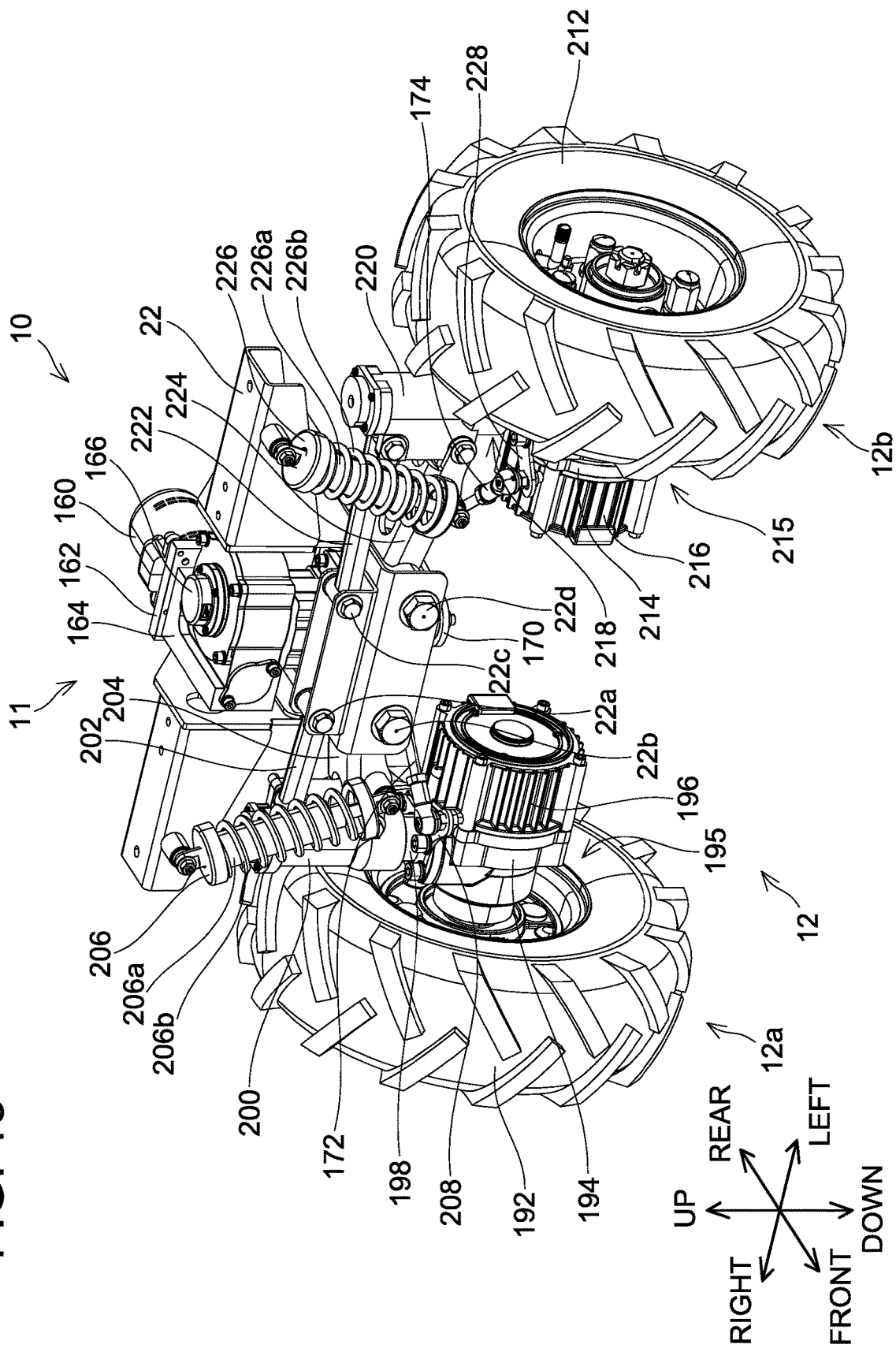
FIG. 18 is a perspective view seeing a steering unit 10 and a front wheel unit 12 of the embodiment from the front left upper side.

As shown in FIG. 18, the steering unit 10 is attached to the from support member 22 below the from portion of the base plate 20 of the carriage unit (sec FIG. 2). The steering unit 10 is linked to the front wheel unit 12, and is configured to steer the front wheel unit 12.

Figure 19:
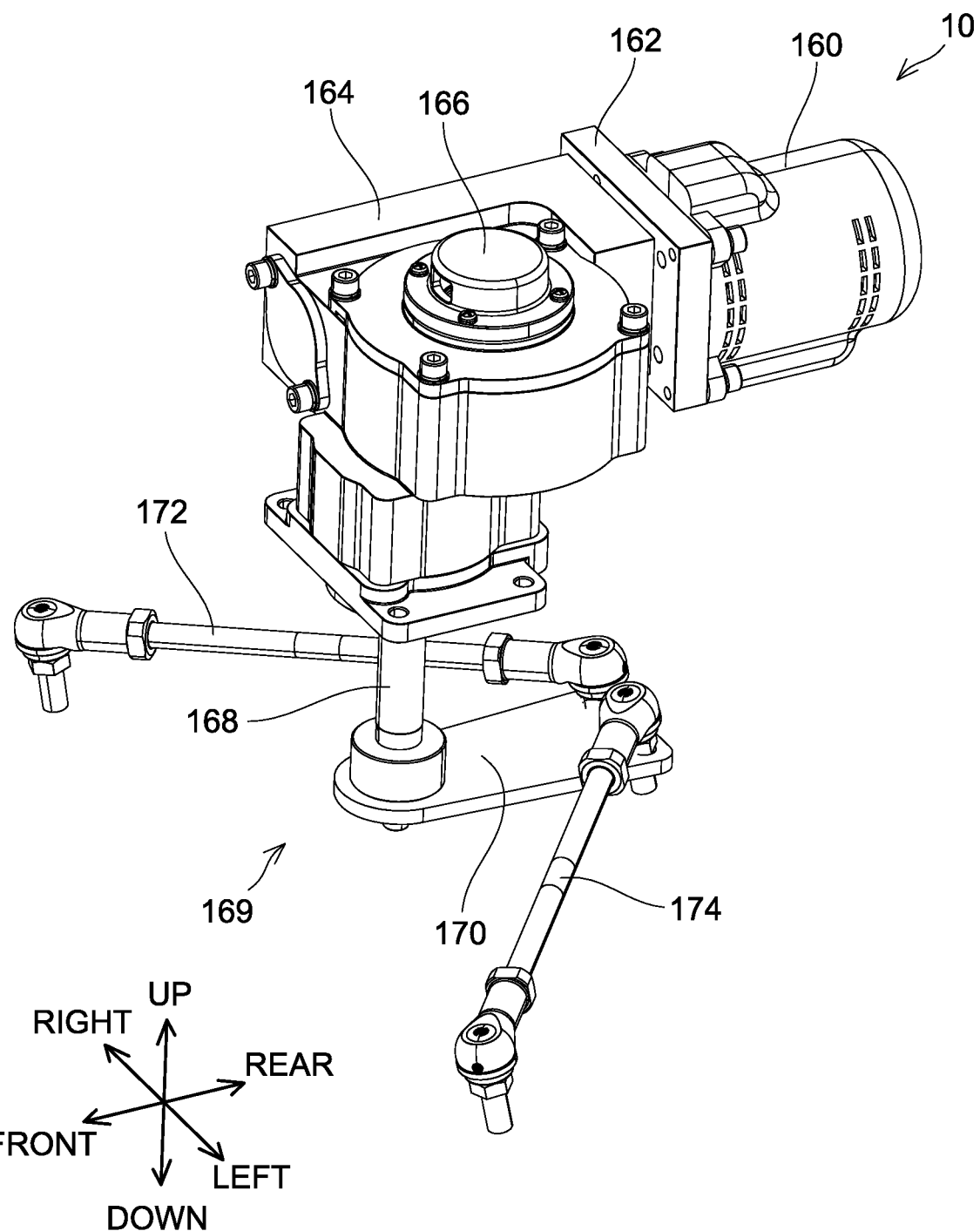
FIG. 19 is a perspective view seeing the steering unit 10 of the embodiment from the front left upper side.

As shown in FIG. 19, the steering unit 10 includes a motor housing 160, a motor support member 162, a gear housing 164, a steering angle sensor 166, a steering shaft 168, a steering plate 170, a right tie rod 172, and a left tie rod 174. The motor housing 160 is fixed to the motor support member 162. The motor support member 162 is fixed to the gear housing 164. The gear housing 164 is fixed to the front support member 22 of the carriage unit 4 (see FIG. 18).

Figure 20:
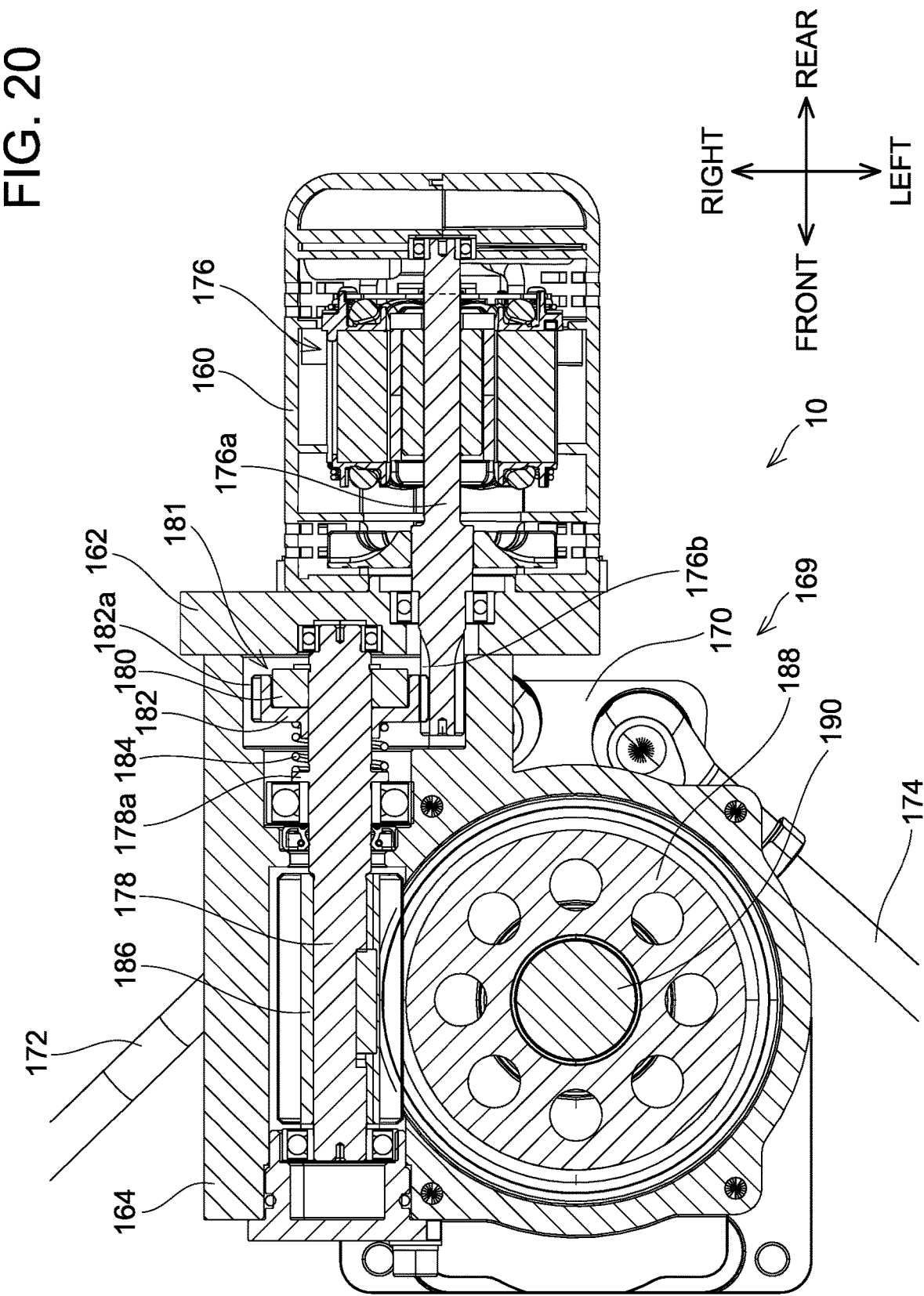
FIG. 20 is a cross-sectional view seeing the steering unit 10 of the embodiment in a cross section along the front-rear direction and the left-right direction.

As shown in FIG. 20, a steering motor 176 is housed inside the motor housing 160. The steering motor 176 may for example be an inner rotor brushless DC motor. The steering motor 176 is electrically connected to the drive control circuit board 46 (sec FIG. 10). The steering motor 176 includes a motor shaft 176*a* extending in the front-rear direction and a Hall sensor 480 (see FIG. 34) configured to detect rotation of the motor shaft 176*a*. The motor shaft 176*a* is rotatably held by the motor housing 160 in the vicinity of its rear end and is rotatably held by the motor support member 162 at its front portion. The front portion of the motor shaft 176*a* penetrates through the motor support member 162 and enters into the gear housing 164. A gear portion 176*b* is arranged in the vicinity of a front end of the motor shaft 176*a*.

A spindle 178, a cam wheel 180, a movable gear 182, a coil spring 184, a cylindrical worm 186, a worm wheel 188, and a relay shaft 100 are housed in the gear housing 164. The spindle 178 is arranged along the front-rear direction. The spindle 178 is rotatably held by the gear housing 164 in the vicinity of its front end and its rear portion. Further, the spindle 178 is rotatably held by the motor support member 162 in the vicinity of its rear end.

Figure 21:
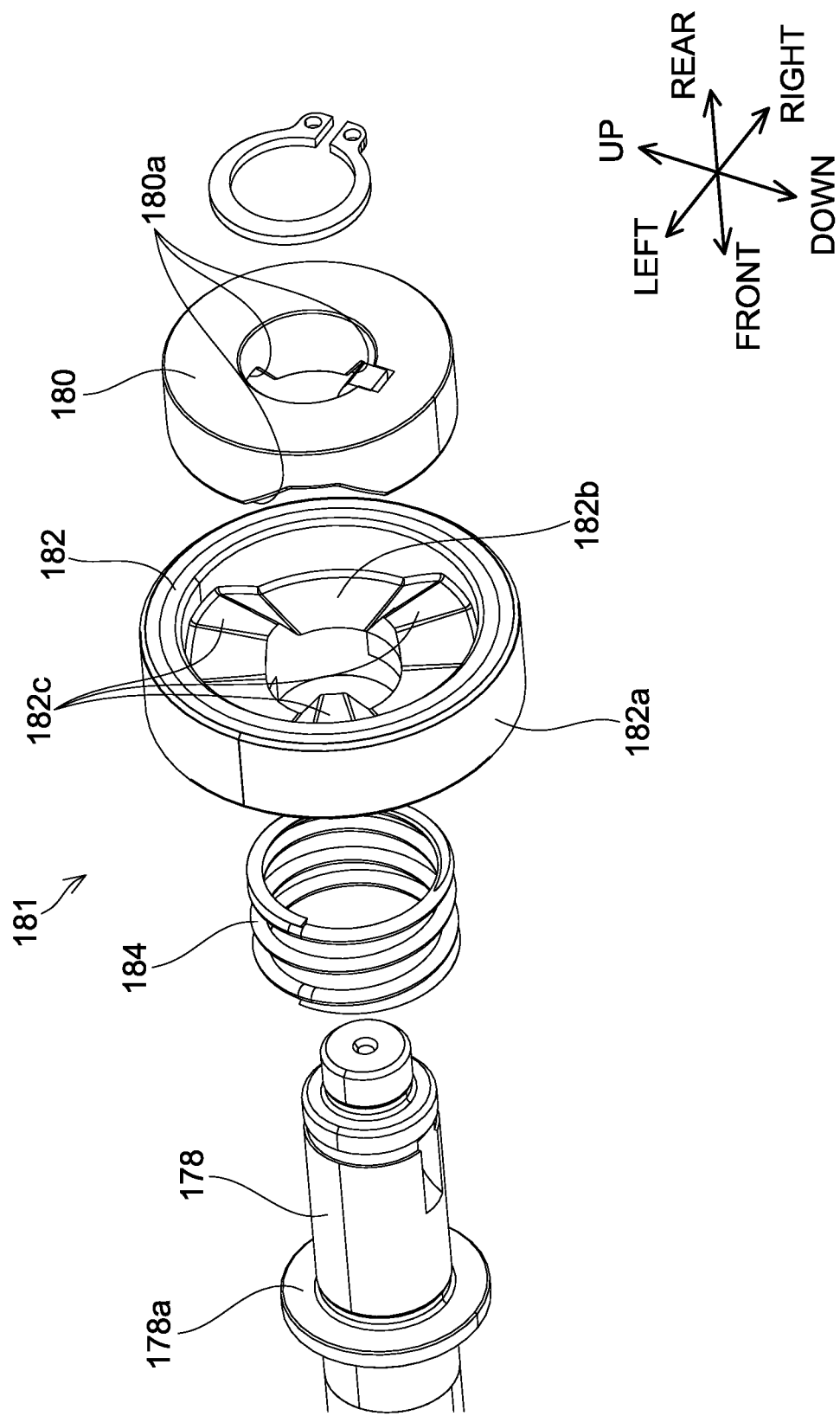
FIG. 21 is a disassembled perspective view seeing a spindle 178, a cam wheel 180, a movable gear 182, and a coil spring 184 of the steering unit 10 of the embodiment from the rear left lower side.

The cam wheel 180 is fixed to the vicinity of the rear end of the spindle 178. As shown in FIG. 21, cam grooves 180*a* are defined in a front surface of the cam wheel 180. The movable gear 182 is attached to the spindle 178 at a position frontward from the cam wheel 180. The movable gear 182 is held by the spindle 178 so as to be configured capable of moving in the front-rear direction relative to the spindle 178 and capable of rotating about the front-rear direction. A gear unit 182*a* configured to mesh with the gear portion 176*b* of the motor shaft 176*a* is arranged on an outer circumferential surface of the movable gear 182 (see FIG. 20). A recess 182*b* into which the cam wheel 180 is to enter is defined in a rear portion of the movable gear 182. Cam projections 182*c* corresponding to the cam grooves 180*a* of the cam wheel 180 are arranged in the recess 182*b*. The coil spring 184 is attached to the spindle 178 at a position frontward from the movable gear 182. The coil spring 184 is held by a spring receiving portion 178*a* arranged on the spindle 178. The coil spring 184 is configured to bias the movable gear 182 backward relative to the spindle 178.

When the motor shaft 176*a* (see FIG. 20) rotates, the movable gear 182 also rotates. In a case where the cam projections 182*c* of the movable gear 182 are engaged with the cam grooves 180*a* of the cam wheel 180, the cam wheel 180 rotates accompanying rotation of the movable gear 182, as a result of which the spindle 178 also rotates. When torque acting between the movable gear 182 and the cam wheel 180 is small, engagement of the cam projections 182*c* and the cam grooves 180*a* is maintained by a biasing force of the coil spring 184, and transmission of the rotation from the motor shaft 176*a* to the spindle 178 is maintained. Contrary to this, when the torque acting between the movable gear 182 and the cam wheel 180 is large, the movable gear 182 moves forward against the biasing force of the coil spring 184, by which the engagement of the cam projections 182*c* and the cant grooves 180*a* is released, and the transmission of the rotation from the motor shaft 176*a* to the spindle 178 is thereby blocked. That is, a torque limiter 181 is constituted by the cam wheel 180, the movable gear 182, and the coil spring 184.

Figure 22:
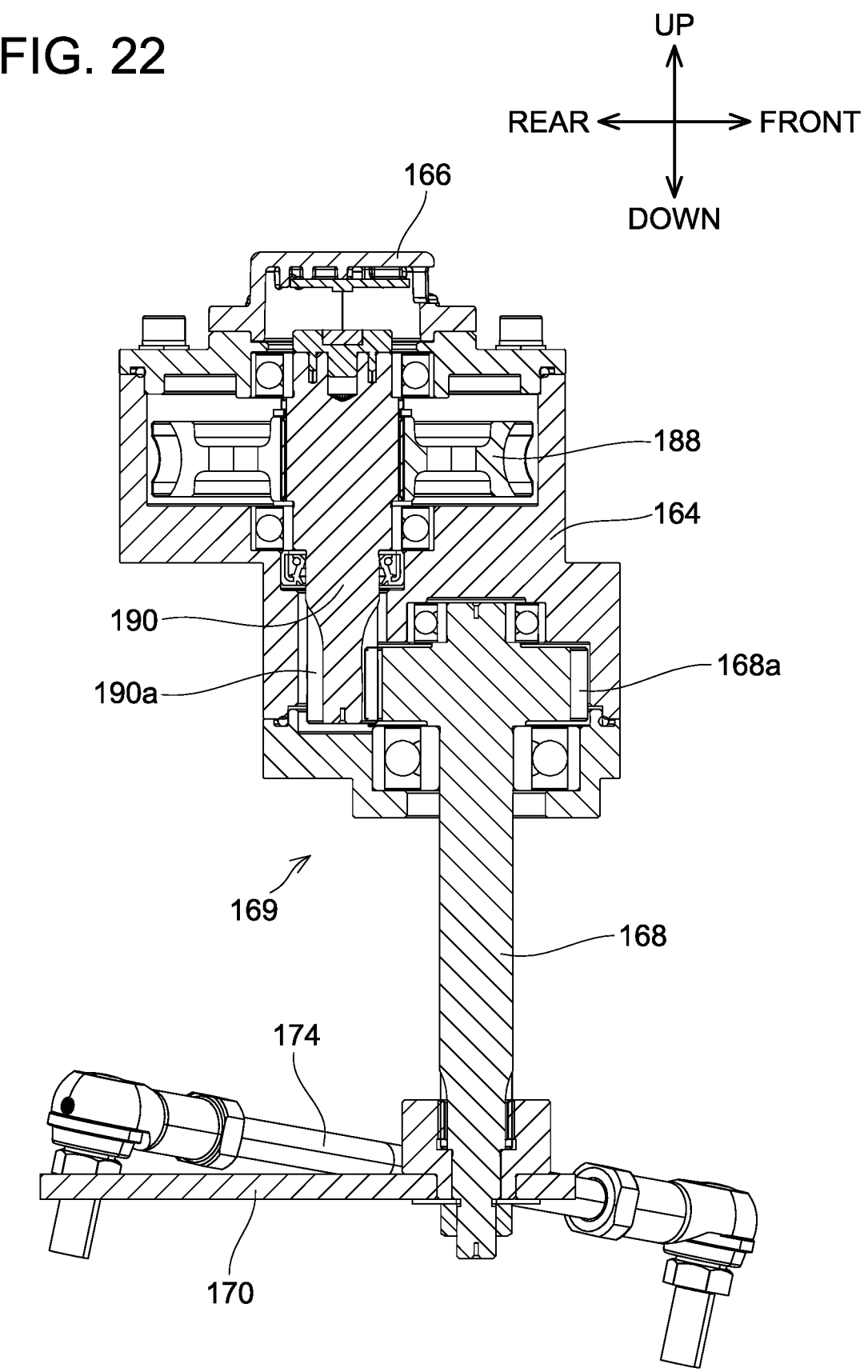
FIG. 22 is a cross-sectional view seeing the steering unit 10 of the embodiment in a cross section along the front-rear direction and the up-down direction.

As shown in FIG. 20, the cylindrical worm 186 is fixed to a front portion of the spindle 178. The worm wheel 188 is arranged to mesh with the cylindrical worm 186. As shown in FIG. 22, the worm wheel 188 is fixed to art upper portion of the relay shaft 190. The relay shaft 190 is arranged along the up-down direction. The relay shaft 190 is rotatably held by the gear housing 164 in the vicinity of its upper end and at its center portion. A gear unit 190*a* is arranged in the vicinity of a lower end of the relay shaft 190.

The steering angle sensor 166 is fixed to an upper portion of the gear housing 164. The steering angle sensor 166 is coupled to the upper end of the relay shaft 190. The steering angle sensor 166 is configured to detect a rotation angle of the relay shaft 190 relative to the gear housing 164. The steering angle sensor 166 may tor example be a potentiometer configured to detect a change in an electric resistance that occurs in accordance with a change in the rotation angle. Alternatively, the steering angle sensor 166 may be a magnetic rotary sensor having a Hall element of which position is fixed relative to the gear housing 164 and a permanent magnet of which position is fixed relative to the relay shaft 190. The steering angle sensor 166 is electrically connected to the main control circuit board 44 (see FIG. 9).

The steering shaft 168 is rotatably held by the gear housing 164 in the vicinity of its upper end and at its upper portion. The steering shaft 168 is arranged along the up-down direction. A gear unit 168*a* configured to mesh with the gear unit 190*a* of the relay shaft 190 is arranged at the upper portion of the steering shall 168. A lower end of the steering shaft 168 is fixed to the vicinity of a front end of the steering plate 170. As shown in FIG. 19, the steering plate 170 has a narrow flat plate shape having its longitudinal direction along the front-rear direction and its short direction along the left-right direction. A rear end of the right tie rod 172 and a rear end of the left tie rod 174 are respectively coupled in the vicinity of a rear end of the steering plate 170. The rear end of the right tie rod 172 is coupled to the steering plate 170 so as to be pivotable about two axes orthogonal to the longitudinal direction of the right tie rod 172. The rear end of the left tie rod 174 is coupled to the steering plate 170 so as to be pivotable about two axes orthogonal to the longitudinal direction of the left tie rod 174.

As shown in FIG. 20, when the spindle 178 rotates by the rotation of the motor shaft 176*a*, the rotation of the spindle 178 is transmitted to the relay shall 190 through the cylindrical worm 186 and the worm wheel 188. As shown in FIG. 22, when the relay shaft 190 pivots, the steering shaft 168 pivots accordingly, and the rear end of the steering plate 170 pivots in the left-right direction. Due to the steering plate 170 pivoting as above, the right tie rod 172 and the left tie rod 174 as shown in FIG. 19 move, and steering of the front wheel unit 12 is thereby performed. In the following description, the steering shaft 168, the steering plate 170, the right tie rod 172, the left tie rod 174, the spindle 178, the torque limiter 181, the cylindrical worm 186, the worm wheel 188, and the relay shaft 190 may collectively be termed a transmission mechanism 169.

In the manual mode, the main control circuit board 44 (see FIG. 9) calculates a steering angle that should be realized in the steering unit 10 based on a detection signal from the rotation angle sensor 88 of the handle unit 8 (see FIG. 11). Then, the main control circuit board 44 calculates a rotation angle that should be realized in the steering motor 176 based on the steering angle that should be realized in the steering unit 10, and instructs the drive control circuit board 46 to actuate the steering motor 176. Due to this, the steering angle responsive to the user operation on the handle unit 8 is realized in the steering, unit 10.

(Front Wheel Unit 12)

As shown in FIG. 18, the front wheel unit 12 is attached to the front support member 22 below the front portion of the base plate 20 of the carriage unit 4 (see FIG. 2). The front wheel unit 12 includes a right front wheel unit 12*a* and a left front wheel unit 12*b*. The right front wheel unit 12*a* includes a right front wheel 192, a right gear housing 194, a right motor housing 196, a right kingpin 198, a right sleeve 200, a right upper arm 202, a right lower arm 204, a right buffer member 206, and a right steering plate 208. The left front wheel unit 12*b* includes a left front wheel 212, a left gear housing 214, a left motor housing 216, a left kingpin 218, a left sleeve 220, a left upper arm 222, a left lower arm 224, a left buffer member 226, and a left steering plate 228. In the following description, the right gear housing 194, the right kingpin 198, the right sleeve 200, and the right steering plate 208 may collectively be termed a right holding member 195, and the left gear housing 214, the left kingpin 218, the left sleeve 220, and the left steering plate 228 may collectively be termed a left holding member 215. Further, the right holding member 195, the right upper arm 202, the right lower arm 204, the right buffer member 206, the left holding number 215, the left upper arm 222, the left lower arm 224, the left buffer member 226, and the steering unit 10 may collectively be termed a suspension mechanism 11.

Figure 23:
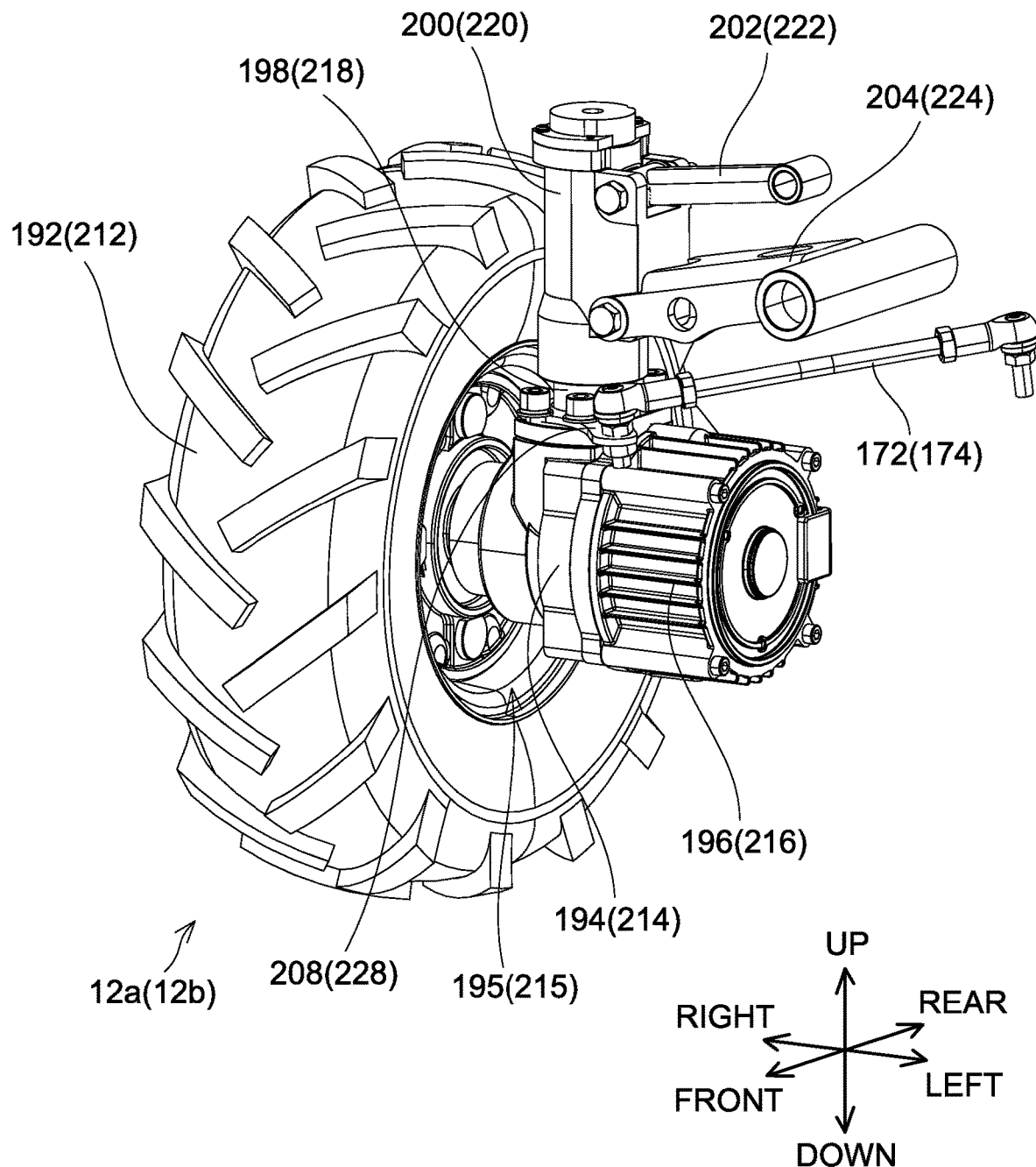
FIG. 23 is a perspective view seeing a right front wheel unit 12a of the embodiment from the front left upper side.
Figure 24:
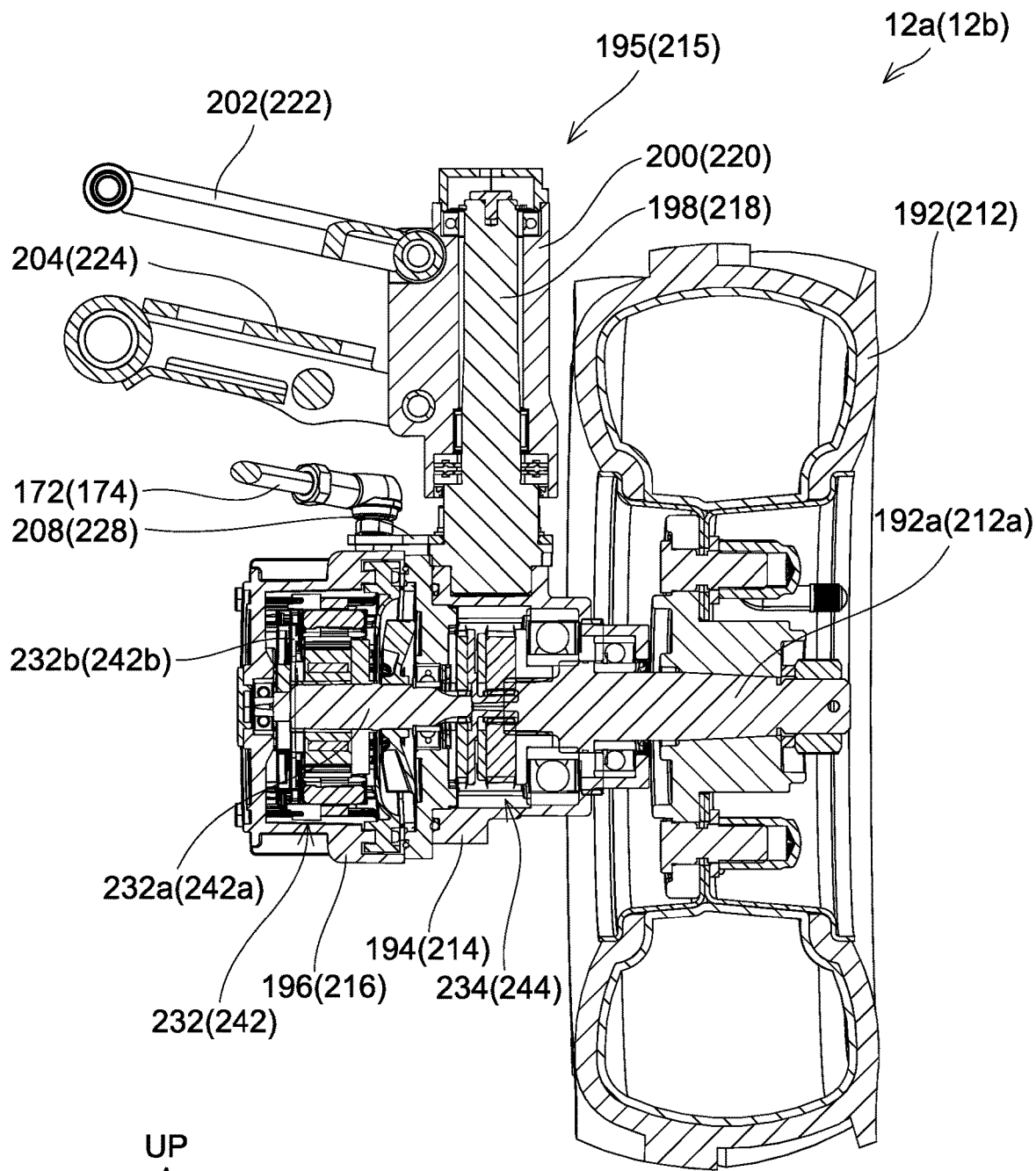
FIG. 24 is a cross-sectional view seeing the right front wheel unit 12a of the embodiment in a cross section along the left-right direction and the up-down direction.

As shown in FIG. 23, the right gear housing 194 is arranged to the left of the right front wheel 192. The right motor housing 196 is fixed to a left portion of the right gear housing 194. As shown in FIG. 24, a right front wheel motor 232 is housed inside the right motor housing 196. The right front wheel motor 232 may for example be an inner rotor brushless DC motor. The right front wheel motor 232 is electrically connected to the drive control circuit board 46 (see FIG. 10). The right front wheel motor 232, includes a right front wheel motor shaft 232*a* extending in the left-right direction and a Hall sensor 482 configured to detect rotation of the right front wheel motor shaft 232*a* (see FIG. 32). The right front wheel motor shaft 232*a* is rotatably held by the right motor housing 196 in the vicinity of its left end, and is rotatably held by the right gear housing 194 in live vicinity of its right end. The right front wheel 192 includes a right front wheel axle 192*a* extending leftward. The right front wheel axle 192*a* is rotatably held by the right gear housing 194 in the vicinity of its left end. A planetary gear mechanism 234 is housed inside the right gear housing 194. The planetary gear mechanism 234 is configured to decelerate the rotation of the right front wheel motor shaft 232*a* and transmit the same to the right front wheel axle 192*a*. When the right front wheel motor 232 is driven, the rotation of the right front wheel motor shaft 232*a* is transmitted to the right front wheel axle 192*a* through the planetary gear mechanism 234, as a result of which the right front wheel 192 rotates.

The right kingpin 198 is fixed to an upper portion of the right gear housing 194. The right kingpin 198 extends along the up-down direction. An upper portion of the right kingpin 198 enters inside the right sleeve 200. The right kingpin 198 is rotatably held by the right sleeve 200 in vicinities of upper and lower ends of the right sleeve 200. As shown in FIG. 23, a right end of the right upper arm 202 is coupled to an upper portion of the right sleeve 200 so as to be pivotable about a pivot axis along the front-rear direction. A right end of the right lower arm 204 is coupled to a lower portion of the right sleeve 200 so as to be pivotable about a pivot axis along the front-rear direction. As shown in FIG. 18, a left end of the right upper arm 202 is coupled to a right upper coupling portion 22*a* of the front support member 22 so as to be pivotable about a pivot axis along the front-rear direction. A left end of the right lower arm 204 is coupled to a right lower coupling portion 22*b* of the front support member 22 so as to be pivotable about a pivot axis along the front-rear direction. Due to this, the right sleeve 200 is supported by the front support member 22 so as to be movable within a movable range of the right upper arm 202 and the right lower arm 204.

The right buffer member 206 includes a damper 206*a* and a coil spring 206*b*. An upper end of the right buffer member 206 is coupled to a front surface of the front support member 22 so as to be pivotable about a pivot axis along the front-rear direction. A lower end of the right buffer member 206 is coupled to a front surface of the right lower arm 204 so as to be pivotable about a pivot axis along the front-rear direction. Due to this, when the right front wheel 192 moves in the up-down direction relative to the front support member 22, impacts and vibration from the right front wheel 192 are suppressed from being transmitted to the carriage unit 4 by a damping force of the damper 206*a* and an elastic restoration force of the coil spring 206*b*.

As shown in FIG. 23, the right steering plate 208 is fixed to the vicinity of a lower end of the right kingpin 198. A front end of the right tie rod 172 is coupled to a left front end of the right steering plate 208 so as to be pivotable about two axes orthogonal to the longitudinal direction of the right tie rod 172. When the right front wheel unit 12*a* is seen from above, the right tie rod 172 intersects with the right upper arm 202 and the right lower arm 204. When the front wheel unit 12 is steered to the right (or left), a rear end of the steering plate 170 (see FIG. 19) moves rightward (or leftward), by which the right steering plate 208, the right kingpin 198, the right gear housing 194, the right motor housing 196, and the right front wheel 192 pivot clockwise (or counterclockwise) relative to the right sleeve 200 with an axial direction of the right kingpin 198 as their pivoting axes in a top view seeing the right sleeve 200 from above.

As shown in FIG. 18, the left front wheel unit 12*b* has a configuration that is in a left-right symmetric relationship with the right front wheel unit 12*a*. Hereinbelow, the left front wheel unit 12b will be described with reference to FIGS. 23 and 24 showing the right front wheel unit 12a.

As shown in FIG. 23, the left gear housing 214 is arranged to the right of the left front wheel 212. The left motor housing 216 is fixed to a right portion of the left gear housing 214. As shown in FIG. 24, a left front wheel motor 242 is housed inside the left motor housing 216. The left front wheel motor 242 may for example be an inner rotor brushless DC motor. The left front wheel motor 242 is electrically connected to the drive control circuit board 48 (see FIG. 10). The left front wheel motor 242 includes a left front wheel motor shaft 242a extending in the left-right direction and a Hall sensor 484 configured to detect rotation of the left front wheel motor shaft 242a (see FIG. 32). The left front wheel motor shaft 242a is rotatably held by the left motor housing 216 in the vicinity of its right end, and is rotatably held by the left gear housing 214 in the vicinity of its left end. The left front wheel 212 includes a left axle 212a extending rightward. The left axle 212a is rotatably held by the left gear housing 214 in the vicinity of its right end. A planetary gear mechanism 244 is housed inside the left gear housing 214. The planetary gear mechanism 244 is configured to decelerate the rotation of the left front wheel motor shaft 242a and transmit the same to the left axle 212a. When the left front wheel motor 242 is driven, the rotation of the left front wheel motor shall 242a is transmitted to the left axle 212a through the planetary gear mechanism 244, as a result of which the left front wheel 212 rotates.

The left kingpin 218 is fixed to an upper portion of the left gear housing 214. The left kingpin 218 extends along the up-down direction. An upper portion of the left kingpin 218 enters inside the left sleeve 220. The left kingpin 218 is rotatably held by the left sleeve 220 in vicinities of upper and lower ends of the left sleeve 220. As shown in FIG. 23, a left end of the left upper arm 222 is coupled to an upper portion of the left sleeve 220 so as to be pivotable about a pivot axis along the front-rear direction. A left end of the left lower arm 224 is coupled to a lower portion of the left sleeve 220 so as to the pivotable about a pivot axis along the front-rear direction. As shown in FIG. 18, a right end of the left upper arm 222 is coupled to a left upper coupling portion 22c of the front support member 22 so as to be pivotable about a pivot axis along the front-rear direction. A right end of the left lower arm 224 is coupled to a left lower coupling portion 22d of the front support member 22 so as to be pivotable about a pivot axis along the front-rear direction. Due to this, the left sleeve 220 is supported by the front support member 22 so as to be movable within a movable range of the left upper arm 222 and the left lower arm 224.

The left buffer member 226 includes a damper 226a and a coil spring 226b. An upper end of the left buffer member 226 is coupled to the front surface of the front support member 22 so as to the pivotable about a pivot axis along the front-rear direction. A lower end of the left buffer member 226 is coupled to the front surface of the left lower arm 224 so as to be pivotable about a pivot axis along the front-rear direction. Due to this, when the left front wheel 212 moves in the up-down direction relative to the front support member 22, impacts and vibration from the left front wheel 212 are suppressed from being transmitted to the carriage unit 4 by a damping force of the damper 226a and an elastic restoration force of the coil spring 226b.

As shown in FIG. 23, the left steering plate 228 is fixed to the vicinity of a lower end of the left kingpin 218. A front end of the left tie rod 174 is coupled to a right front end of the left steering plate 228 so as to be pivotable about two axes orthogonal to the longitudinal direction of the left tie rod 174. When the left front wheel unit 12b is seen from above, the left tie rod 174 intersects with the left upper arm 222 and the left lower arm 224. When the front wheel unit 12 is steered to the right (or left), a rear end of the steering plate 170 (see FIG. 19) moves rightward (or leftward), by which the left steering plate 228, the left kingpin 218, the left gear housing 214, the left motor housing 216, and the left front wheel 212 pivot clockwise for counterclockwise) relative to the left sleeve 220 with an axial direction of the left kingpin 218 as their pivoting axes in a top view seeing the left sleeve 220 from above.

(Rear Wheel Unit 14)

Figure 25:
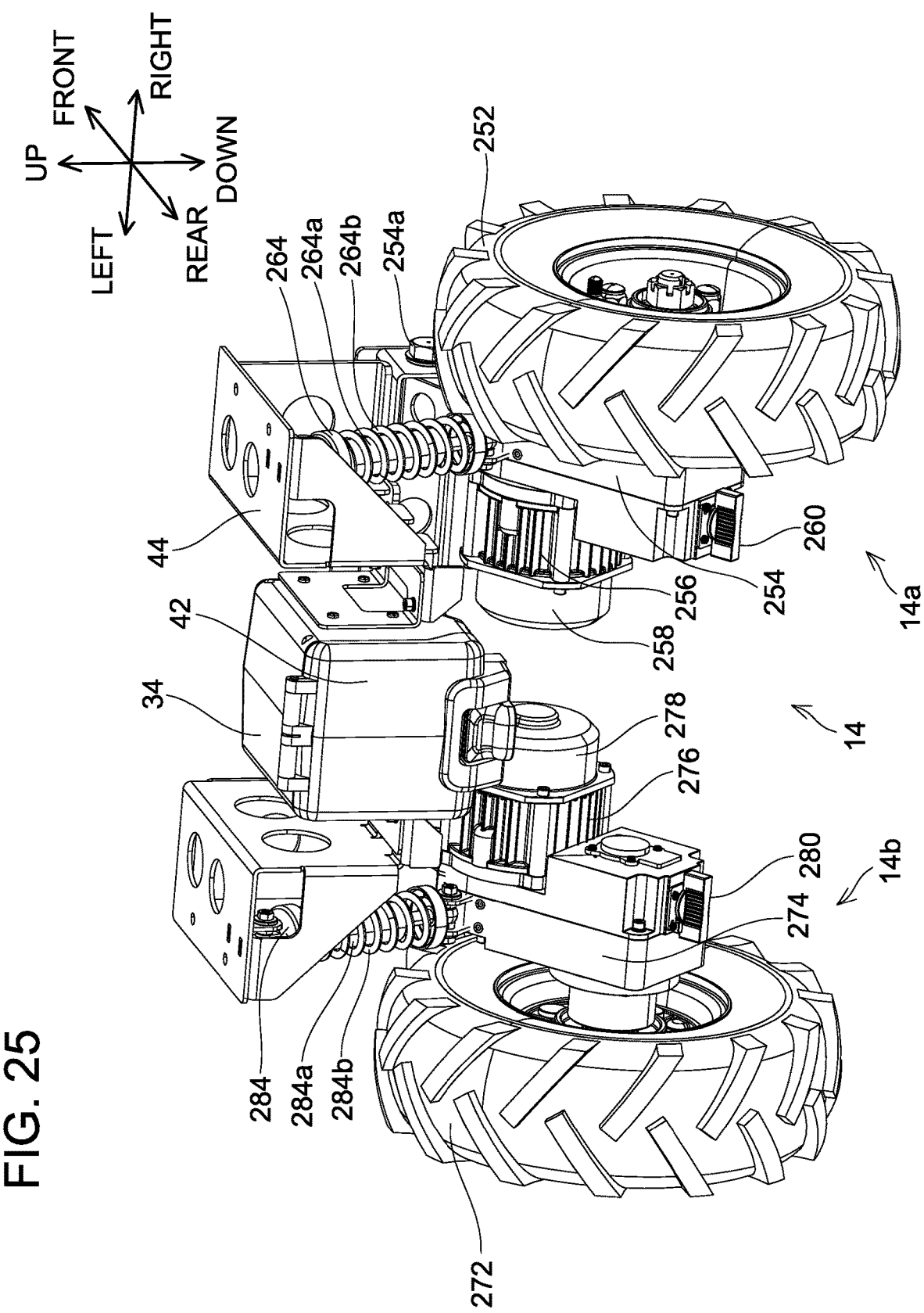
FIG. 25 is a perspective view seeing a rear wheel unit 14 of the embodiment from the rear right upper side.

As shown in FIG. 25, the rear wheel unit 14 is attached to the rear support member 24 below a rear portion of the base plate 20 of the carriage unit 4 (see FIG. 2). The rear wheel unit 14 includes a right rear wheel unit 14a and a left rear wheel unit 14b. The right rear wheel unit 14a includes a right rear wheel 252, a right gear housing 254, a right motor housing 256, a right brake housing 258, a right clutch lever 260, and a right buffer member 264. The left rear wheel unit 14b include a left rear wheel 272, a left gear housing 274, a left motor housing 276, a left brake housing 278, a left clutch lever 280, and a left buffer member 284.

Figure 26:
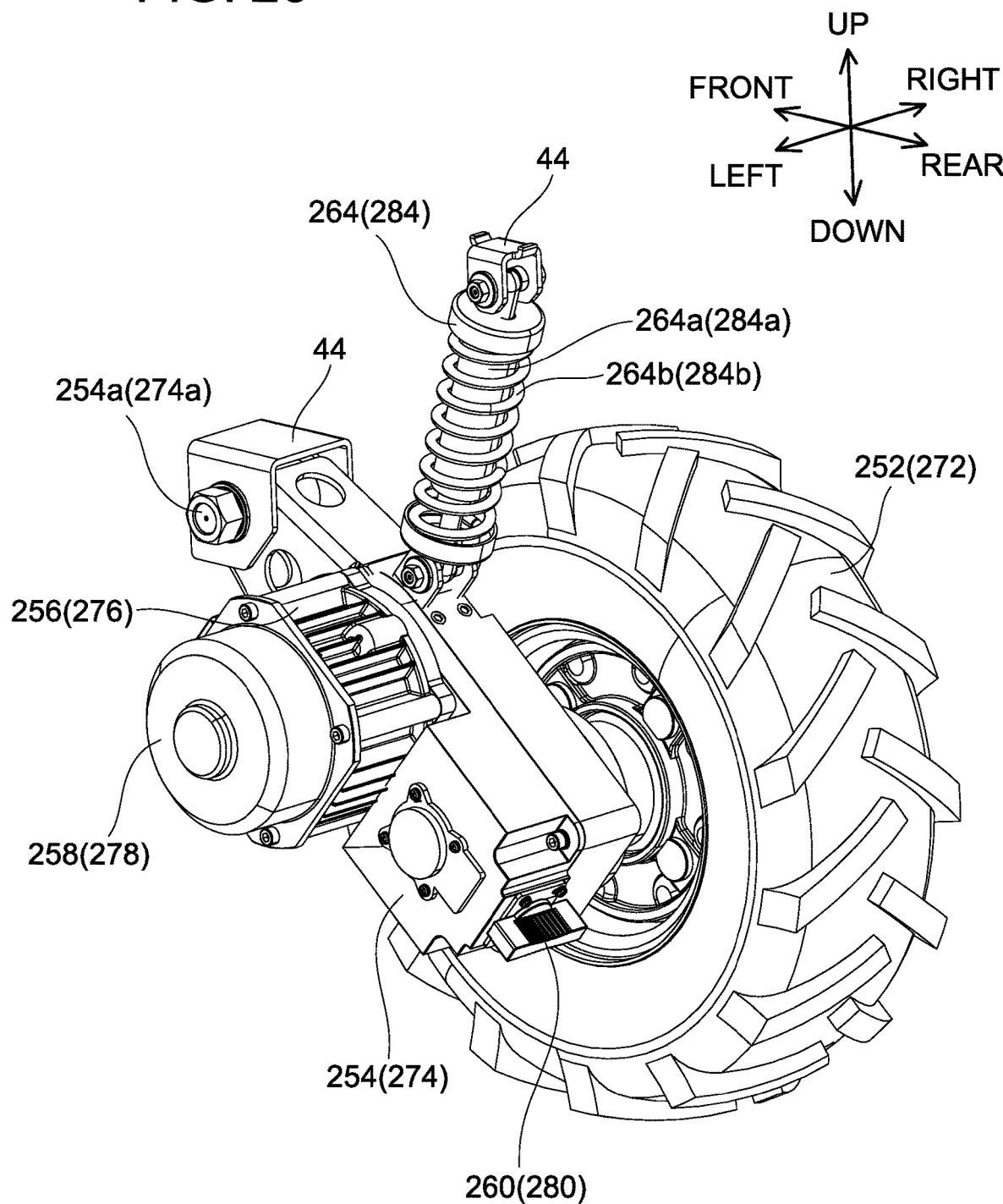
FIG. 26 is a perspective view seeing a right rear wheel unit 14a of the embodiment from the rear left upper side.

As shown in FIG. 26, the right gear housing 254 is arranged to the left of the right rear wheel 252 and rotatably holds a right rear wheel axle (not shown) of the right rear wheel 252. The right gear housing 254 extends upward toward the front from the right rear wheel axle. The right motor housing 256 is fixed to the left of a front upper portion of the right gear housing 254. The right brake housing 258 is fixed to the left of the right motor housing 256. A right rear wheel motor 486 (sec FIG. 30) is housed in the right motor housing 256. The right rear wheel motor 486 may for example be an inner rotor brushless DC motor. The right rear wheel motor 486 is electrically connected to the drive control circuit board 46 (see FIG. 10). The right rear wheel motor 486 includes a right rear wheel motor shaft (not shown) extending in the left-right direction and a Hall sensor 488 configured to detect rotation of the right rear wheel motor shaft (see FIG. 32). A right rear wheel electromagnetic brake 490 (see FIG. 30) is housed in the right brake housing 258. The right rear wheel electromagnetic brake 490 is coupled to the right rear wheel motor shaft. The right rear wheel electromagnetic brake 490 is configured to switch between a state allowing the right rear wheel motor shaft to rotate and a state prohibiting the same from rotating. The right rear wheel electromagnetic brake 490 is electrically connected to the drive control circuit board 46 (see FIG. 10). In the parking mode, the right rear wheel electromagnetic brake 490 is maintained in the state prohibiting the right rear wheel motor shaft from rotating.

A spur gear mechanism (not shown) and a clutch mechanism (not shown) are housed in the right gear housing 254. The spur gear mechanism is configured to decelerate the rotation of the right rear wheel motor shaft and transmits the same to the right rear wheel axle. When the right rear wheel motor 486 is driven, the rotation of the right rear wheel motor shaft is transmitted to the right rear wheel axle through the spur gear mechanism, and the right rear wheel 252 thereby rotates. The clutch mechanism is configured to switch between a state allowing transmission of the rotation from the right rear wheel motor shaft to the right rear wheel axle and a state prohibiting to do so in response to an operation performed on the right clutch lever 260. Due to this, by switching the clutch mechanism to the state prohibiting the transmission of the rotation from the right rear wheel motor shaft to the right rear wheel axle when the right rear wheel electromagnetic brake 490 prohibits the rotation of the right rear wheel motor shaft, the right rear wheel 252 can be suppressed from being locked.

A coupling portion 254a is arranged in the vicinity of a front upper end of the right gear housing 254. The coupling portion 254a is coupled to the rear support member 24 so as to be pivotable about a pivot axis along the left-right direction. The right buffer member 264 includes a damper 264a and a coil spring 264b. An upper end of the right buffer member 264 is coupled to the rear support member 24 at a rear upper portion from the coupling portion 254a so as to be pivotable about a pivot axis along the left-right direction. A lower end of the right buffer member 264 is coupled to a rear upper surface of the right gear housing 254 so as to be pivotable about a pivot axis along the left-right direction. Due to this, when the right rear wheel 252 moves in the up-down direction relative to the rear support member 24, impacts and vibration from the right rear wheel 252 are suppressed from being transmitted to the carriage unit 4 by a damping force of the damper 264a and an elastic restoration force of the coil spring 264b.

As shown in FIG. 25, the left rear wheel unit 14b has a configuration that is in a left-right symmetric relationship with the right rear wheel unit 14a. Hereinbelow, the left rear wheel unit 14b will be described with reference to FIG. 26 showing the right rear wheel unit 14a.

As shown in FIG. 26, the left gear housing 274 is arranged to the right of the left rear wheel 272 and rotatably holds a left rear wheel axle (not shown) of the left rear wheel 272. The left gear housing 274 extends upward toward the front from the left rear wheel axle. The left motor housing 276 is fixed to the right of a front upper portion of the left gear housing 274. The left brake housing 278 is fixed to the right of the left motor housing 276. A left rear wheel motor 492 (see FIG. 30) is housed in the left motor housing 276. The left rear wheel motor 492 may for example be an inner rotor brushless DC motor. The left rear wheel motor 492 is electrically connected to the drive control circuit board 48 (see FIG. 10). The left rear wheel motor 492 includes a left rear wheel motor shaft (not shown) extending in the left-right direction and a Hall sensor 494 configured to detect rotation of the left rear wheel motor shaft (see FIG. 32). A left rear wheel electromagnetic brake 496 (see FIG. 30) is housed in the left brake housing 278. The left rear wheel electromagnetic brake 496 is coupled to the left rear wheel motor shaft. The left rear wheel electromagnetic brake 496 is configured to switch between a state allowing the left rear wheel motor shaft to rotate and a state prohibiting the same from rotating. The left rear wheel electromagnetic brake 496 is electrically connected to the drive control circuit board 48 (see FIG. 10). The drive control circuit board 48 is configured to control operations of the left rear wheel electromagnetic brake 496. In the parking mode, the left rear wheel electromagnetic brake 496 is maintained in the state prohibiting the left rear wheel motor shaft from rotating.

A spur gear mechanism (not shown) and a clutch mechanism (not shown) are housed in the left gear housing 274. The spur gear mechanism is configured to decelerate the rotation of the left rear wheel motor shaft and transmit the same to the left rear wheel axle. When the left rear wheel motor 492 is driven, the rotation of the left rear wheel motor shaft is transmitted to the left rear wheel axle through the spur gear mechanism, and the left rear wheel 272 thereby rotates. The clutch mechanism is configured to switch between a state allowing transmission of the rotation from the left rear wheel motor shaft to the left rear wheel axle and a state prohibiting to do so in response to an operation performed on the left clutch lever 280. Due to this, by switching the clutch mechanism to the state prohibiting the transmission of the rotation from the left rear wheel motor shaft to the left rear wheel axle when the left rear wheel electromagnetic brake 496 prohibits the rotation of the left rear wheel motor shaft, tie left rear wheel 272 can be suppressed from being locked.

A coupling portion 274a is arranged in the vicinity of a front upper end of the left gear housing 274. The coupling portion 274a is coupled to the rear support member 24 so as to be pivotable about a pivot axis along the left-right direction. The left buffer member 284 includes a damper 284a and a coil spring 284b. An upper end of the left buffer member 284 is coupled to the rear support member 24 at a rear upper portion from the coupling portion 274a so as to be pivotable about a pivot axis along the left-right direction. A lower end of the left buffer member 284 is coupled to a rear upper surface of the left gear housing 274 so as to be pivotable about a pivot axis along the left-right direction. Due to this, when the left rear wheel 272 moves in the up-down direction relative to the rear support member 24, impacts and vibration from the left rear wheel 272 are suppressed from being transmitted to the carriage unit 4 by a damping force of the damper 284a and an elastic restoration force of the coil spring 284b.

(Bumper Unit 16)

Figure 27:
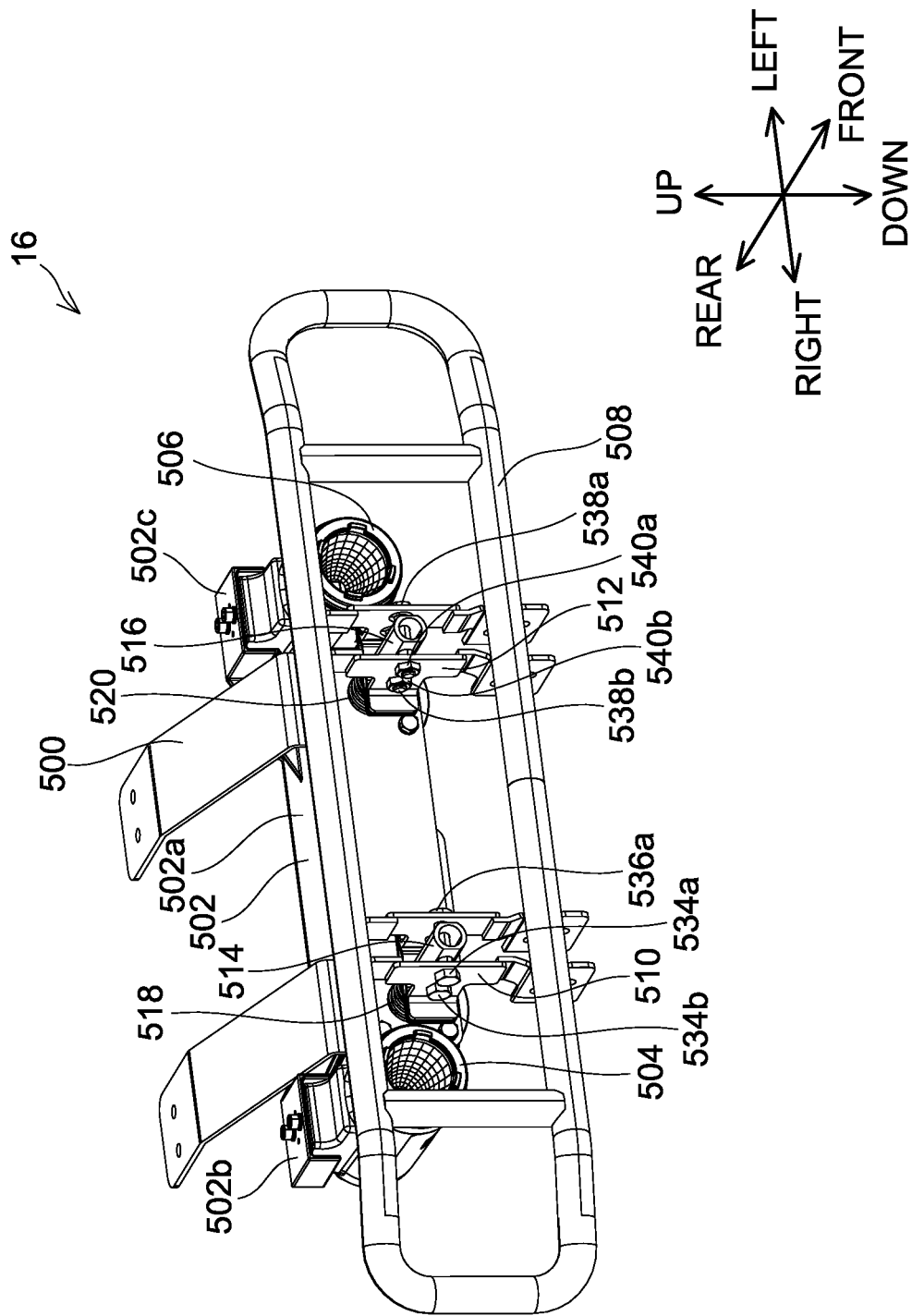
FIG. 27 is a perspective view seeing a bumper unit 16 of the embodiment from the front right upper side.

As shown in FIG. 1, the bumper unit 16 is attached to the front support member 22 below the front portion of the base plate 20 of the carriage unit 4. As shown in FIG. 27, the bumper unit 16 includes a base member 500, a housing 502, a right front lamp 504, a left front lamp 506, a bumper frame 508, bumper support members 510, 512, linear motion pipes 514, 516, coil springs 518, 520, linear motion bearings 522, 524 (see FIG. 28), abutment plates 526, 528 (see FIG. 29), and collision detection switches 530, 532 (see FIG. 29).

The base member 500 is fixed to the front support member 22 of the carriage unit 4 (see FIG. 2). As shown in FIG. 27, the housing 502 is fixed to the base member 500. The housing 502 includes a housing unit 502a having a substantially rectangular box shape with its longitudinal direction along the left-right direction, a right support portion 502b arranged at a right end of the housing unit 502a, and a left support portion 502c arranged at a left end of the housing unit 502a. The right front lamp 504 is fixed to the right support portion 502b. The left front lamp 506 is fixed to the left support portion 502c. The right front lamp 504 and the left front lamp 506 respectively emit light in front of the cart 2. The right front lamp 504 and the left front lamp 506 are respectively electrically connected to the main control circuit board 44 (see FIG. 9).

The bumper frame 508 is constituted of a round steel pipe. The bumper support members 510, 512 are respectively arranged rearward from the bumper frame 508, and are fixed to the bumper frame 508. The bumper support member 510 is attached to the linear motion pipe 514 by bolts 534a, 534b and nuts 536a, 536b (see FIG. 28). The bumper support member 512 is attached to the linear motion pipe 516 by bolts 538a, 538b and nuts 540a, 540b.

Figure 28:
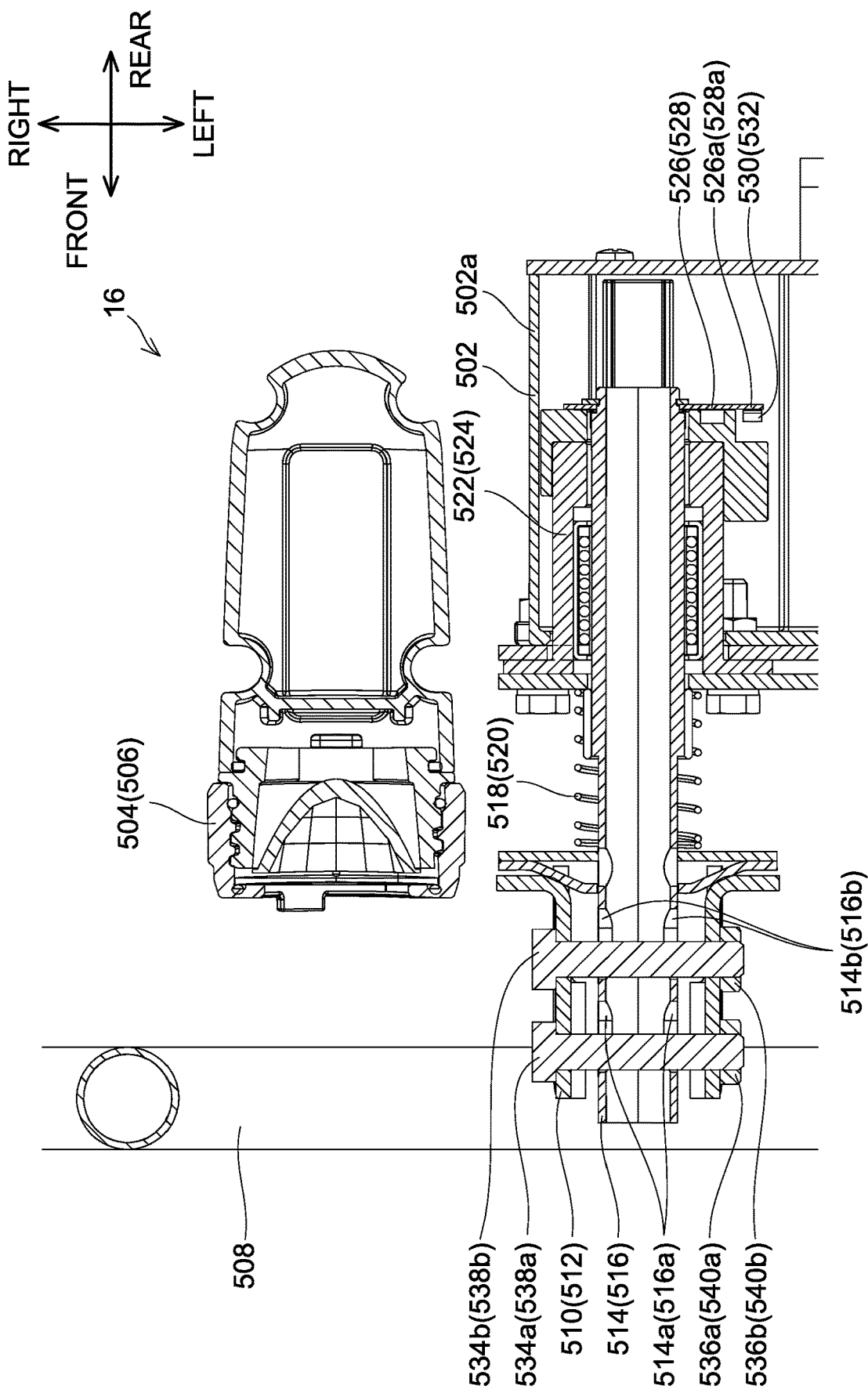
FIG. 28 is a cross-sectional view seeing a vicinity of a linear motion bearing 522 of the bumper unit 16 of the embodiment in a cross section along the front-rear direction and the left-right direction.

As shown in FIG. 28, the linear motion pipe 514 is arranged with its longitudinal direction along the front-rear direction. Elongated holes 514a, 514b arranged adjacent to each other in the front-rear direction and respectively having their longitudinal directions along the front-rear direction are defined in the vicinity of a from end of the linear motion pipe 514. A bolt 534a penetrates the elongated hole 514a and a bolt 534b penetrates the elongated hole 514b. Due to this, the bumper support member 510 is supported by the linear motion pipe 514 so as to be movable in the front-rear direction between a position at which the bolls 534a, 534b contact front edges of the elongated holes 514a, 514b and a position at which the bolts 534a, 534b contact rear edges of the elongated holes 514a, 514b. Similarly, the linear motion pipe 516 is arranged with its longitudinal direction along live front-rear direction. Elongated holes 516a, 516b arranged adjacent to each other in the front-rear direction and respectively having their longitudinal directions along the front-rear direction are defined in the vicinity of a front end of the linear motion pipe 516. A bolt 538a penetrates the elongated hole 516a and a bolt 538b penetrates the elongated hole 516b. Due to this, the bumper support member 512 is supported by the linear motion pipe 516 so as to be movable in the front-rear direction between a position at which the bolts 538a, 538b contact front edges of the elongated holes 516a, 516b and a position at which the bolts 538a, 538b contact rear edges of the elongated holes 516a, 516b.

Rear ends of the linear motion pipes 514, 516 penetrate front walls of the base member 500 and the housing 502 and enter into the housing 502. The linear motion pipes 514, 516 are supported by the linear motion bearings 522, 524 in the vicinity of their rear ends so as to be movable in the front-rear direction. The linear motion bearings 522, 524 are fixed to the front wall of the housing 502. The coil springs 518, 520 are attached to the linear motion pipes 514, 516. Front ends of the coil springs 518, 520 abut rear surfaces of the bumper support members 510, 512, and rear ends of the coil springs 518, 520 abut a front surface of the base member 500. The coil springs 518, 520 bias the bumper support members 510, 512 frontward relative to the base member 500.

Figure 29:
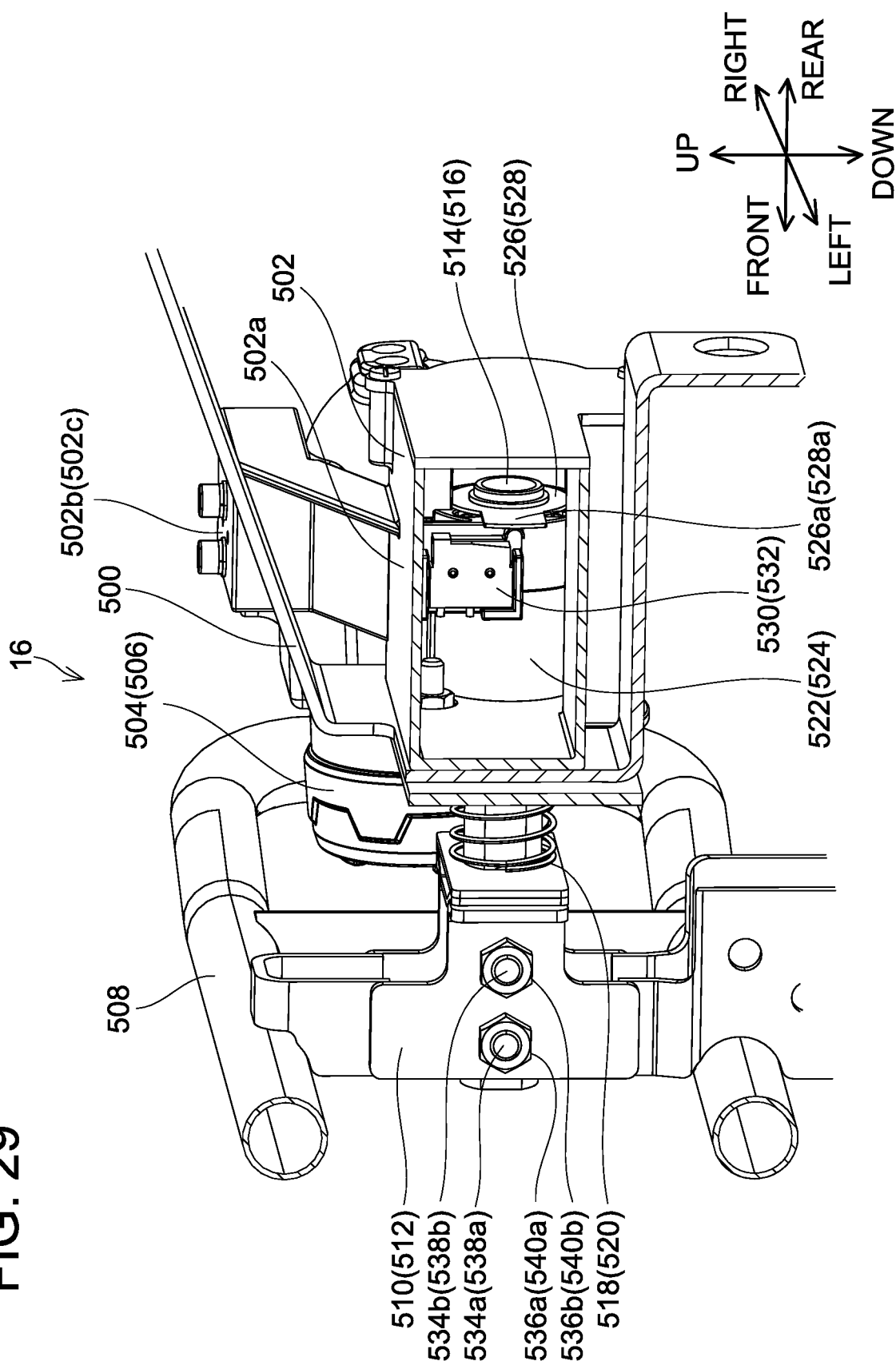
FIG. 29 is a perspective cross-sectional view seeing the bumper unit 16 of the embodiment from the rear left upper side.

As shown in FIG. 29, the abutment plates 526, 528 are fixed to the rear ends of the linear motion pipes 514, 516. The abutment plates 526, 528 respectively include abutment portions 526a, 528a that extend radially outward. The collision detection switches 530, 532 are arranged in front of the abutment portions 526a, 528a. In a state where an external force is not applied to the bumper frame 508, the linear motion pipes 514, 516 are located forward relative to the housing 502 by the biasing forces of the coil springs 518, 520. In this case, the abutment portions 526a, 528a are in abutment with the collision detection switches 530, 532, by which the collision detection switches 530, 532 are in an off-state. When a backward external force is applied to the bumper frame 508, the linear motion pipes 514, 516 move backward relative to the housing 502 against the biasing forces of the coil springs 518, 520. In this case, the abutment portions 526a, 528a separate from the collision detection switches 530, 532, by which the collision detection switches 530, 532 shift to an on-state. The collision detection switches 530, 532 are respectively electrically connected to the main control circuit board 44 (see FIG. 9).

(Circuit Configuration of Cart 2)

Figure 30:
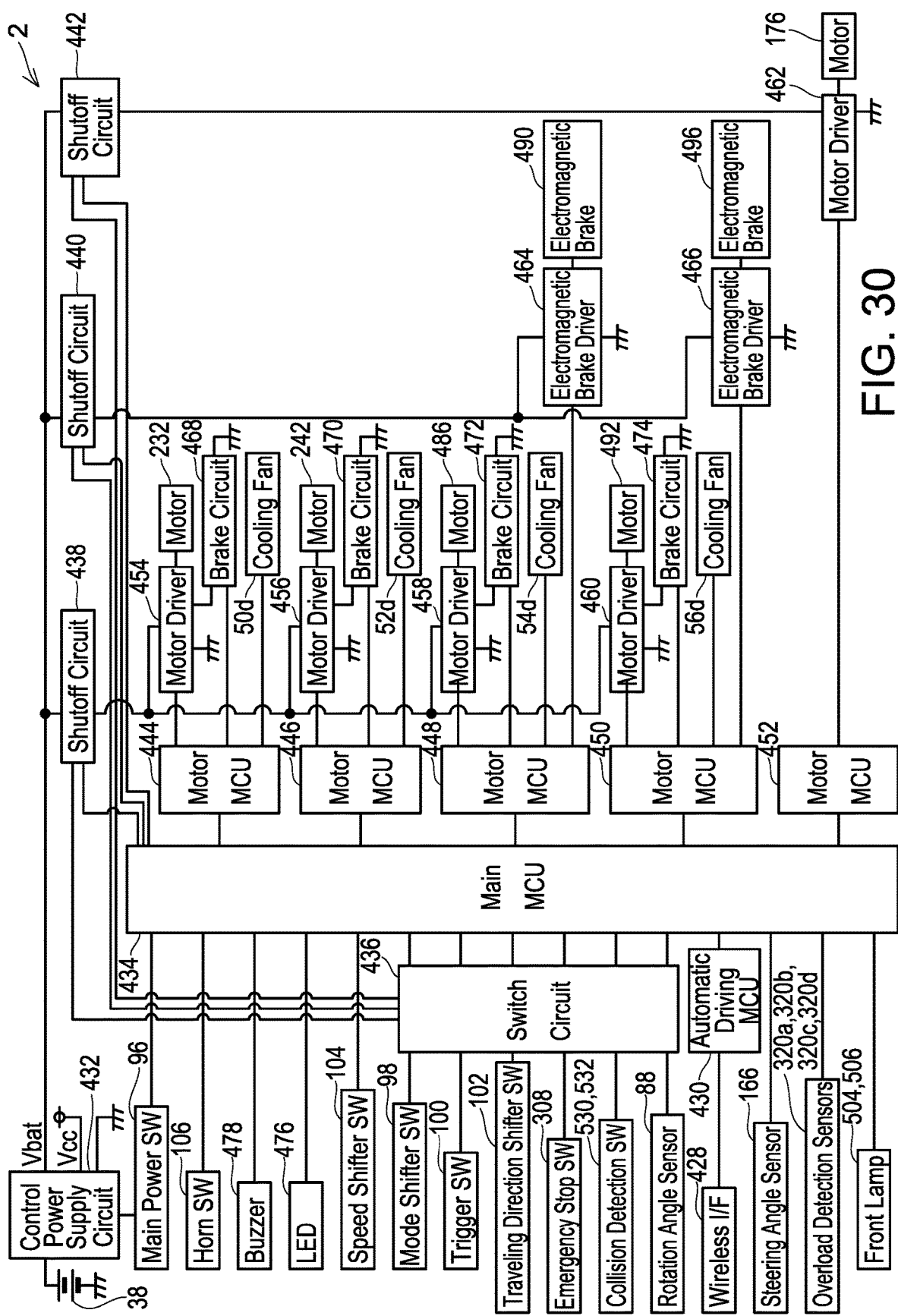
FIG. 30 is a diagram schematically showing a circuit configuration of the cart 2 of the embodiment.

As shown in FIG. 30, the control power supply circuit 432 is electrically connected to the main power switch 96. The control power supply circuit 432 is configured to allow power supply from the battery pack 38 when an on-operation is performed on the main power switch 96, and prohibit the power supply from the battery pack 38 when an off-operation is performed on live main power switch 96. When main power of the cart 2 is in an on-state, the control power supply circuit 432 supplies the power from the battery pack 38 to the shutoff circuits 438, 440, 442 without stepping it down from the voltage (Vbat) of the battery pack 38. Further, when the main power of the cart 2 is in the on-state, the control power supply circuit 432 steps down the power from the battery pack 38 from the voltage (Vbat) of the battery pack 38 to a predetermined voltage (Vcc) and supplies the same to respective electronic components such as the main MCU 434, the switch circuit 436, the automatic driving MCU 430, and the motor MCUs 444, 446, 448, 450, 452. Hereinbelow, a potential of the voltage (Vbat) of the battery pack 38 may be termed a battery potential, and a potential of the voltage (Vcc) stepped down by the control power supply circuit 432 may be termed a power supply potential.

The main MCU 434 is configured to control overall operations of the cart 2. The main power switch 96, the speed shifter switch 104, the horn switch 106, the LEDs 476, the buzzer 478, the steering angle sensor 166, the overload detection sensors 320a, 320b, 320c, 320d, the right front lamp 504, and the left front lamp 506 are electrically connected to the main MCU 434. Further, the mode shifter switch 98, the trigger switch 100, the travelling direction shifter switch 102, the emergency stop switch 308, the collision detection switches 530, 532, and the rotation angle sensor 88 are electrically connected to the main MCU 434 via the switch circuit 436. Further, the wireless I/F 428 is electrically connected to the main MCU 434 via the automatic driving MCU 430. The automatic driving MCU 430 is configured to generate a travelling route which the cart 2 should realize in a tracking operation and in the remote control operation performed by the cart 2 under the automatic mode based on signals from the wireless I/F 428 and outputs the same to the main MCU 434 as command values.

The motor MCUs 444, 446, 448, 450, 452 are electrically connected to the main MCU 434. The motor MCU 444 is configured to control operations of the right front wheel motor 232 through the motor driver 454, and also control operations of the brake circuit 468 and the cooling fan 50d. The motor MCU 446 is configured to control operations of the left front wheel motor 242 through the motor driver 456, and also control operations of the brake circuit 470 and the cooling fan 52d. The motor MCU 448 is configured to control operations of the right rear wheel motor 486 through the motor driver 458, and also control operations of the brake circuit 472 and the cooling fan 54d. Further, the motor MCU 448 is configured to control operations of the right rear wheel electromagnetic brake 490 through the electromagnetic brake driver 464. The motor MCU 450 is configured to control operations of the left rear wheel motor 492 through the motor driver 460, and also control operations of the brake circuit 474 and the cooling fan 56d. Further, the motor MCU 450 is configured to control operations of the left rear wheel electromagnetic brake 496 through the electromagnetic brake driver 466. The motor MCU 452 is configured to control operations of the steering motor 176 through the motor driver 462.

The shutoff circuit 438 is arranged on an electric power supply path from the control power supply circuit 432 to the motor drivers 454, 456, 458, 460. The shutoff circuit 438 is configured to switch between a state allowing power supply from the control power supply circuit 432 to the motor drivers 454, 456, 458, 460 and a stale prohibiting to do so. The shutoff circuit 440 is arranged on an electric power supply pith front the control power supply circuit 432 to the electromagnetic brake drivers 464, 466. The shutoff circuit 440 is configured to switch between a state allowing power supply from the control power supply circuit 432 to the electromagnetic brake drivers 464, 466 and a state prohibiting to do so. The shutoff circuit 442 is arranged on an electric power supply path from the control power supply circuit 432 to the motor driver 462. The shutoff circuit 442 is configured to switch between a state allowing power supply from the control power supply circuit 432 to the motor driver 462 and a state prohibiting to do so. Each of the shutoff circuits 438, 440, 442 is electrically connected to the main MCU 434 and the switch circuit 436.

(Configuration of Switch Circuit 436)

Figure 31:
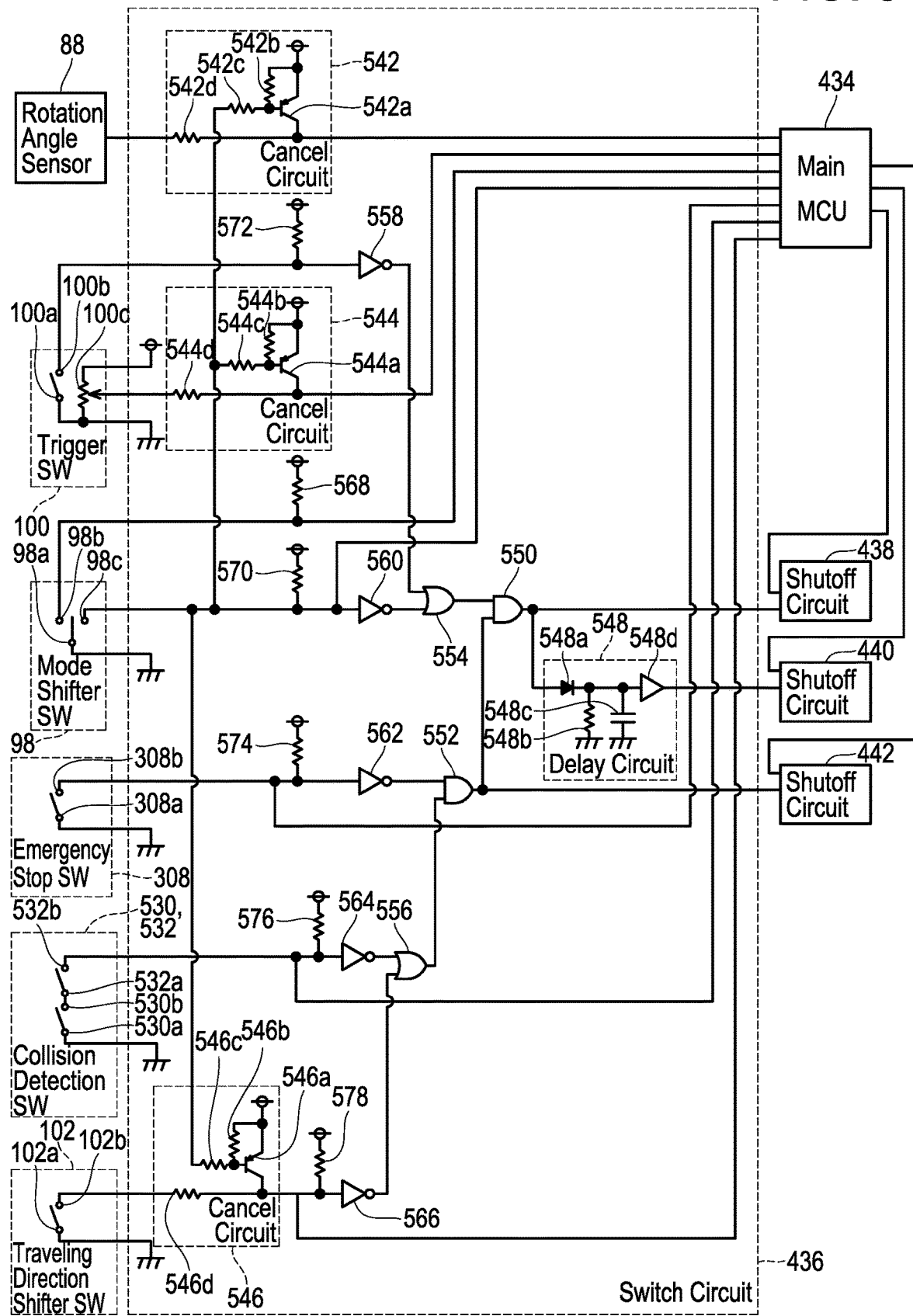
FIG. 31 is a diagram schematically showing a circuit configuration of a switch circuit 436 of the embodiment.

As shown in FIG. 31, the switch circuit 436 includes cancel circuits 542, 544, 546, a delay circuit 548, AND gates 550, 552, OR gates 554, 556, NOT gates 558, 560, 562, 564, 566, and resistors 568, 570,572, 574, 576, 578.

The mode shifter switch 98 includes aground terminal 98*a*, a manual mode terminal 98*b*, and an automatic mode terminal 98*c*. The ground terminal 98*a* is connected to a ground potential. The manual mode terminal 98*b* is connected to the power supply potential via the resistor 568, and is connected to the main MCU 434. The automatic mode terminal 98*c* is connected to the power supply potential via the resistor 570, and is connected to the main MCU 434.

When the user selects the manual mode in the mode shifter switch 98, the ground terminal 98*a* and the manual mode terminal 98*b* become electrically conducted and the ground terminal 98*a* and the automatic mode terminal 98*c* become electrically non-conducted. In this case, the manual mode terminal 98*b* comes to have L potential and the automatic mode terminal 98*c* comes to have H potential. When an input from the manual mode terminal 98*b* becomes L potential, the main MCU 434 recognizes that the manual mode has been selected by the user. When the user selects the automatic mode in the mode shifter switch 98, the ground terminal 98*a* and the manual mode terminal 98*b* become electrically non-conducted and the ground terminal 98*a* and the automatic mode terminal 98*c* become electrically conducted. In this case, the manual mode terminal 98*b* comes to have H potential and the automatic mode terminal 98*c* comes to have L potential. When an input from the automatic mode terminal 98*c* becomes L potential, the main MCU 434 recognizes that the automatic mode has been selected by the user. When the user selects the parking mode in the mode shifter switch 98, the ground terminal 98*a* and the manual mode terminal 98*b* become electrically non-conducted and the ground terminal 98*a* and the automatic mode terminal 98*c* also become electrically non-conducted. In this case, the manual mode terminal 98*b* comes to have H potential, and the automatic mode terminal 98*c* also comes to have H potential. When the inputs from the manual mode terminal 98*b* and the automatic mode terminal 98*c* both become H potential, the main MCU 434 recognizes that the parking mode has been selected by the user.

The cancel circuit 542 includes a transistor 542*a* and resistors 542*b*, 542*c*, 542*d*. The transistor 542*a* is a PNP transistor. The resistor 542*b* has its one end connected to an emitter of the transistor 542*a* and its other end connected to a base of the transistor 542*a*. The resistor 542*c* has its one end connected to the base of the transistor 542*a* and its other end connected to the automatic mode terminal 98*c* of the mode shifter switch 98. The resistor 542*d* has its one end connected to the rotation angle sensor 88 and its other end connected to a collector of the transistor 542*a*. Further, the emitter of the transistor 542*a* is connected to the power supply potential, and the collector of the transistor 542*a* is connected to the main MCU 434.

The rotation angle sensor 88 is configured to output a potential corresponding to a rotation angle to the cancel circuit 542. When the automatic mode terminal 98*c* has H potential, the transistor 542*a* is in an off-state and the potential outputted from the rotation angle sensor 88 is inputted to the main MCU 434. When the automatic mode terminal 98*c* has L potential, the transistor 542*a* is in an on-state and H potential is inputted to the main MCU 434 regardless of the potential outputted from the rotation angle sensor 88. That is, the cancel circuit 542 is configured to cancel an input signal from the rotation angle sensor 88 when the automatic mode is selected in the mode shifter switch 98.

The trigger switch 100 includes a ground terminal 100*a*, a trigger terminal 100*b*, and a variable resistor 100*c*. The ground terminal 100*a* is connected to the ground potential. The trigger terminal 100*b* is connected to the power supply potential via the resistor 572. When the user has not operated the trigger switch 100 to turn it on, the ground terminal 100*a* and the trigger terminal 100*b* are electrically non-conducted, and thus the trigger terminal 100*b* has H potential. When the user has operated the trigger switch 100 to turn it on, the ground terminal 100*a* and the trigger terminal 100*b* are electrically conducted, and thus the trigger terminal 100*b* has L potential. The variable resistor 100*c* of the trigger switch 100 has its one end connected to the ground potential and its other end connected to the power supply potential, and is configured to output a potential corresponding to an amount of a pressing operation performed by the user upon turning on the trigger switch 100 to the cancel circuit 544.

The cancel circuit 544 includes a transistor 544*a* and resistors 544*b*, 544*c*, 544*d*. The transistor 544*a* is a PNP transistor. The resistor 544*b* has its one end connected to an emitter of the transistor 544*a* and its other end connected to a base of the transistor 544*a*. The resistor 544*c* has its one end connected to the base of the transistor 544*a* and its other end connected to the automatic mode terminal 98*c* of the mode shifter switch 98. The resistor 544*d* has its one end connected to the variable resistor 100*c* of the trigger switch 100 and its other end connected to a collector of the transistor 544*a*. Further, the emitter of the transistor 544*a* is connected to the power supply potential, and the collector of the transistor 544*a* is connected to the main MCU 434.

When the automatic mode terminal 98*c* has H potential, the transistor 544*a* is off and the potential outputted from the variable resistor 190*c* is inputted to the main MCU 434. In this case, the main MCU 434 recognizes the operation performed by the user on the trigger switch 100 based on the potential outputted from the variable resistor 100*c*. When the automatic mode terminal 98*c* has L potential, the transistor 544*a* is on and H potential is inputted to the main MCU 434 regardless of the potential outputted from the variable resistor 100*c*. That is, the cancel circuit 544 cancels the input signal from the variable resistor 100*c* of the trigger switch 100 when the automatic mode is selected in the mode shifter switch 98.

The trigger terminal 100*b* of the trigger switch 100 is connected to a first input terminal of the OR gate 554 via the NOT gate 558. The automatic mode terminal 98*c* of the mode shifter switch 98 is connected to a second input terminal of the OR gate 554 via the NOT gate 560. An output terminal of the OR gate 554 is connected to a first input terminal of the AND gate 550. An output terminal of the AND gale 550 is connected to the shutoff circuit 438. As will be described later, the shutoff circuit 438 is configured to: allow power supply to the motor drivers 454, 456, 458, 460 when the output terminal of the AND gate 550 has H potential; and shut off the power supply to the motor drivers 454, 456, 458, 460 when the output terminal of the AND gate 550 has L potential.

As will be described later, a second input terminal of the AND gate 550 normally has H potential inputted therein. In this case, when the automatic mode terminal 98c has H potential, the output terminal of the OR gate 554 and the output terminal of the AND gate 550 have L potential if the trigger terminal 100b has H potential, and the output terminal of the OR gate 554 and the output terminal of the AND gate 550 have H potential if the trigger terminal 100b has L potential. Due to this, when the automatic mode is not selected in the mode shifter switch 98, H potential is inputted to the shutoff circuit 438 if the trigger switch 100 is operated to an on-state, and L potential is inputted to the shutoff circuit 438 if the trigger switch 100 is not operated to the on-state. On the other hand, when the automatic mode terminal 98c has L potential, the output terminal of the OR gate 554 and the output terminal of the AND gate 550 have H potential regardless of the potential of the trigger terminal 100b. Due to this, when the automatic mode is selected in the mode shifter switch 98, H potential is inputted from the switch circuit 436 to the shutoff circuit 438 regardless of whether the trigger switch 100 is operated to the on-state.

The output terminal of the AND gate 550 is also connected to an input terminal of the delay circuit 548. An output terminal of the delay circuit 548 is connected to the shutoff circuit 440. As will be described later, the shutoff circuit 440 is configured to: allow power supply to the electromagnetic brake drivers 464, 466 when the output terminal of the delay circuit 548 has H potential; and shut off the power supply to the electromagnetic brake drivers 464, 466 when the output terminal of the delay circuit 548 has L potential. The delay circuit 548 includes a diode 548a, a resistor 548b, a capacitor 548c, and a buffer gate 548d. An anode of the diode 548a is connected to an input terminal of the delay circuit 548. A cathode of the diode 548a is connected to an input terminal of the buffer gate 548d. The resistor 548b has its one end connected to a cathode of the diode 548a and its other end connected to the ground potential. The capacitor 548c has its one end connected to the cathode of the diode 548a and its other end connected to the ground potential. An output terminal of the buffer gate 548d is connected to the output terminal of the delay circuit 548. In a case where the output terminal of the AND gate 550 shifts from L potential to H potential, the output terminal of the delay circuit 548 also shifts from L potential to H potential after a predetermined delay time that is set according to a time constant of the resistor 548b and the capacitor 548c has elapsed. Further, in a case where the output terminal of the AND gate 550 shifts from H potential to L potential, the output terminal of the delay circuit 548 also shifts from H potential to L potential after the predetermined delay time that is set according to the time constant of the resistor 548b and the capacitor 548c has elapsed.

The emergency stop switch 308 includes a ground terminal 308a and an emergency stop terminal 308b. The ground terminal 308a is connected to the ground potential. The emergency stop terminal 308b is connected to the power supply potential via the resistor 574, and is connected to the main MCU 434. When the emergency stop switch 308 is off, the ground terminal 308a and the emergency stop terminal 308b are electrically conducted and the emergency stop terminal 308b thereby comes to have L potential. When the emergency stop switch 308 is on, the ground terminal 308a and the emergency stop terminal 308b are electrically non-conducted and the emergency stop terminal 308b thereby comes to have H potential. When an input from the emergency stop terminal 308b becomes H potential, the main MCU 434 recognizes that the emergency stop switch 308 has been turned on by the user.

The collision detection switch 530 includes a ground terminal 530a and a collision detection terminal 530b. The collision detection switch 532 includes a ground terminal 532a and a collision detection terminal 532b. The ground terminal 530a is connected to the ground potential. The collision detection terminal 530b is connected to the ground terminal 532a. The collision detection terminal 532b is connected to the power supply potential via the resistor 576, and is connected to the main MCU 434. When the collision detection switch 530 is off, the ground terminal 530a and the collision detection terminal 530b are electrically conducted, and when the collision detection switch 530 is on, the ground terminal 530a and the collision detection terminal 530b are electrically non-conducted. When the collision detection switch 532 is off, the ground terminal 532a and the collision detection terminal 532b are electrically conducted, and when the collision detection switch 532 is on, the ground terminal 532a and the collision detection terminal 532b are electrically non-conducted. Due to this, the collision detection terminal 532b has L potential when both the collision detection switches 530, 532 are off, and the collision detection terminal 532b has H potential when one of or both of the collision detection switches 530, 532 are off. The main MCU 434 recognizes that a collision has been detected by the collision detection switches 530, 532 when an input form the collision detection terminal 532b becomes H potential.

The travelling direction shifter switch 102 includes a ground terminal 102a and a travelling direction terminal 102b. The ground terminal 102a is connected to the ground potential, lire travelling direction terminal 102b is connected to the cancel circuit 546. In the travelling direction shifter switch 102, when the forward motion is selected by the user, the ground terminal 102a and the travelling direction terminal 102b are electrically non-conducted, and when the backward motion is selected by the user, the ground terminal 102a and the travelling direction terminal 102b are electrically conducted.

The cancel circuit 546 includes a transistor 546a and resistors 546b, 546c, 546d. The transistor 546a is a PNP transistor. The resistor 546b has its one end connected to an emitter of the transistor 546a and its other end connected to a base of the transistor 546a. The resistor 546c has its one end connected to the base of the transistor 546a and its other end connected to the automatic mode terminal 98c of the mode shifter switch 98. The resistor 546d has its one end connected to the travelling direction terminal 102b of the travelling direction shifter switch 102 and its other end connected to a collector of the transistor 546a. Further, the emitter of the transistor 546a is connected to the power supply potential, and the collector of the transistor 546a is connected to the power supply potential via the resistor 578, and is connected to the main MCU 434.

When the automatic mode terminal 98c has H potential, the transistor 546a is off, and the collector of the transistor 546a has H potential if the forward motion is selected in the travelling direction shifter switch 102, and the collector of the transistor 546a has L potential if the backward motion is selected in the travelling direction shifter switch 102. In this case, the main MCU 434 recognizes which one of the forward motion and the backward motion is selected based on a potential that is inputted therein. When the automatic mode terminal 98c has L potential, the transistor 546a turns on and the collector of the transistor 546a becomes H potential regardless of which one of the forward motion and the backward motion is selected in the travelling direction shifter switch 102. That is, when the automatic mode is selected in the mode shifter switch 98, the cancel circuit 546 cancels the input signals from the travelling direction shifter switch 102.

The emergency stop terminal 308b of the emergency stop switch 308 is connected to a first input terminal of the AND gate 552 via the NOT gale 562. The collision detection terminal 532b of the collision detection switch 532 is connected to a first input terminal of the OR gate 556 via the NOT gate 562. The collector of the transistor 546a of the cancel circuit 546 is connected to a second input terminal of the OR gate 556 via the NOT gate 564. An output terminal of the OR gate 556 is connected to a second input terminal of the AND gate 552. An output terminal of the AND gate 552 is connected to the second input terminal of the AND gate 550 and also to the shutoff circuit 442. As will be described later, the shutoff circuit 442 is configured to: allow power supply to the motor driver 462 when the output terminal of the AND gate 552 has H potential; and shut off the power supply to the motor driver 462 when the output terminal of the AND gate 552 has L potential.

When the emergency stop terminal 308b has H potential, the output terminal of the AND gate 552 has L potential regardless of the potential of the OR gate 556. Due to this, when the emergency stop switch 308 is turned on, L potential is inputted to the second input terminal of the AND gate 550 and also L potential is inputted from the switch circuit 436 to the shutoff circuit 442 regardless of the states of the mode shifter switch 98, the collision detection switches 530, 532, and the travelling direction shifter switch 102.

When the emergency stop terminal 308b has L potential and L potential is inputted to the second input terminal of the OR gate 556, the output terminal of the OR gale 556 and the output terminal of the AND gate 552 come to have H potential if the collision detection terminal 532b has L potential, and on the other hand the output terminal of the OR gate 556 and the output terminal of the AND gate 552 come to have L potential if the collision detection terminal 532b has H potential. Due to this, the second input terminal of the AND gate 550 has H potential when no collision is detected by the collision detection switches 530, 532, and H potential is inputted from the swatch circuit 436 to the shutoff circuit 442. When a collision is detected by the collision detection switches 530, 532, L potential is inputted to the second input terminal of the AND gate 550 and L potential is inputted from the switch circuit 436 to the shutoff circuit 442. That is, the collision detection by the collision detection switches 530, 532 is activated.

When the emergency stop terminal 308b has L potential and H potential is inputted to the second input terminal of the OR gale 556, the output terminal of the OR gate 556 and the output terminal of the AND gate 552 come to have H potential regardless of the potential of the collision detection terminal 532b. Due to this, H potential is inputted to the second input terminal of the AND gate 550 regardless of the states of the collision detection switches 530, 532, and H potential is inputted from the switch circuit 436 to the shutoff circuit 442. That is, the collision detection by the collision detection switches 530, 532 is disabled.

When the automatic mode terminal 98c has H potential, since the transistor 546a of the cancel circuit 546 is off, L potential is inputted to the second input terminal of the OR gate 556 if the travelling direction terminal 102b has H potential, and H potential is inputted to the second input terminal of the OR gate 556 if the travelling direction terminal 102b has L potential. That is, in the state where the automatic mode is not selected in the mode shifter switch 98, the collision detection of the collision detection switches 530, 532 is activated if the forward motion is selected in the travelling direction shifter switch 102, and the collision detection of the collision detection switches 530, 532 is disabled if the backward motion is selected in the travelling direction shifter switch 102.

When the automatic mode terminal 98c has L potential, L potential is inputted to the second input terminal of the OR gate 556 regardless of the potential of the travelling direction terminal 102b since the transistor 546a of the cancel circuit 546 is turned on. That is, when the automatic mode is selected in the mode shifter switch 98, the collision detection of the collision detection switches 530, 532 is enabled regardless of the state of the travelling direction shifter switch 102.

(Configuration of Shutoff Circuit 438)

Figure 32:
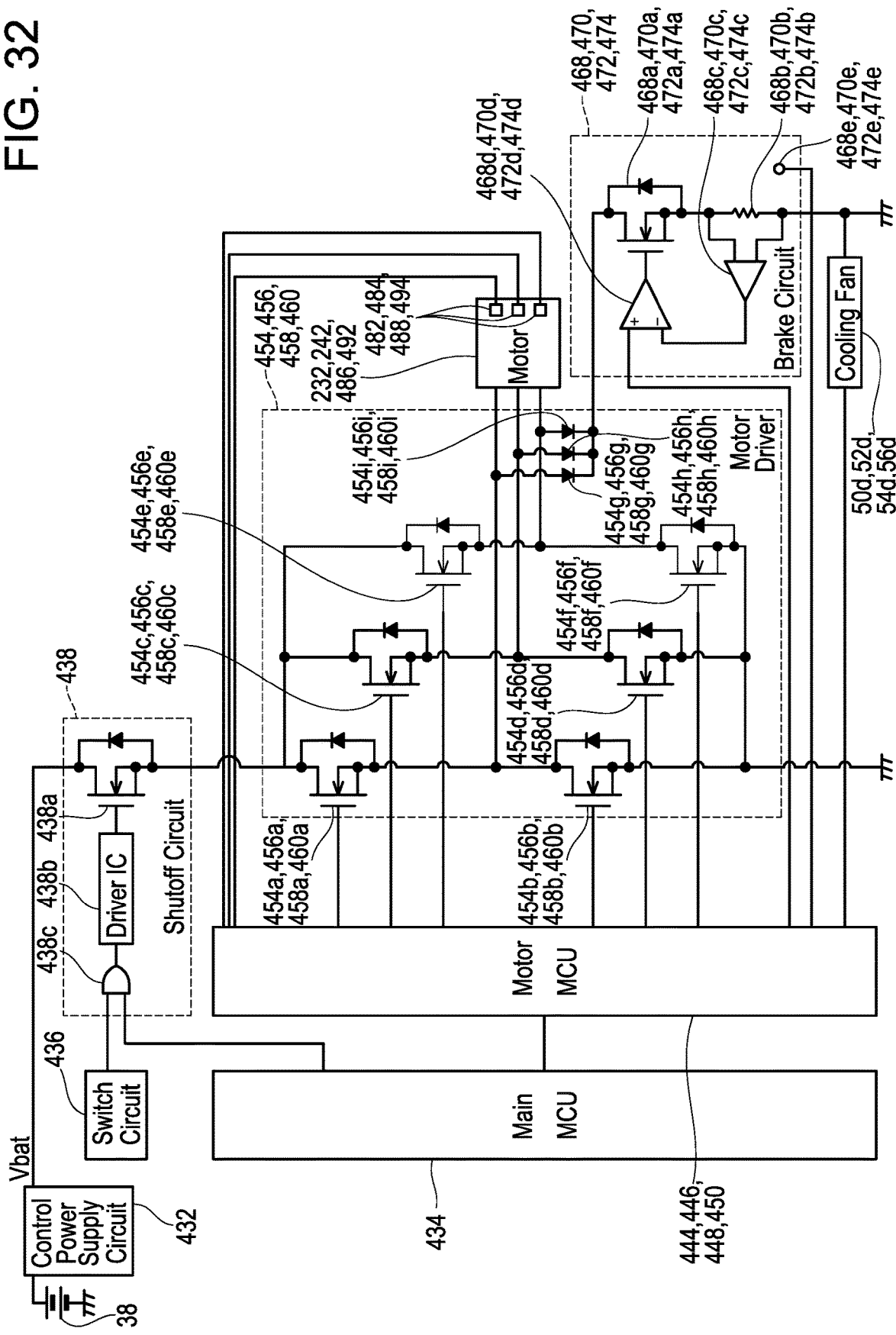
FIG. 32 is a diagram schematically showing circuit configurations of a shutoff circuit 438, motor drivers 454, 456, 458, 460, and brake circuits 468, 470, 472, 474 of the embodiment.

As shown in FIG. 32, the shutoff circuit 438 includes a switching element 438a, a driver IC 438b, and an AND gate 438c. The switching element 438a is for example a field effect transistor, and may more specifically be a n-channel MOSFET having an insulated gate. A drain of the switching element 438a is connected to the battery potential (Vbat) output of the control power supply circuit 432, a source of the switching element 438a is connected to the motor drivers 454, 456, 458, 460, and a gate of the switching element 438a is connected to the driver IC 438b. A first input terminal of the AND gate 438c is connected to the switch circuit 436, a second input terminal of the AND gate 438c is connected to the main MCU 434, and an output terminal of the AND gate 438c is connected to the driver IC 438b. The driver IC 438b is configured to electrically conduct the switching element 438a when the output terminal of the AND gate 438c has H potential, that is, when both the first input terminal and the second input terminal of the AND gate 438c have H potential. The driver IC 438b is configured not to electrically conduct the switching element 438a when the output terminal of the AND gate 438c has L potential, that is, when one of or both the first input terminal and the second input terminal of the AND gate 438c have L potential.

(Configuration of Motor Drivers 454, 456, 458, 460)

The motor drivers 454, 456, 458, 460 are respectively connected to their corresponding one of the right front wheel motor 232, the left front wheel motor 242, the right rear wheel motor 486, and the left rear wheel motor 492 via U-phase, V-phase, and W-phase output terminals. Further, the motor drivers 454, 456, 458, 460 are respectively connected to the brake circuits 468, 470, 472, 474 via brake circuit output terminals.

The motor drivers 454, 456, 458, 460 each include a first switching element 454a, 456a, 458a, 460a, a second switching element 454b, 456b, 458b, 460b, a third switching element 454c, 456c, 458c, 460c, a fourth switching element 454d, 456d, 458d, 460d, a fifth switching element 454e, 456c, 458c, 460c, a sixth switching element 454f, 456f, 458f, 460f, a first diode 454g, 456g, 458g, 460g, a second diode 454h, 456h, 458h, 460h, and a third diode 454i, 456i, 458i, 460i. Each of these first switching elements 454a, 456a, 458a, 460a, second switching elements 454b, 456b, 458b, 460b, third switching elements 454c, 456c, 458c, 460c, fourth switching elements 454d, 456d, 458d, 460d, fifth switching elements 454e, 456c, 458c, 460e, and sixth switching elements 454f, 456f, 458f, 460f may for example be field effect transistors, and may more specifically be n-channel MOSFETs having insulated gates.

A drain of each of the first switching elements 454a, 456a, 458a, 460a is connected to the source of the switching element 438a in the shutoff circuit 438, a source of each of the first switching elements 454a, 456a, 458a, 460a is connected to the U-phase output terminal, and a gate of each of the first switching elements 454a, 456a, 458a, 460a is connected to its corresponding motor MCU 444, 446, 448, 450. A drain of each of the second switching elements 454b, 456b, 458b, 460b is connected to the U-phase output terminal, a source of each of the second switching elements 454b, 456b, 458b, 460b is connected to the ground potential, and a gate of each of the second switching elements 454b, 456b, 458b, 460b is connected to its corresponding motor MCU 444, 446, 448, 450.

A drain of each of the third switching elements 454c, 456c, 458c, 460c is connected to the source of the switching element 438a in the shutoff circuit 438, a source of each of the third switching elements 454c, 456c, 458c, 460c is connected to the V-phase output terminal, and a gate of each of the third switching elements 454c, 456c, 458c, 460c is connected to its corresponding motor MCU 444, 446, 448, 450. A drain of each of the fourth switching elements 454d, 456d, 458d, 460d is connected to the V-phase output terminal, a source of each of the fourth switching elements 454d, 456d, 458d, 460d is connected to the ground potential, and a gate of each of the fourth switching elements 454d, 456d, 458d, 460d is connected to its corresponding motor MCU 444, 446, 448, 450.

A drain of each of the fifth switching elements 454e, 456e, 458e, 460e is connected to the source of the switching element 438a in the shutoff circuit 438, a source of each of the fifth switching elements 454e, 456e, 458e, 460e is connected to the W-phase output terminal, and a gate of each of the fifth switching elements 454e, 456e, 458e, 460e is connected to its corresponding motor MCU 444, 446, 448, 450. A drain of each of the sixth switching elements 454f, 456f, 458f, 460f is connected to the W-phase output terminal, a source of each of the sixth switching elements 454f, 456f, 458f, 460f is connected to the ground potential, and a gate of each of the sixth switching elements 454f, 456f, 458f, 460f is connected to its corresponding motor MCU 444, 446, 448, 450.

Detection signals of the Hall sensors 482, 484, 488, 494 of the right front wheel motor 232, the left front wheel motor 242, the right rear wheel motor 486, and the left rear wheel motor 492 are respectively inputted to the motor MCUs 444, 446, 448, 450. The motor MCUs 444, 446, 448, 450 are configured to operate their corresponding one of the right front wheel motor 232, the left front wheel motor 242, the right rear wheel motor 486, and the left rear wheel motor 492 at their desired rotation speeds by switching on/off of the first switching elements 454a, 456a, 458a, 460a, the second switching elements 454b, 456b, 458b, 460b, the third switching elements 454c, 456c, 458c, 460c, the fourth switching elements 454d, 456d, 458d, 460d, the fifth switching elements 454e, 456e, 458e, 460e, and the sixth switching elements 454f, 456f, 458f, 460f in accordance with the detection signals from the Hall sensors 482, 484, 488, 494. Further, the motor MCUs 444, 446, 448, 450 are configured to apply brake to the rotation of their corresponding one of the right from wheel motor 232, the left front wheel motor 242, the right rear wheel motor 486, and the left rear wheel motor 492 with a so-called short brake by switching the second switching element 454b, 456b, 458b, 460b, the fourth switching element 454d, 456d, 458d, 460d, and the sixth switching element 454f, 456f, 458f, 460f to on.

An anode of each of the first diodes 454g, 456g, 458g, 460g is connected to the U-phase output terminal, and a cathode of each of the first diodes 454g, 456g, 458g, 460g is connected to the brake circuit output terminal. An anode of each of the second diodes 454h, 456h, 458h, 460h is connected to the V-phase output terminal, and a cathode of each of the second diodes 454h, 456h, 458h, 460h is connected to the brake circuit output terminal. An anode of each of the third diodes 454i, 456i, 458i, 460i is connected to the W-phase output terminal, and a cathode of each of the third diodes 454i, 456i, 458i, 460i is connected to the brake circuit output terminal.

(Configuration of Brake Circuits 468, 470, 472, 474)

The brake circuits 468, 470, 472, 474 each include a switching element 468a, 470a, 472a, 474a, a resistor 468b, 470b, 472b, 474b, an amplifier 468c, 470c, 472c, 474c, an operational amplifier 468d, 470d, 472d, 474d, and a thermistor 468c, 470c, 472e, 474e.

The switching, elements 468a, 470a, 472a, 474a may for example be field effect transistors, and may more specifically be n-channel MOSFETs with insulated gates. A drain of each of the switching elements 468a, 470a, 472a, 474a is connected to the brake circuit output terminal of the corresponding motor driver 454, 456, 458, 460, a source of each of the switching elements 468a, 470a, 472a, 474a is connected to the ground potential via the corresponding resistor 468b, 470b, 472b, 474b, and a gate of each of the switching elements 468a, 470a, 472a, 474a is connected to an output terminal of the corresponding operational amplifier 468d, 470d, 472d, 474d. The switching elements 468a, 470a, 472a, 474a are configured to operate in a linear mode or in a switching mode in accordance with a gate voltage level. In the linear mode, drain current changes substantially linearly when a gate voltage changes, and in the switching mode, the drain current does not change so much even when the gate voltage changes.

The amplifiers 468c, 470c, 472c, 474c are each configured to detect a voltage between one end and another end of the corresponding resistor 468b, 470b, 472b, 474b, amplify the detected voltage, and output the same to an inverting input terminal of the corresponding operational amplifier 468d, 470d, 472d, 474d. Non-inverting input terminals of the operational amplifiers 468d, 470d, 472d, 474d are each connected to the corresponding motor MCU 444, 446, 448, 450. The operational amplifiers 468d, 470d, 472d, 474d are each configured to apply a voltage, which corresponds to a difference between a current command value inputted from the motor MCU 444, 446, 448, 450 to the non-inverting input terminal and a current detection value inputted from the amplifier 468c, 470c, 472c, 474c to the inverting input terminal, to the gate of the switching element 468a, 470a, 472a, 474a. Due to this, the switching element 468a, 470a, 472a, 474a operates in the linear mode, and the operation of the switching element 468a, 470a, 472a, 474a is controlled so that current in accordance with the current command value from the motor MCU 444, 446, 448, 450 flows in the resistor 468b, 470b, 472b, 474b. That is, the brake circuits 468, 470, 472, 474 can each be said as being a linear regulator.

When large current flows from the motor drivers 454, 456, 458, 460 to the brake circuits 468, 470, 472, 474 while the right front wheel motor 232, the left front wheel motor 242, the right rear wheel motor 486, and the left rear wheel motor 492 are rotating, strong braking forces are applied to the right front wheel motor 232, the left front wheel motor 242, the right rear wheel motor 486, and the left rear wheel motor 492. Due to this, the motor MCUs 444, 446, 448, 450 can cause large braking forces to be applied to the right front wheel motor 232, the left front wheel motor 242, the right rear wheel motor 486, and the left rear wheel motor 492 by the brake circuits 468, 470, 472, 474 while the right front wheel motor 232, the left front wheel motor 242, the right rear wheel motor 486, and the left rear wheel motor 492 are rotating.

When the braking forces are applied to the right front wheel motor 232, the left front wheel motor 242, the right rear wheel motor 486, and the left rear wheel motor 492 by the brake circuits 468, 470, 472, 474, large current flows in the switching elements 468a, 470a, 472a, 474a and the resistors 468b, 470b, 472b, 474b, as a result of which temperatures of the brake circuits 468, 470, 472, 474 rise due to heat generation. Due to this, when the brake circuits 468, 470, 472, 474 are to be operated, the motor MCUs 444, 446, 448, 450 actuate the cooling fans 50d, 52d, 54d, 56d to cool the brake circuits 468, 470, 472, 474. Further, the motor MCUs 444, 446, 448, 450 have the thermistors 468e, 470e, 472e, 474e connected thereto. The thermistors 468e, 470e, 472e, 474e are configured to detect the temperatures of the brake circuits 468, 470, 472, 474 and output the same to the motor MCUs 444, 446, 448, 450.

In each of the brake circuits 468, 470, 472, 474, multiple sets (such as six sets) of the switching element 468a, 470a, 472a, 474a, the resistor 468b, 470b, 472b, 474b, the amplifier 468c, 470c, 472c, 474c, the operational amplifier 468d, 470d, 472d, 474d, and the thermistor 468c, 470c, 472e, 474c may be prepared, and these sets may be connected to each other in parallel. By configuring as such, even larger current can be supplied from the motor drivers 454, 456, 458, 460 to the brake circuits 468, 470, 472, 474, and larger braking forces can be applied to the right from wheel motor 232, the left front wheel motor 242, the right rear wheel motor 486, and the left rear wheel motor 492.

(Configuration of Shutoff Circuit 440)

Figure 33:
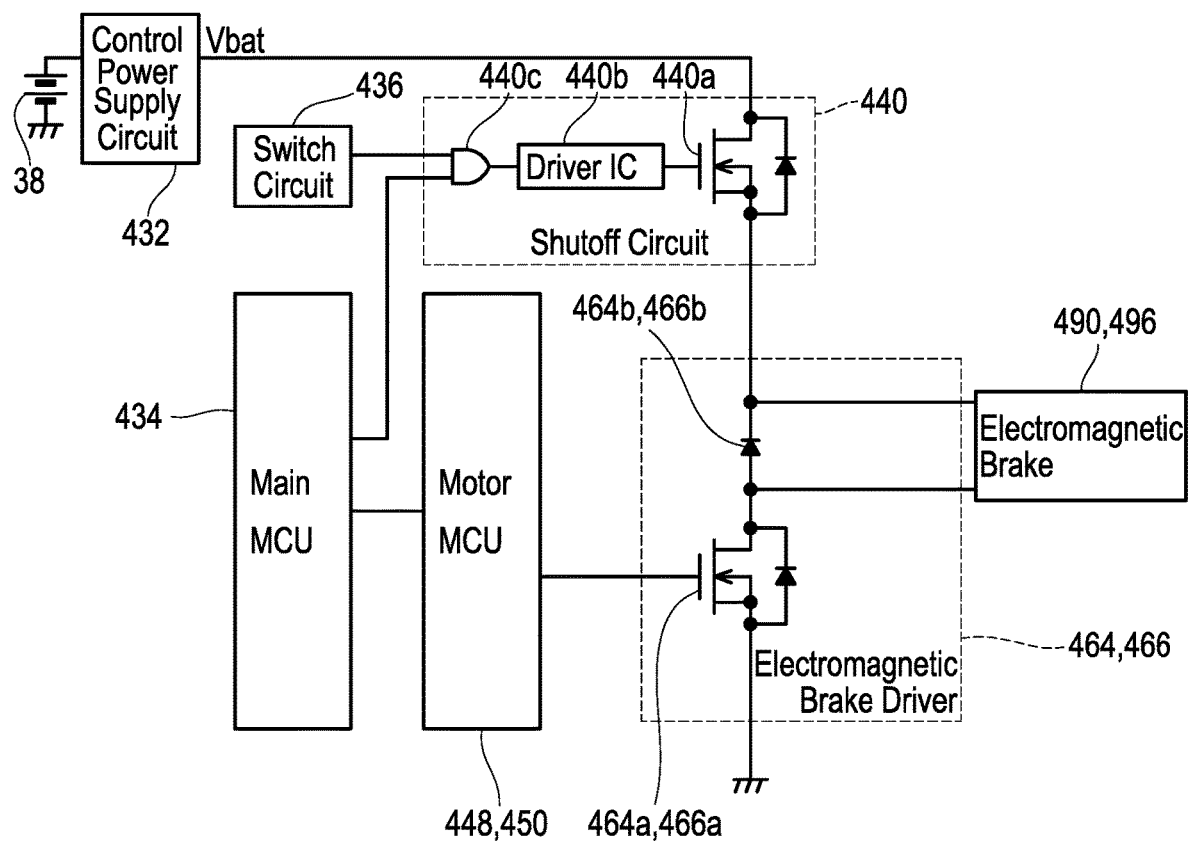
FIG. 33 is a diagram schematically showing a circuit configuration of a shutoff circuit 440 and electromagnetic brake drivers 464, 466 of the embodiment.

As shown in FIG. 33, the shutoff circuit 440 includes a switching element 440a, a driver IC 440b, and an AND gate 440c. The switching element 440a may tor example be a field effect transistor, and may more specifically be a n-channel MOSFET with an insulated gate. A drain of the switching element 440a is connected to the battery potential (Vbat) output of the control power supply circuit 432, a source of the switching element 440a is connected to the electromagnetic brake drivers 464, 466, and a gate of the switching element 440a is connected to the driver IC 440b. A first input terminal of the AND gate 440c is connected to the switch circuit 436, a second input terminal of the AND gate 440c is connected to the main MCU 434, and an output terminal of the AND gate 440c is connected to the driver IC 440b. The driver IC 440b is configured to electrically conduct the switching element 440a when the output terminal of the AND gate 440c has H potential, that is, when both the first and second input terminals of the AND gate 440c have H potential. The driver IC 440b is configured not to electrically conduct the switching element 440a when the output terminal of the AND gate 440c has L potential, that is, when one of or both of the first and second input terminals of the AND gate 440c have L potential.

(Configuration of Electromagnetic Brake Drivers 464, 466)

The electromagnetic brake drivers 464, 466 are respectively connected to the right rear wheel electromagnetic brake 490 and the left rear wheel electromagnetic brake 496 via positive and negative output terminals. The electromagnetic brake drivers 464, 466 each include a switching element 464a, 466a and a diode 464b, 466b.

The switching elements 464a, 466a may for example be field effect transistors, and may more specifically be n-channel MOSFETs with insulated gates. A drain of each of the switching elements 464a, 466a is connected to the negative output terminal, a source of each of the switching elements 464a, 466a is connected to the ground potential, and a gate of each of the switching elements 464a, 466a is connected to the corresponding motor MCU 448, 450. An anode of each of the diodes 464b, 466b is connected to the negative output terminal, and a cathode of each of the diodes 464b, 466b is connected to the positive output terminal.

The right rear wheel electromagnetic brake 490 and the left rear wheel electromagnetic brake 496 are configured to: apply the braking forces to the right rear wheel motor 486 and the left rear wheel motor 492 when no voltage is applied between the positive and negative output terminals; and release the braking forces on the right rear wheel motor 486 and the left rear wheel motor 492 when a voltage is applied between the positive and negative output terminals. When the motor MCUs 448, 450 turn on the switching elements 464a, 466a of the electromagnetic brake drivers 464, 466 while the switching element 440a of the shutoff circuit 440 is in the on-state, the battery voltage (Vbat) is applied between the positive and negative output terminals, and the braking forces on the right rear wheel electromagnetic brake 490 and the left rear wheel electromagnetic brake 496 are thereby released. The diodes 464b, 466b are configured to absorb back surge from the right rear wheel electromagnetic brake 490 and the left rear wheel electromagnetic brake 496.

(Configuration of Shutoff Circuit 442)

Figure 34:
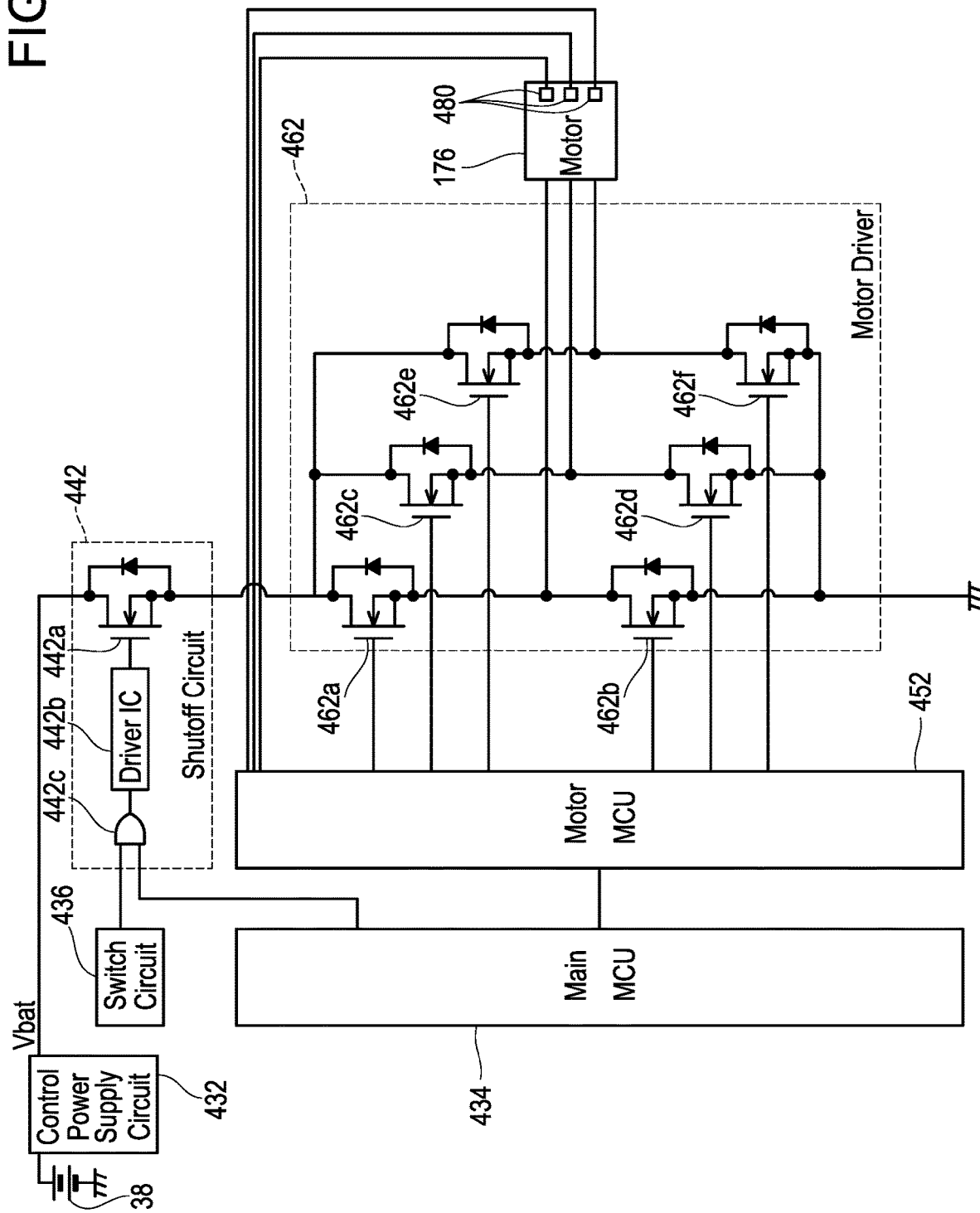
FIG. 34 is a diagram schematically showing a circuit configuration of a shutoff circuit 442 and a motor driver 462 of the embodiment.

As shown in FIG. 34, the shutoff circuit 442 includes a switching element 442a, a driver IC 442b, and an AND gate 442c. The switching element 442a is for example a field effect transistor, and may more specifically be a n-channel MOSFET having an insulated gate. A drain of the switching element 442a is connected to the battery potential (Vbat) output of the control power supply circuit 432, a source of the switching element 442a is connected to the motor driver 462, and a gate of the switching element 442a is connected to the driver IC 442b. A first input terminal of the AND gate 442c is connected to the switch circuit 436, a second input terminal of the AND gate 442c is connected to the main MCU 434, and an output terminal of the AND gate 442c is connected to the driver IC 442b. The driver IC 442b is configured to electrically conduct the switching element 442a when the output terminal of the AND gate 442c has H potential, that is, when both the first input terminal and the second input terminal of the AND gate 442c have H potential. The driver IC 442b is configured not to electrically conduct the switching element 442a when the output terminal of the AND gate 442c has L potential, that is, when one of or both the first input terminal and the second input terminal of the AND gate 442c have L potential.

(Configuration of Motor Driver 462)

The motor driver 462 is connected to the steering motor 176 via U-phase, V-phase, and W-phase output terminals. Further, the motor driver 462 includes a first switching element 462a, a second switching element 462b, a third switching element 462c, a fourth switching element 462d, a fifth switching element 462e, and a sixth switching element 462f. The first switching element 462a, the second switching element 462b, the third switching element 462c, the fourth switching element 462d, the filth switching element 462e, and the sixth switching element 462f may for example be field effect transistors, and may more specifically be n-channel MOSFETs with insulated gates.

A drain of the first switching element 462a is connected to the source of the switching element 442a in the shutoff circuit 442, a source of the first switching element 462a is connected to the U-phase output terminal, and a gate of the first switching element 462a is connected to the motor MCU 452. A drain of the second switching element 462b is connected to the U-phase output terminal, a source of the second switching element 462b is connected to the ground potential, and a gate of the second switching element 462b is connected to the motor MCU 452.

A drain of the third switching element 462c is connected to the source of the switching element 442a of the shutoff circuit 442, a source of the third switching element 462c is connected to the V-phase output terminal, and a gate of the third switching element 462c is connected to the motor MCU 452. A drain of the fourth switching element 462d is connected to the V-phase output terminal, a source of the fourth switching element 462d is connected to the ground potential, and a gate of the fourth switching element 462b is connected to the motor MCU 452.

A drain of the fifth switching element 462e is connected to the source of the switching element 442a in the shutoff circuit 442, a source of the fifth switching element 462c is connected to the W-phase output terminal, and a gate of the fifth switching element 462e is connected to the motor MCU 452. A drain of the sixth switching element 462f is connected to the W-phase output terminal, a source of the sixth switching element 462f is connected to the ground potential, and a gate of the sixth switching element 462f is connected to the motor MCU 452.

A detection signal of the Hall sensor 4110 of the steering motor 176 is inputted to the motor MCU 452. The motor MCU 452 is configured to operate the steering motor 176 at its desired rotation speed by switching on/off of the first switching element 462a, the second switching element 462b, the third switching element 462c, the fourth switching element 462d, the fifth switching element 462e, and the sixth switching element 462f in accordance with the detection signal from the Hall sensor 480. Further, the motor MCU 452 is configured to apply brake to rotation of the steering motor 176 with a so-called short brake by switching the second switching element 462b, the fourth switching element 462d, and the sixth switching element 462f to on.

(Processes Executed by Main MCU 434)

Figure 35:
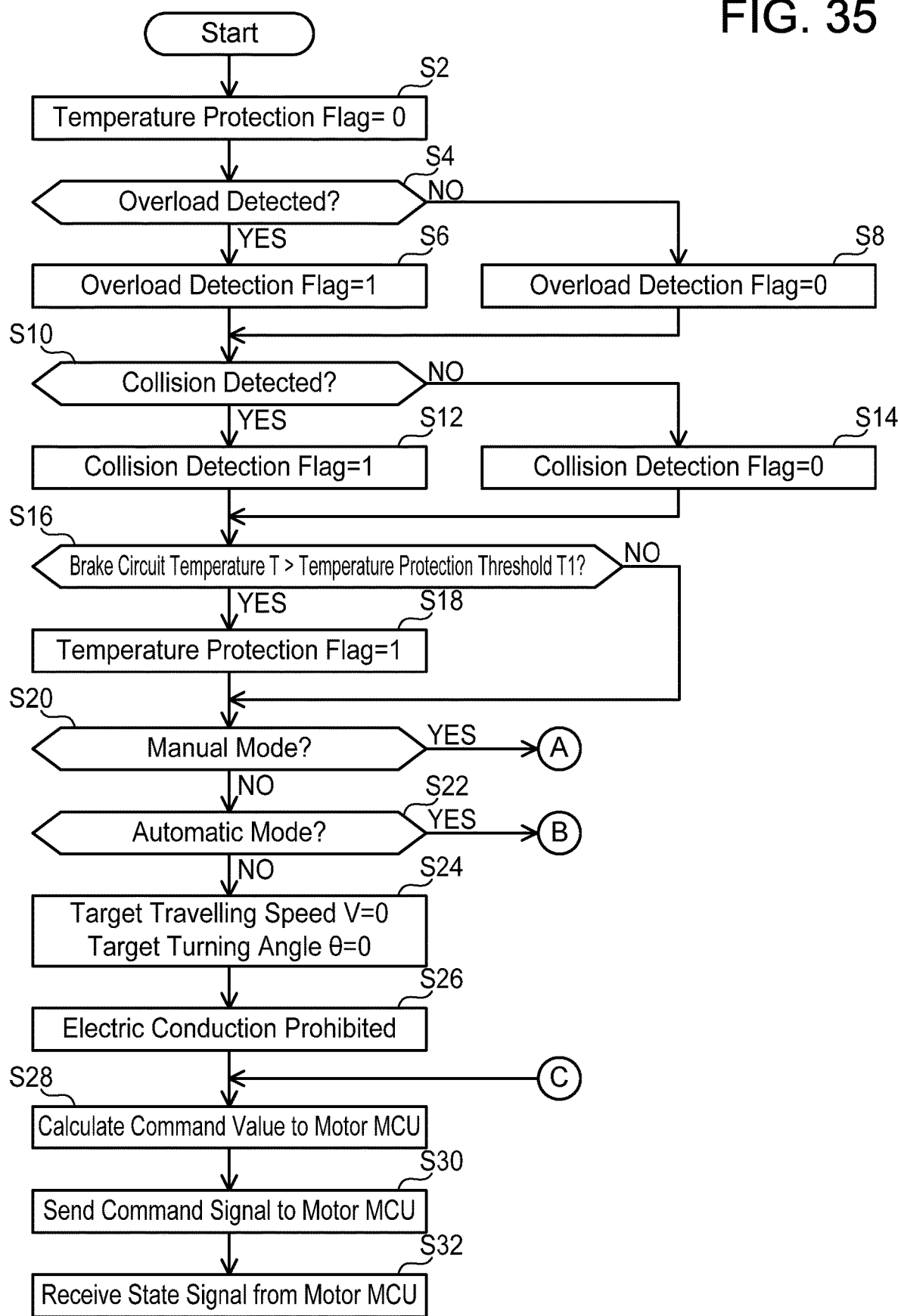
FIG. 35 is a flowchart of processes executed by a main MCU 434 of the cart 2 of the embodiment.
Figure 36:
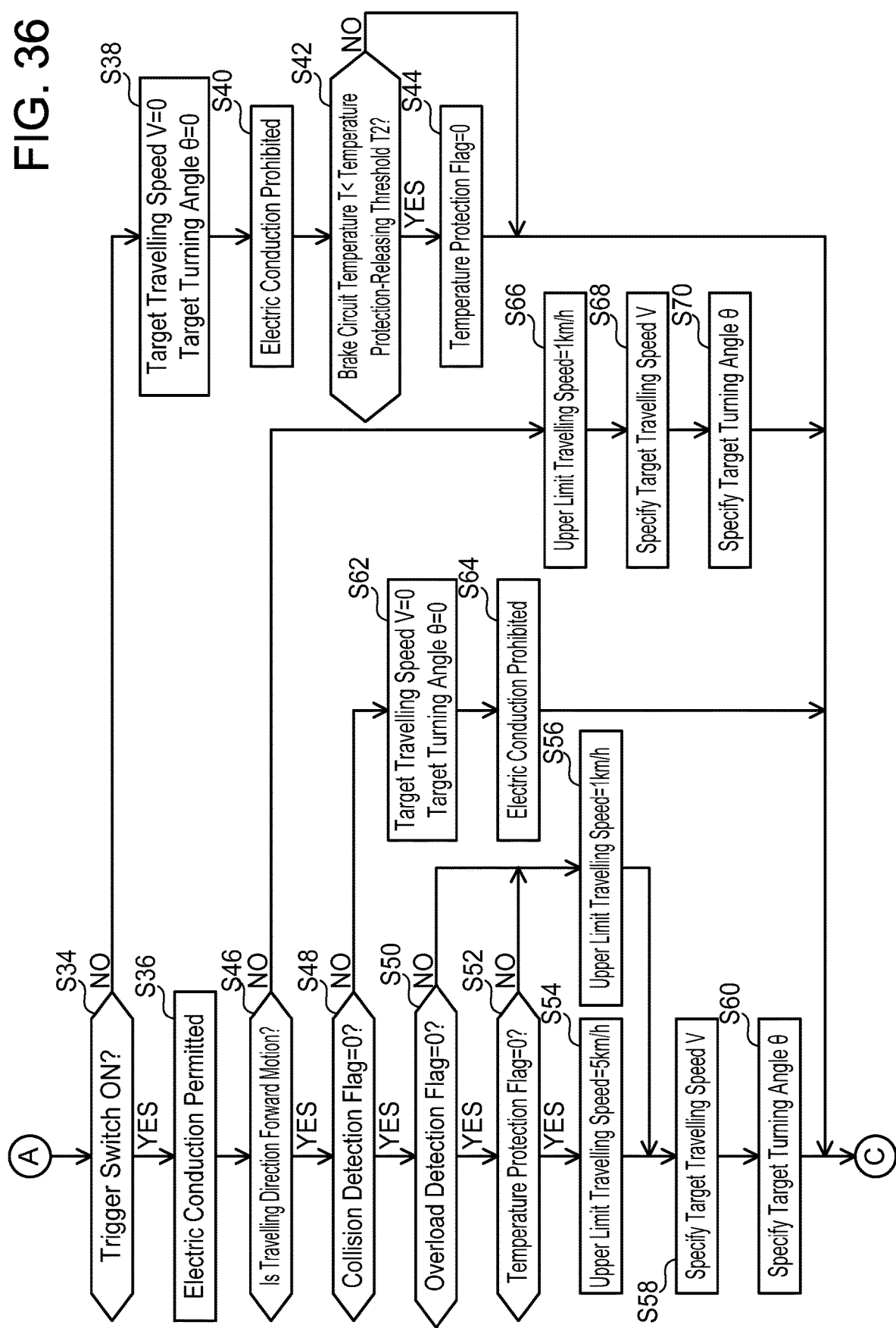
FIG. 36 is a flowchart of processes executed by the main MCU 434 of the cart 2 of the embodiment in a manual mode.
Figure 37:
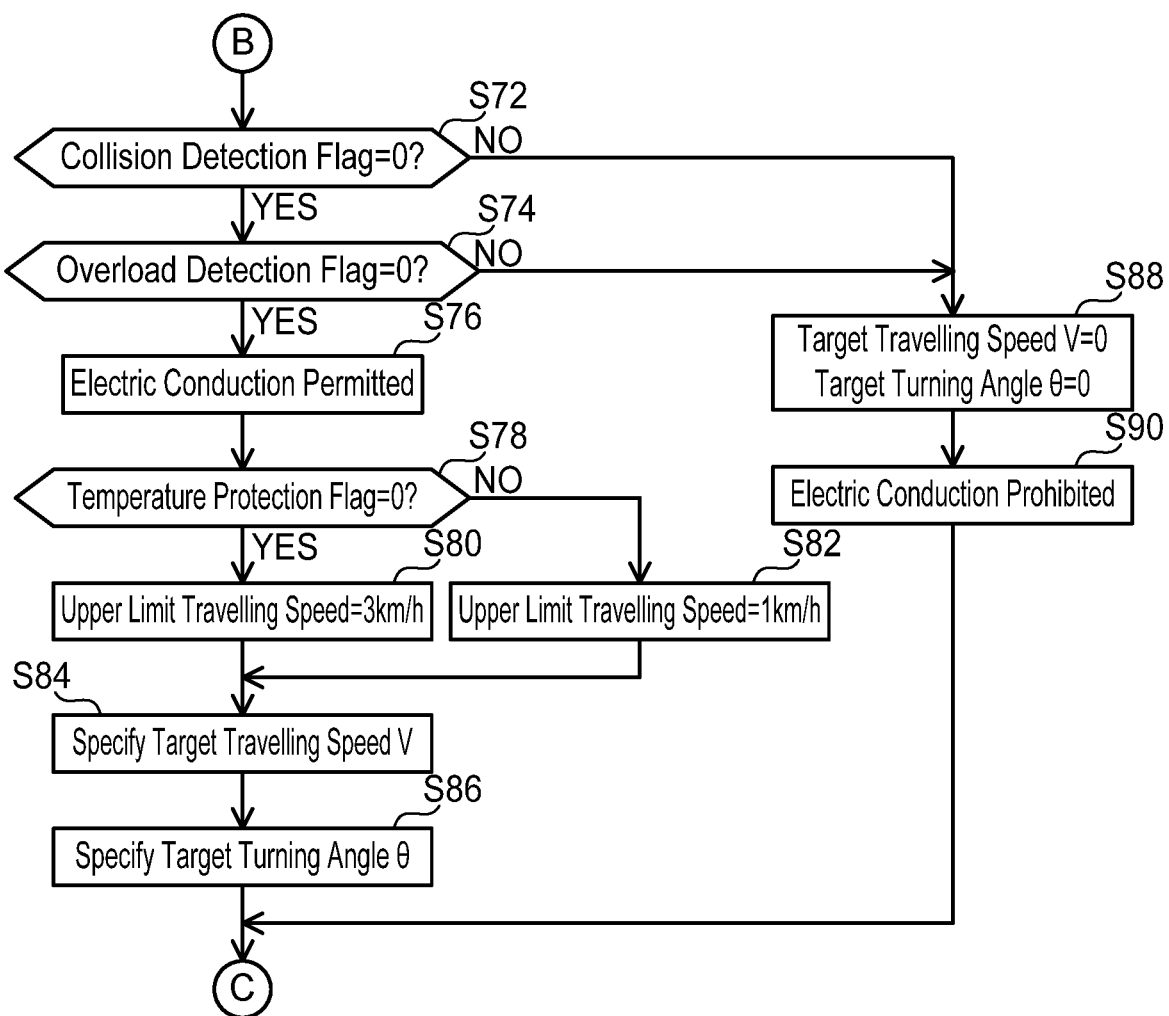
FIG. 37 is a flowchart of processes executed by the main MCU 434 of the cart 2 of the embodiment in an automatic mode.

When the main power of the cart 2 shifts to the on-state, the mam MCU 434 executes processes shown in FIGS. 35 to 37.

As shown in FIG. 35, in S2, the main MCU 434 sets a temperature protection flag to 0.

In S4, the main MCU 434 determines whether an overload is detected in any of the overload detection sensors 320a, 320b, 320c, 320d. In a case where an overload is detected (if YES), the process proceeds to S6. In S6, the main MCU 434 sets an overload detection flag to 1. In a case where no overload is detected in S4 (if NO), the process proceeds to S8. In S8, the main MCU 434 sets the overload detection flag to 0. After S6 or S8, the process proceeds to S10.

In S10, the main MCU 434 determines whether a collision is detected in any of the collision detection switches 530, 532. In a case where a collision is detected (if YES), the process proceeds to S12. In S12, the main MCU 434 sets a collision detection flag to 1. In a case where no collision is detected in S10 (if NO), the process proceeds to S14. In S14, the main MCU 434 sets the collision detection flag to 0. After S12 or S14, the process proceeds to S16.

In S16, the main MCU 434 determines whether any of brake circuit temperatures T detected in the thermistors 468c, 470e, 472e, 474e exceeds a temperature protection threshold T1. In a case where one or more of the brake circuit temperatures T exceed the temperature protection threshold T1 (if YES), the process proceeds to S18. In S18, the main MCU 434 sets the temperature protection flag to 1. After S18, tie process proceeds to S20. In a case where all of the brake circuit temperatures T do not exceed the temperature protection threshold T1 (if NO) in S16, the process proceeds to S20.

In S20, the main MCU 434 determines whether the manual mode is selected in the mode shifter switch 98. In a case where the manual mode is selected (if YES), the process proceeds to S34 (sec FIG. 36). In a case where the manual mode is not selected (if NO), the process proceeds to S22.

In S22, the main MCU 434 determines whether the automatic mode is selected in the mode shifter switch 98. In a case where the automatic mode is selected (if YES), the process proceeds to S72 (see FIG. 37). In a case where the automatic mode is not selected (if NO), the process proceeds to S24.

The process of S24 is executed in a case where neither the manual mode nor the automatic mode is selected in the mode shifter switch 98, that is, in a case where the parking mode is selected in the mode shifter switch 98. In S24, the main MCU 434 sets a target travelling speed V of the cart 2 to 0 km/h and sets a target turning angle θ of the cart 2 to 0°. In S26, the main MCU 434 sends an electric conduction prohibiting signal to the shutoff circuits 438, 440, 442.

In S28, the main MCU 434 calculates rotation speed command values for the right front wheel motor 232, the left front wheel motor 242, the right rear wheel motor 486, and the left rear wheel motor 492 and a steering angle command value for the steering motor 176 from the target travelling speed V and the target turning angle θ.

In S30, the main MCU 434 sends the rotation speed command values for the right from wheel motor 232, the left front wheel motor 242, the right rear wheel motor 486, and the left rear wheel motor 492 and the steering angle command value for the steering motor 176 to the motor MCUs 444, 446, 448, 450, 452.

In S32, the main MCU 434 receives state signals from the motor MCUs 444, 446, 448, 450, 452. After S32, the process returns to S2.

(Processes Executed by Main MCU 434 in Manual Mode)

The process of S34 shown in FIG. 36 is executed in the case where the manual mode is selected in the mode shifter switch 98. In S34, the main MCU 434 determines whether the trigger switch 100 is operated to be the on-state based on an amount of the pressing operation on the trigger switch 100 as inputted from the trigger switch 100. In a case where the trigger switch 100 is operated to be in the on-state (if YES), the process proceeds to S36. In S36, the main MCU 434 sends an electric conduction permitting signal to the shutoff circuits 438, 440, 442. After S36, the process proceeds to S46.

In a case where the trigger switch 100 is not operated to be in the on-state (if NO) in S34, the process proceeds to S38. In S38, the main MCU 434 sets the target travelling speed V of the cart 2 to 0 km/h, and sets the target turning angle θ of the cart 2 to 0°.

In S40, the main MCU 434 sends the electric conduction prohibiting signal to the shutoff circuits 438, 440, 442.

In S42, the main MCU 434 determines whether all of the brake circuit temperatures T detected in the thermistors 468e, 470e, 472e, 474e are below a temperature protection-releasing threshold T2. In a case where all of the brake circuit temperatures T are below the temperature protection-releasing threshold T2 (if YES), the process proceeds to S44. In a case where any of the brake circuit temperatures T is equal to or above the temperature protection-releasing threshold 12 (if NO) in S42, the process proceeds to S28 (see FIG. 35).

The process of S44 is executed when the manual mode is selected in the mode shifter switch 98, the target travelling speed V of the cart 2 is set to 0 km/h, the electric conduction prohibiting signal has been sent from the main MCU 434 to the shutoff circuits 438, 440, 442 (that is, the cart 2 is stopped), and all of the brake circuit temperatures T are below the temperature protection-releasing threshold T2. In S44, the main MCU 434 sets the temperature protection flag to 0. After S44, the process proceeds to S28 (see FIG. 35).

In S46, the main MCU 434 determines whether the forward motion is selected in the travelling direction shifter switch 102. In a case where the forward motion is selected (if YES), the process proceeds to S48.

In S48, the main MCU 434 determines whether the collision detection flag is 0. In a case where the collision detection flag is 0 (if YES), the process proceeds to S50.

In S50, the main MCU 434 determines whether the overload detection flag is 0. In a case where the collision detection flag is 0 (if YES), the process proceeds to S52.

In S52, the main MCU 434 determines whether the temperature protection flag is 0. In a case where the temperature protection flag is 0 (if YES), the process proceeds to S54.

In S54, the main MCU 434 sets the upper limit travelling speed of the cart 2 to a first upper limit travelling speed (such as 5 km/h). After S54, the process proceeds to S58.

In a case where the overload detection flag is 1 (if NO) in S50 and also in a case where the temperature protection flag is 1 (if NO) in S52, the process proceeds to S56. In S56, the main MCU 434 sets the upper limit travelling speed of the cart 2 to a second upper limit travelling speed (such as 1 km/h) that is lower than the first upper limit travelling speed. After S56, the process proceeds to S58.

In S58, the main MCU 434 specifies the target travelling speed V of the cart 2 based on the amount of the pressing operation performed on the trigger switch 100 as inputted from the trigger switch 100. In doing so, if the target travelling speed V specified based on the amount of the pressing operation performed on the trigger switch 100 is equal to or greater than the upper limit travelling speed set in S54 or S56, the main MCU 434 adjusts the target travelling speed V to match the upper limit travelling speed.

In S60, the main MCU 434 specifies the target turning angle θ of the cart 2 based on a rotation angle of the handle shaft 84 as inputted from the rotation angle sensor 88. After S60, the process proceeds to S28 (see FIG. 35).

In a case where the collision detection flag is 1 (if NO) in S48, the process proceeds to S62. The process of S62 is executed when the manual mode is selected in the mode shifter switch 98, the forward motion is selected in the travelling direction shifter switch 102, and the collision detection flag is 1. In S62, the main MCU 434 sets the target travelling speed V of the cart 2 to 0 km/h and sets the target turning angle θ of the cart 2 to 0°. In S64, the main MCU 434 sends the electric conduction prohibiting signal to the shutoff circuits 438, 440, 442. After S64, the process proceeds to S28 (see FIG. 35).

In a case where the backward motion is selected in the travelling direction shifter switch 102 (if NO) in S46, the process proceeds to S66. The process of S66 is executed when the manual mode is selected in the mode shifter switch 98 and the backward motion is selected in the travelling direction shifter switch 102. In S66, the main MCU 434 sets the upper limit travelling speed of the cart 2 to the second upper limit travelling speed (such as 1 km/h).

In S68, the main MCU 434 specifics the target travelling speed V of the cart 2 based on the amount of the pressing operation performed on the trigger switch 100 as inputted from the trigger switch 100. In doing, so, if the target travelling speed V specified based on the amount of the pressing operation performed on the trigger switch 100 is equal to or greater than the upper limit travelling speed set in S66, the main MCU 434 adjusts the target travelling speed V to match the upper limit travelling speed.

In S70, the main MCU 434 specifies the target turning angle θ of the cart 2 based on the rotation angle of the handle shaft 84 as inputted from the rotation angle sensor 88. After S70, the process proceeds to S28 (see FIG. 35).

The upper limit travelling speed of the cart 2 in the process of S54 may suitably be changed in accordance with an operation that was performed on the speed shifter switch 104. For example, when the travelling speed of the cart 2 is set to high speed in the speed shifter switch 104, the upper limit travelling speed of the cart 2 may be set to the first upper limit travelling speed (such as 5 km/h); when the travelling speed of the cart 2 is set to medium speed in the speed shifter switch 104, the upper limit travelling speed of the cart 2 may be set to a third upper limit travelling speed (such as 3 km/h) that is lower than the first upper limit travelling speed and higher than the second upper limit travelling speed; and when the travelling speed of the cart 2 is set to low speed in the speed shifter switch 104, the upper limit travelling speed of the cart 2 may be set to a fourth upper limit travelling speed (such as 1.5 km/h) that is lower than the third upper limit travelling speed and higher than the second upper limit travelling speed.

(Processes Executed by MCU 434 in Automatic Mode)

The process of S72 shown in FIG. 37 is executed when the automatic mode is selected in the mode shifter switch 98. In S72, the main MCU 434 determines whether the collision detection flag is 0. In a case where the collision detection flag is 0 (if YES), the process proceeds to S74.

In S74, the main MCU 434 determines whether the overload detection flag is 0. In a case where the overload detection flag is 0 (if YES), the process proceeds to S76.

In S76, the main MCU 434 sends the electric conduction permitting signal to the shutoff circuits 438, 440, 442.

In S78, the main MCU 434 determines whether the temperature protection flag is 0. In a case where the temperature protection flag is 0 (if YES), the process proceeds to S80. In S80, the main MCU 434 sets the upper limit travelling speed of the cart 2 to the third upper limit travelling speed (such as 3 km/h). After S80, the process proceeds to S84.

In a case where the temperature protection flag is 1 (if NO) in S78, the process proceeds to S82. In S82, the main MCU 434 sets the upper limit travelling speed of the cart 2 to the second travelling speed (such as 1 km/h). After S82, the process proceeds to S84.

In S84, the main MCU 434 specifies the target travelling speed V of the cart 2 based on the command value from the automatic driving MCU 430. In doing so, if the target travelling speed V specified based on the command value from the automatic driving MCU 430 is equal to or higher than the upper limit travelling speed set in S80 or S82, the main MCU 434 adjusts the target travelling speed V to match the upper limit travelling speed.

In S86, the main MCU 434 specifies the target turning angle θ of the cart 2 based on the command value from the automatic driving MCU 430. After S86, the process proceeds to S28 (see FIG. 35).

In a case where the collision detection flag is 1 (if NO) in S72, and also in a case where the overload detection flag is 1 (if NO) in S74, the process proceeds to S88. The process of S88 is executed when the automatic mode is selected in the mode shifter switch 98 and the collision detection flag is 1, or when the automatic mode is selected in the mode shifter switch 98 and the overload detection flag is 1. In S88, the main MCU 434 sets the target travelling speed V of the cart 2 to 0 km/h and sets the target turning angle θ of the cart 2 to 0°. In S90, the main MCU 434 sends the electric conduction prohibiting signal to the shutoff circuits 438, 440, 442. After S90, the process proceeds to S28 (see FIG. 35).

(Processes Executed by Motor MCUs 444, 446)

Figure 38:
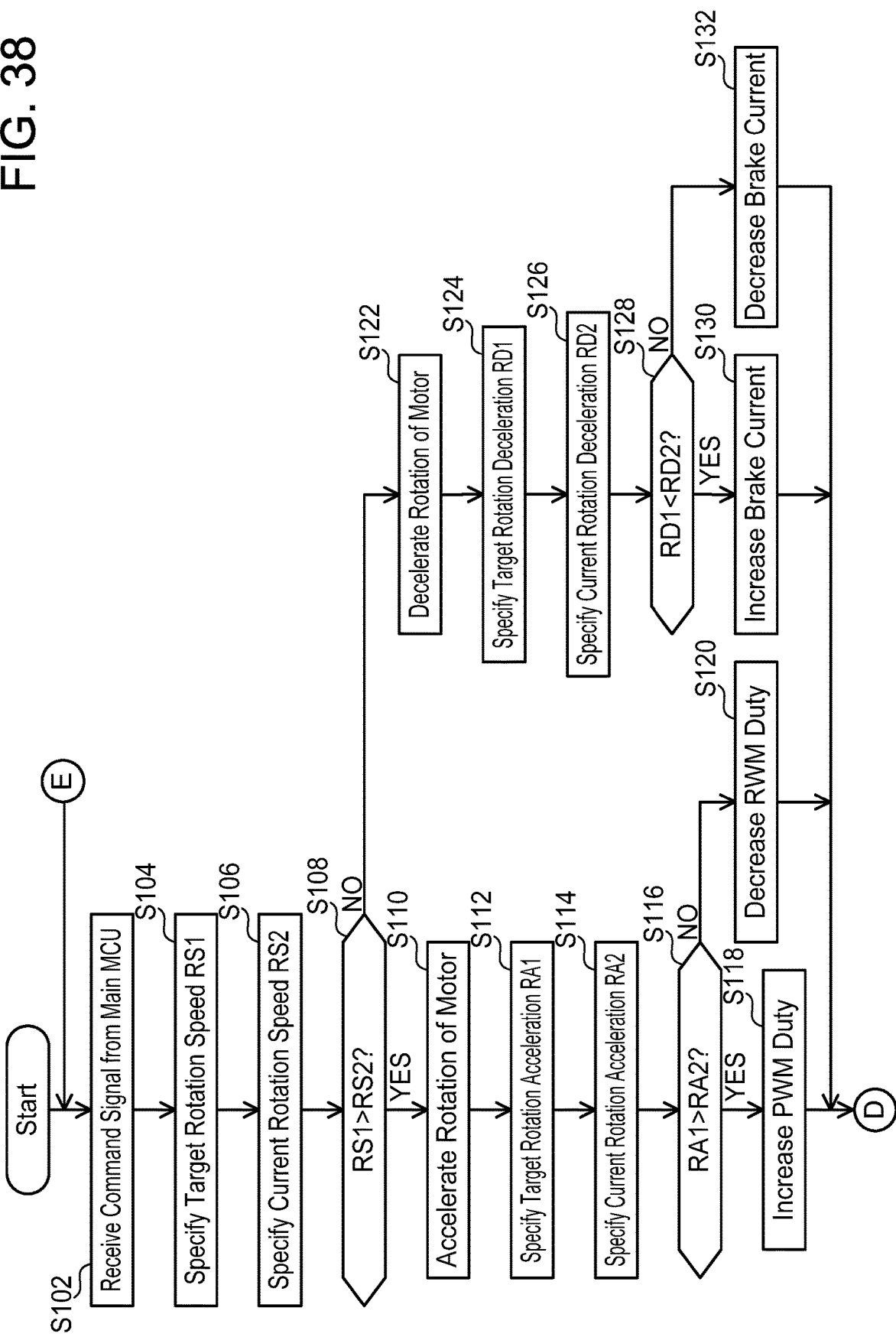
FIG. 38 is a flow chart of processes executed by motor MCUs 444, 446 of the cart 2 of the embodiment.
Figure 39:
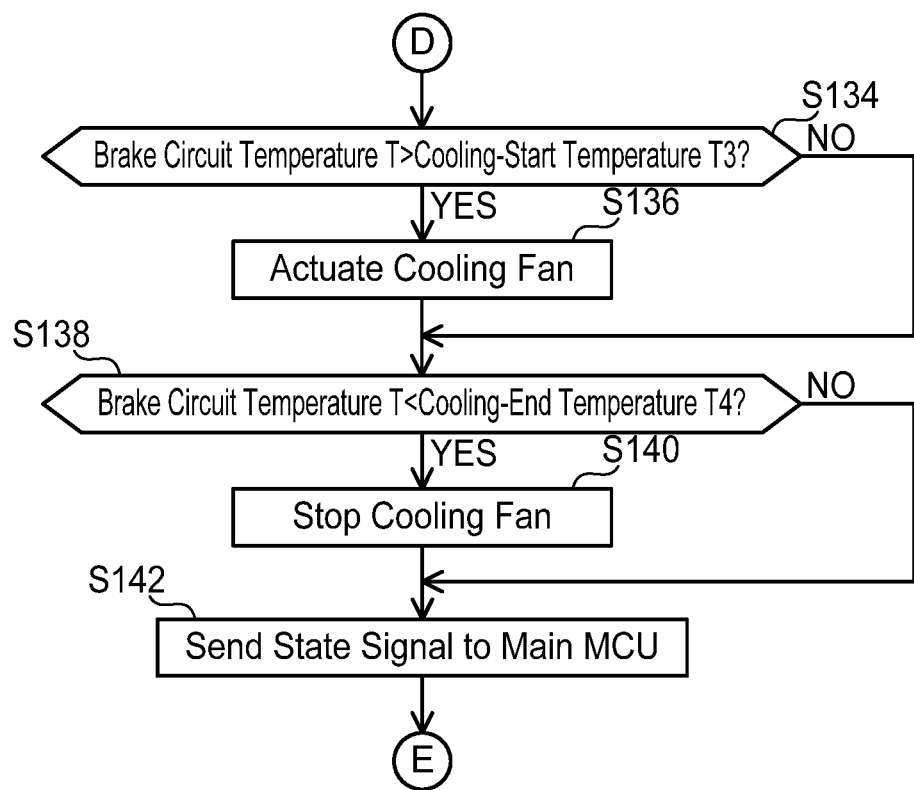
FIG. 39 is a flowchart of processes executed by the motor MCUs 444, 446 of the cart 2 of the embodiment.

When the main power of the cart 2 shifts to the on-state, each of the motor MCUs 444, 446 executes the processes shown in FIGS. 38 and 39.

As shown in FIG. 38, in S102, the motor MCUs 444, 446 receive a command signal from the main MCU 434.

In S104, the motor MCUs 444, 446 specify target rotation speeds RS1 of the right front wheel motor 232 and the left front wheel motor 242 based on the command signal received from the main MCU 434.

In S106, the motor MCUs 444, 446 specify current rotation speeds RS2 of the right front wheel motor 232 and the left front wheel motor 242 based on the detection signals received from the Hall sensors 482, 484.

In S108, the motor MCUs 444, 446 each determine whether the target rotation speed RS1 specified in S104 is higher than the current rotation speed RS2 specified in S106. In a case where the target rotation speed RS1 is higher than the current rotation speed RS2 (if YES), the process proceeds to S110.

In S110, the motor MCUs 444, 446 execute PWM control on the right front wheel motor 232 and the left front wheel motor 242 using the motor drivers 454, 456 to accelerate rotation of tire right front wheel motor 232 and the left front wheel motor 242. In this S110, the motor MCUs 444, 446 input 0 as current command values to the brake circuits 468, 470 and thereby disable operations of the brake circuits 468, 470.

In S112, the motor MCUs 444, 446 each specify target rotation acceleration RA1 based on a difference between the target rotation speed RS1 specified in S104 and the current rotation speed RS2 specified in S106.

In S114, the motor MCUs 444, 446 each specify current rotation acceleration RA2 based on the detection signal received from the corresponding Hall sensor 482, 484.

In S116, the motor MCUs 444, 446 each determine whether the target rotation acceleration RA1 specified in S112 is greater than the current rotation acceleration RA2 specified in S114. In a case where the target rotation acceleration RA1 is greater than the current rotation acceleration RA2 (if YES), the process proceeds to S118. In S118, the motor MCUs 444, 446 increase duty ratios in the PWM control of the right front wheel motor 232 and the left front wheel motor 242 by the motor drivers 454, 456. In a case where the target rotation acceleration RA1 is equal to or smaller than the current rotation acceleration RA2 (if NO; in S116, the process proceeds to S120. In S120, the motor MCUs 444, 446 decrease the duty ratios in the PWM control of the right front wheel motor 232 and the left front wheel motor 242 by the motor drivers 454, 456. After S118 or S120, the process proceeds to S134 (see FIG. 39).

In a case where the target rotation speed RS1 is equal to or smaller than the current rotation speed RS2 (if NO) in S108, the process proceeds to S122. In S122, the motor MCUs 444, 446 decelerate the rotation of the right front wheel motor 232 and the left front wheel motor 242 using the brake circuits 468, 470. In this S122, the motor MCUs 444, 446 disable operations of the motor drivers 454, 456.

In S124, the motor MCUs 444, 446 each specify a target rotation deceleration RD1 based on a difference between the target rotation speed RS1 specified in S104 and the current rotation speed RS2 specified in S106.

In S126, the motor MCUs 444, 446 each specify a current rotation deceleration RD2 based on the detection signal received from the corresponding Hall sensor 482, 484.

In S128, the motor MCUs 444, 446 each determine whether the target rotation deceleration RD1 specified in S124 is smaller than the current rotation deceleration RD2 specified in S126. In a case where the target rotation deceleration RD1 is smaller titan the current rotation deceleration RD2 (if YES), the process proceeds to S130. In S130, the motor MCUs 444, 446 increase the current command values to the brake circuits 468, 470. In a case where the target rotation deceleration RD1 is equal to or greater than the current rotation deceleration RD2 (if NO) in S128, the process proceeds to S132. In S132, the motor MCUs 444, 446 decrease the current command values to the brake circuits 468, 470. After S130 or S132, the process proceeds to S134 (see FIG. 39).

As shown in FIG. 39, in S134, the motor MCUs 444, 446 each determine whether the brake circuit temperature T detected in the corresponding thermistor 468c, 470e exceeds a cooling-start temperature T3. In a case where the brake circuit temperature T exceeds the cooling-start temperature T3 (if YES), the process proceeds to S136. In S136, the motor MCUs 444, 446 actuate the cooling fans 50d, 52d and cool the electrical brake circuit boards 50, 52. After S136, the process proceeds to S138. In a case where the brake circuit temperature T is equal to or lower than the cooling-start temperature T3 (if NO) in S134, the process proceeds to S138.

In S138, the motor MCUs 444, 446 each determine whether the brake circuit temperature T detected in the corresponding thermistor 468e, 470e is below a cooling-end temperature T4 that is lower than the cooling-start temperature T3. In a case where the brake circuit temperature T is below the cooling-end temperature T4 (if YES), the process proceeds to S140. In S140, the motor MCUs 444, 446 stop the cooling fans 50d, 52d and end to cool the electrical brake circuit boards 50, 52. After S140, the process proceeds to S142. In a case where the brake circuit temperature T is equal to or higher than the cooling-end temperature T4 (if NO) in S138, the process proceeds to S142.

In S142, the motor MCUs 444, 446 send the state signals to the main MCU 434. After S142, the process returns to S102 (see FIG. 38).

As above, the motor MCUs 444, 446 are configured to actuate the cooling fans 50d, 52d based on the brake circuit temperatures T detected by the thermistors 468e, 470e and thereby cool the electrical brake circuit boards 50, 52. By configuring as such, the motor MCUs 444, 446 can continuously brake the right front wheel motor 232 and the left front wheel motor 242 using the brake circuits 468, 470 over a long period of time. For example, the motor MCUs 444, 446 can continue the braking operation on the right front wheel motor 232 and the left front wheel motor 242 by the brake circuits 468, 470 for more than 15 minutes, specifically for more than 30 minutes, and more specifically, for more than an hour.

(Processes Executed by Motor MCUs 448, 450)

Figure 40:
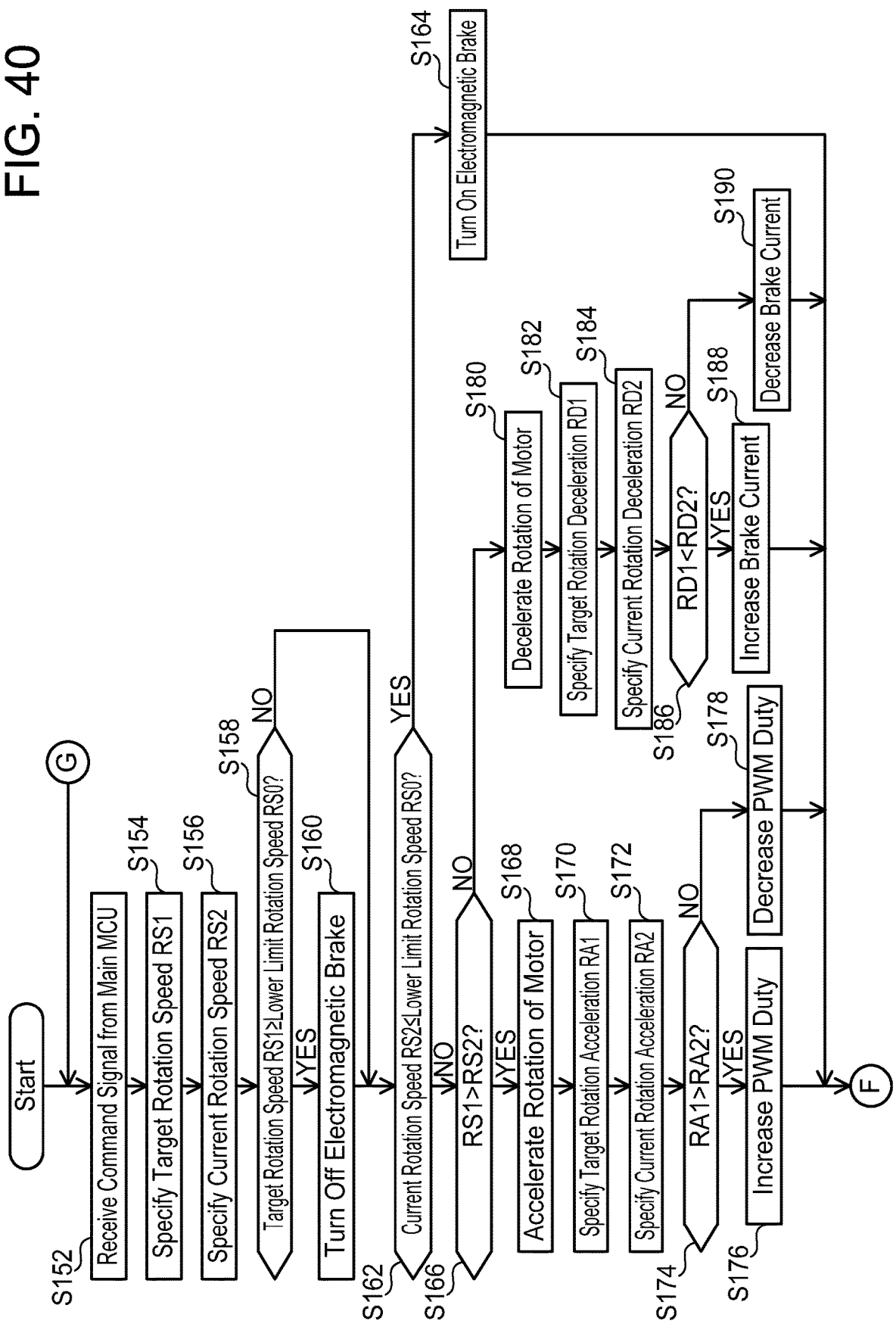
FIG. 40 is a flowchart of processes executed by motor MCUs 448, 450 of the cart 2 of the embodiment.
Figure 41:
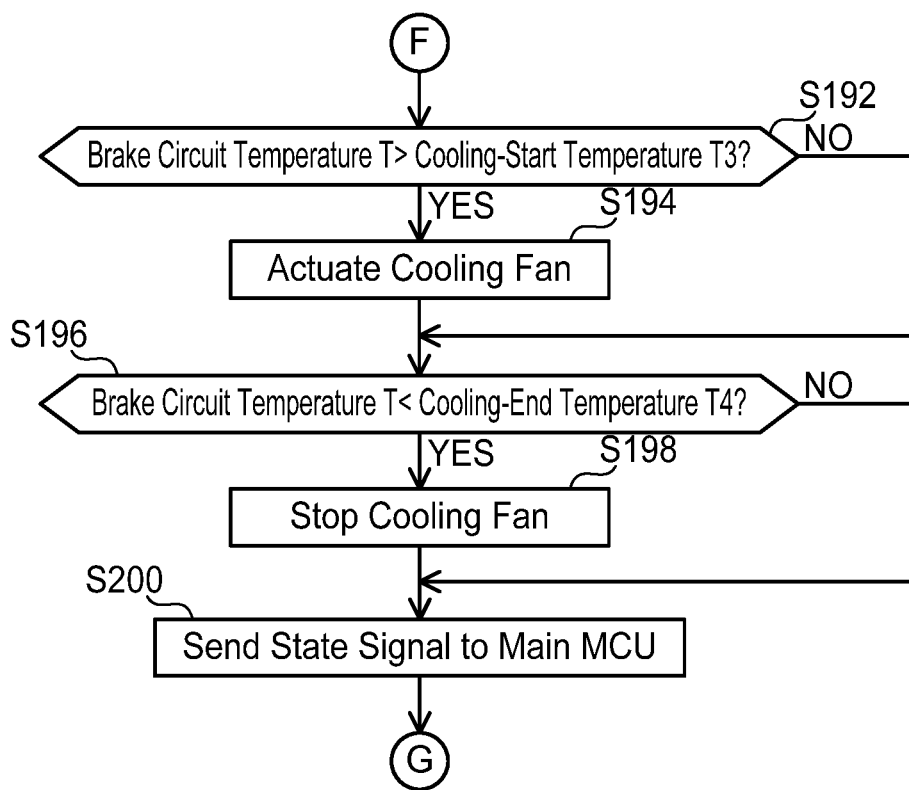
FIG. 41 is a flowchart of processes executed by the motor MCUs 448, 450 of the cart 2 of the embodiment.

When the main power of the cart 2 shifts to the on-state, the motor MCUs 448, 450 execute processes shown in FIGS. 40 and 41.

As shown in FIG. 40, in S152, the motor MCUs 448, 450 receive the command signal from the main MCU 434.

In S154, the motor MCUs 448, 450 specify target rotation speeds RS1 of the right rear wheel motor 486 and the left rear wheel motor 492 basal on the command signal received from the main MCU 434.

In S156, the motor MCUs 448, 450 specify current rotation speeds RS2 of the right rear wheel motor 486 and the left rear wheel motor 492 based on the detection signals received from the Hall sensors 488, 494.

In S158, the motor MCUs 448, 450 each determine whether the target rotation speed RS1 specified in S154 is equal to or higher than a lower limit, rotation speed RS0. In a case where the target rotation speed RS1 is equal to or higher than the lower limit rotation speed RS0 (if YES), the process proceeds to S160. In S160, the motor MCUs 448, 450 turn off the right rear wheel electromagnetic brake 490 and the left rear wheel electromagnetic brake 496 using the electromagnetic brake drivers 464, 466. After S160, the process proceeds to S162. In a case where the target rotation speed RS1 is below the lower limit rotation speed RS0 (if NO), the process proceeds to S162.

In S162, the motor MCUs 448, 450 each determine whether the current rotation speed RS2 specified in S156 is equal to or lower than the lower limit rotation speed RS0. In a case where the current rotation speed RS2 is equal to or lower than the lower limit rotation speed RS0 (if YES), the process proceeds to S164. In S164, the motor MCUs 448, 450 turn on the right rear wheel electromagnetic brake 490 and the left rear wheel electromagnetic brake 496 using the electromagnetic brake drivers 464, 466. After S164, the process proceeds to S192 (see FIG. 41). In a case where the current rotation speed RS2 exceeds the lower limit rotation speed RS0 (it NO), the process proceeds to S166.

In S166, the motor MCUs 448, 450 each determine whether the target rotation speed RS1 specified in S154 is higher than the current rotation speed RS2 specified in S156. In a case where the target rotation speed RS1 is higher than the current rotation speed RS2 (if YES), the process proceeds to S168.

In S168, the motor MCUs 448, 450 accelerate the rotation of the right rear wheel motor 486 and the left rear wheel motor 492 by executing PWM control on the right rear wheel motor 486 and the left rear wheel motor 492 using the motor drivers 458, 460. In S168, the motor MCUs 448, 450 input 0 as the current command values to the brake circuits 472, 474 and thereby disable operations of the brake circuits 472, 474.

In S170, the motor MCUs 448, 450 each specify the target rotation acceleration RA1 based on a difference between the target rotation speed RS1 specified in S154 and the current rotation speed RS2 specified in S156.

In S172, the motor MCUs 448, 450 each specify the current rotation acceleration RA2 based on the detection signal received from the corresponding Hall sensor 488, 494.

In S174, the motor MCUs 448, 450 each determine whether the target rotation acceleration RA1 specified in S170 is greater than the current rotation acceleration RA2 specified in S172. In a case where the target rotation acceleration RA1 is greater than the current rotation acceleration RA2 (if YES), the process proceeds to S176. In S176, the motor MCUs 448, 450 increase duty ratios in the PWM control of the right rear wheel motor 486 and the left rear wheel motor 492 by the motor drivers 458, 460. In a case where the target rotation acceleration RA1 is equal to or smaller than the current rotation acceleration RA2 (if NO) in S174, the process proceeds to S178. In S178, the motor MCUs 448, 450 decrease the duty ratios in the PWM control of the right rear wheel motor 486 and the left rear wheel motor 492 by the motor drivers 458, 460. After S176 or S178, the process proceeds to S192 (see FIG. 41).

In a case where the target rotation speed RS1 is equal to or smaller than the current rotation speed RS2 (if NO) in S166, the process proceeds to S180. In S180, the motor MCUs 448, 450 decelerate the rotation of the right rear wheel motor 486 and the left rear wheel motor 492 using the brake circuits 472, 474. In this S180, the motor MCUs 448, 450 disable operations of the motor drivers 458, 460.

In S182, the motor MCUs 448, 450 each specify the target rotation deceleration RD1 based on a difference between the target rotation speed RS1 specified in S154 and the current rotation speed RS2 specified in S156.

In S184, the motor MCUs 448, 450 each specify the current rotation deceleration RD2 based on the detection signal received from the corresponding Hall sensor 488, 494.

In S186, the motor MCUs 448, 450 each determine whether the target rotation deceleration RD1 specified in S182 is smaller than the current rotation deceleration RD2 specified in S184. In a case where the target rotation deceleration RD1 is smaller than the current rotation deceleration RD2 (if YES), the process proceeds to S188. In S188, the motor MCUs 448, 450 increase the current command values to the brake circuits 472, 474. In a case where the target rotation deceleration RD1 is equal to or greater than the current rotation deceleration RD2 (if NO) in S186, the process proceeds to S190. In S190, the motor MCUs 448, 450 decrease the current command values to the brake circuits 472, 474. After S188 or S190, the process proceeds to S192 (see FIG. 41).

As shown in FIG. 41, in S192, the motor MCUs 448, 450 each determine whether the brake circuit temperature T detected in the corresponding thermistor 472e, 474c exceeds the cooling-start temperature T3. In a case where the brake circuit temperature T exceeds the cooling-start temperature T3 (if YES), the process proceeds to S194. In S194, the motor MCUs 448, 450 actuate the cooling fans 54d, 56d and cool the electrical brake circuit boards 54, 56. After S194, the process proceeds to S196. In a case where the brake circuit temperature T is equal to or lower than the cooling-start temperature T3 (if NO) in S192, the process proceeds to S196.

In S196, the motor MCUs 448, 450 each determine whether the brake circuit temperature T detected in the corresponding thermistor 472e, 474e is below the cooling-end temperature T4. In a case where the brake circuit temperature T is below the cooling-end temperature T4 (if YES), the process proceeds to S198. In S198, the motor MCUs 448, 450 stop the cooling fans 54d, 56d and end to cool the electrical brake circuit boards 54, 56. After S198, the process proceeds to S200. In a case where the brake circuit temperature T is equal to or higher than the cooling-end temperature T4 (if NO) in S196, the process proceeds to S200.

In S200, the motor MCUs 448, 450 send the state signals to the main MCU 434. After S200, the process returns to S152 (see FIG. 40).

Figure 42:
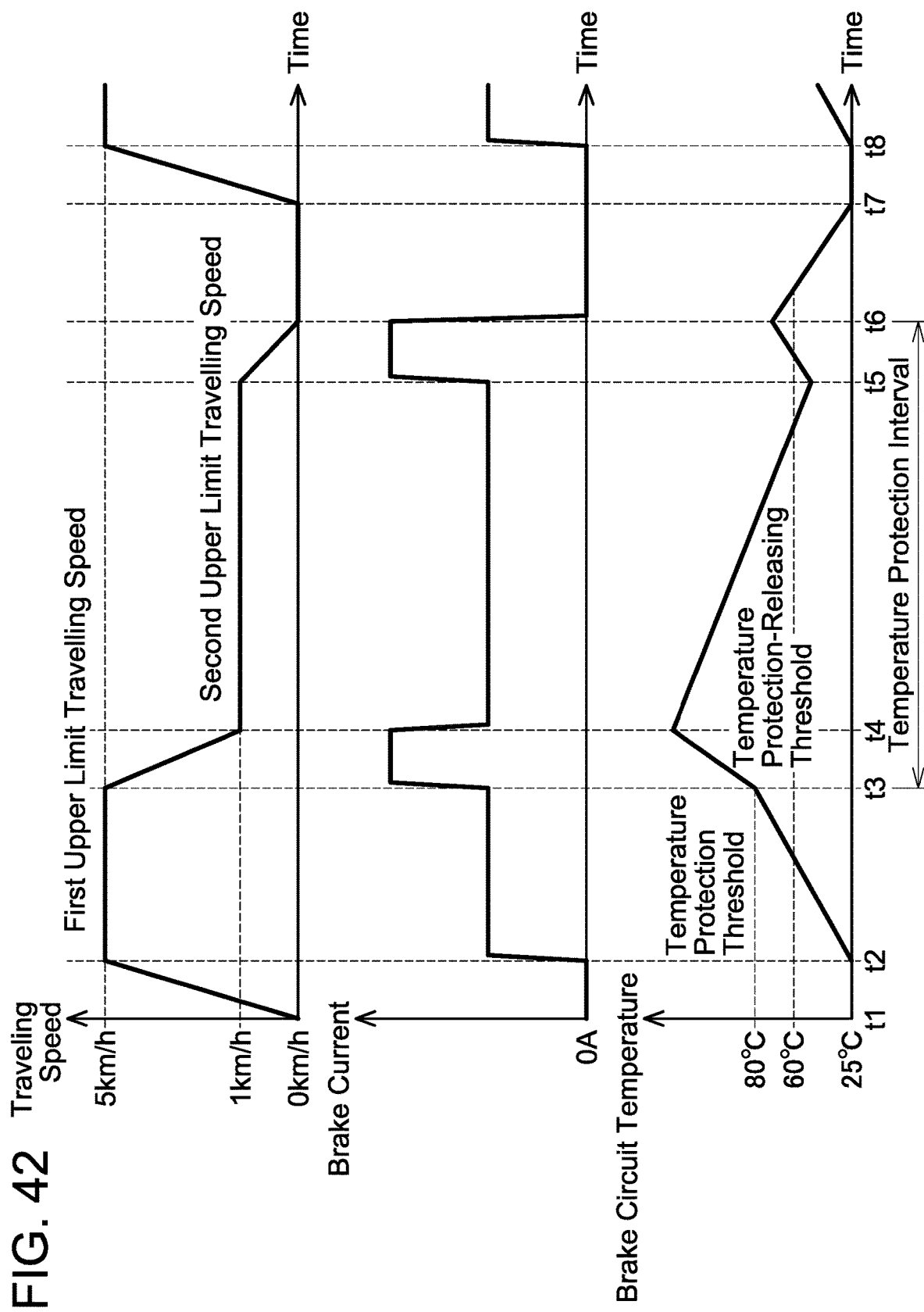
FIG. 42 is a graph showing chronological changes in a travelling speed, a brake current, and a brake circuit temperature in a case where the cart 2 of the embodiment travels on flatland and downhill in the manual mode.

FIG. 42 shows an example of changes in the travelling speed, the brake current, and the brake circuit temperature over time, in a case where the cart 2 travels on flatland and downhill in the manual mode. In the example shown in FIG. 42, the manual mode is selected in the mode shifter switch 98, and the forward motion is selected in a forward motion/backward motion shifter switch. When the trigger switch 100 is switched from off to on at time t1, the right rear wheel electromagnetic brake 490 and the left rear wheel electromagnetic brake 496 are released by the electromagnetic brake drivers 464, 466, and the cart 2 starts to move forward by the motor drivers 454, 456, 458, 460 driving the right front wheel motor 232, the left front wheel motor 242, the right rear wheel motor 486, and the left rear wheel motor 492. When the travelling speed of the cart 2 reaches the first upper limit travelling, speed at time t2, the brake circuits 468, 470, 472, 474 are actuated and electrical brake is applied to the right front wheel motor 232, the left front wheel motor 242, the right rear wheel motor 486, and the left rear wheel motor 492. Since the brake circuits 468, 470, 472, 474 remain actuated even after the cart 2 moved from the flatland to the downhill, the travelling speed of the cart 2 is maintained at the first upper limit travelling speed. Further, as the brake circuits 468, 470, 472, 474 continue to operate, the temperatures of the brake circuits 468, 470, 472, 474 increase. When the temperatures of the brake circuits 468, 470, 472, 474 exceed the temperature protection threshold T1 at time t3, the upper limit travelling speed of the cart 2 switches from the first upper limit travelling speed to the second upper limit travelling speed, and the brake circuits 468, 470, 472, 474 apply stronger electrical brake on the right front wheel motor 232, the left front wheel motor 242, the right rear wheel motor 486, and the left rear wheel motor 492. Due to this, the travelling speed of the cart 2 decreases, however, the temperatures of the brake circuits 468, 470, 472, 474 increase at a faster rate. When the travelling speed of the cart 2 decreases to the second upper limit travelling speed at time t4, the electrical brake which the brake circuits 468, 470, 472, 474 apply to the right front wheel motor 232, the left front wheel motor 242, the right rear wheel motor 486, and the left rear wheel motor 492 becomes weaker, by which the temperatures of the brake circuits 468, 470, 472, 474 drop. This temperature protection is not released until the cart 2 stops even after the temperatures of the brake circuits 468, 470, 472, 474 drop below the temperature protection threshold T1 and further drop below the temperature protection-releasing threshold T2, so the upper limit travelling speed of the cart 2 is maintained at the second upper limit travelling speed. When the trigger switch 100 is switched from on to off at time t5, strong electrical brake is applied to the right front wheel motor 232, the left front wheel motor 242, the right tear wheel motor 486, and the left rear wheel motor 492 by the brake circuits 468, 470, 472, 474. When the cart 2 stops at lime t6, the temperature protection is released, and the upper limit travelling speed of the cart 2 switches from the second upper limit travelling speed to the first upper limit travelling speed. Further, when the cart 2 stops at time t6, the electrical brake by the brake circuits 468, 470, 472, 474 is terminated and short brake by the motor drivers 454, 456, 458, 460 is applied to the right front wheel motor 232, the left front wheel motor 242, the right rear wheel motor 486, and the left rear wheel motor 492, and thereafter the right rear wheel 252 and the left rear wheel 272 are locked by the right rear wheel electromagnetic brake 490 and the left rear wheel electromagnetic brake 496. After the electrical brake by the brake circuits 468, 470, 472, 474 is terminated, the temperatures of the brake circuits 468, 470, 472, 474 continue to drop. After this, when the trigger switch 100 is switched again from off to on at time t7, the right rear wheel electromagnetic brake 490 and the left rear wheel electromagnetic brake 496 are released by the electromagnetic brake drivers 464, 466, and the cart starts to move forward by the motor drivers 454, 456, 458, 460 driving the right front wheel motor 232, the left front wheel motor 242, the right rear wheel motor 486, and the left rear wheel motor 492. When the travelling speed of the cart 2 reaches the first upper limit travelling speed at time t8, the brake circuits 468, 470, 472, 474 are actuated and electrical brake is applied to the right front wheel motor 232, the left front wheel motor 242, the right rear wheel motor 486, and the left rear wheel motor 492.

(Processes Executed by Motor MCU 452)

Figure 43:
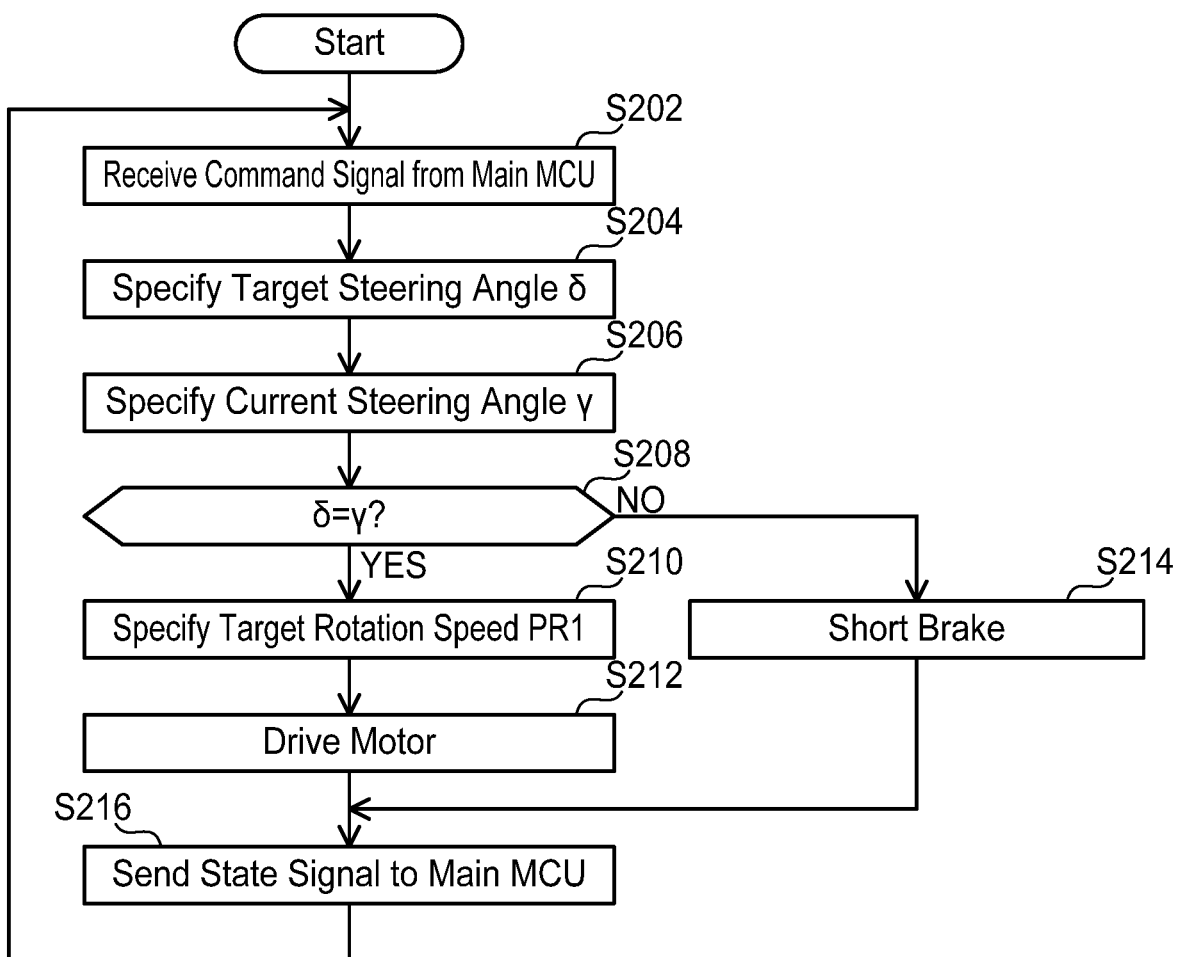
FIG. 43 is a flowchart of processes executed by a motor MCU 452 of the cart 2 of the embodiment.

When the main power of the cart 2 shifts to the on-state, the motor MCU 452 executes processes shown in FIG. 43.

In S202, the motor MCU 452 receives a command signal from the main MCU 434.

In S204, the motor MCU 452 specifies a target steering angle δ of the steering unit 10 based on the command signal received from the main MCU 434.

In S206, the motor MCU 452 specifies a current steering angle γ of the steering unit 10 based on the detection signal received from the steering angle sensor 166.

In S208, the motor MCU 452 determines whether the target steering angle δ specified in S204 matches the current steering angle γ specified in S206. In a case where the target steering angle δ does not match the current steering angle γ (if NO), the process proceeds to S210.

In S210, the motor MCU 452 specifics a target rotation speed PR1 of the steering motor 176 based on a difference between the target steering angle δ specified in S204 and the current steering angle γ specified in S206.

In S212, the motor MCU 452 drives the steering motor 176 by PWM control using the motor driver 462 so that the steering motor 176 rotates at the target rotation speed PR1 specified in S210. After S212, the process proceeds to S216.

In a case where the target steering angle δ matches the current steering angle γ (if YES) in S208, the process proceeds to S214. In S214, the motor MCU 452 applies short brake on the steering motor 176 using the motor driver 462. After S214, the process proceeds to S216.

In S216, the motor MCU 452 sends the state signal to the main MCU 434. After S216, the process returns to S202.

VARIANTS

In the above embodiment, the right front wheel motor 232, the left front wheel motor 242, the right rear wheel motor 486, and the left rear wheel motor 492 may be in-wheel motors (not shown) that are respectively incorporated in the right front wheel 192, the left front wheel 212, the right rear wheel 252, and the left rear wheel 272.

In the above embodiment, the steering motor 176, the right front wheel motor 232, the left front wheel motor 242, the right rear wheel motor 486, and the left rear wheel motor 492 may be outer rotor brushless DC motors, may be brushed DC motors, may be AC motors, or may be other types of motors.

In the above embodiment, the motor MCUs 444, 446, 448, 450, 452 may detect the rotation speeds of the right front wheel motor 232, the left front wheel motor 242, the right rear wheel motor 486, the left rear wheel motor 492, and the steering motor 176 by using circuits configured to detect inductive voltages in the right front wheel motor 232, the left front wheel motor 242, the right rear wheel motor 486, the left rear wheel motor 492, and the steering motor 176 instead of the Hall sensors 482, 484, 488, 494, 480.

In the above embodiment, the cart 2 may be configured to move by using continuous track units (crawler units) each including driving wheel(s) and driven wheel(s) arranged along a front-rear direction, a belt strapped on the driving wheel(s) and the driven wheel(s), and motor(s) for rotating the driving wheel(s) instead of the front wheel unit 12 and the rear wheel unit 14.

In the above embodiment, the steering unit 10 may cause the steering shaft 168 to pivot using a different type of actuator rather than the steering motor 176.

In the above embodiment, the bumper unit 16 is arranged at a front portion of the cart 2, and the collision detection switches 530, 532 thereby detect frontal collision to the cart 2. Unlike this configuration, the bumper unit 16 may be arranged at a rear portion of the cart 2, and the collision detection switches 530, 532 may thereby detect rear-end collision to the cart 2. Alternatively, two bumper units 16 may be arranged at the front and rear portions of the cart 2, and the collision detection switches 530, 532 in each of the bumper units 16 may detect their corresponding one of the frontal or rear-end collisions to the cart 2. In a case where the bumper unit 16 is arranged at a rear portion of the cart 2 and the collision detection switches 530, 532 are to detect the rear-end collision to the cart 2, the processes executed in connection thereto may proceed to S50 in a case where the forward motion is selected (if YES) in S46 of FIG. 36, may proceed to S48 in a case where the backward motion is selected (if NO) in S46, may proceed to S66 in a case where the collision detection flag is 0 (if YES) in S48, and may proceed to S62 in a case where the collision detection flag is 1 (if NO) in S48.

In the above embodiment, the handle unit 8 may include a cover member (not shown) configured to cover the movable cam member 90, the fixed cam member 92, the coil spring 94, and a part of the handle shaft 84. In this case the fixing member 82 may constitute a part of the cover member.

In the above embodiment, the handle unit 8 may include another type of elastic member instead of the coil spring 94. Further, the handle unit 8 may include a damper (not shown) configured to apply a damping force to pivoting of the handle shaft 84.

In the above embodiment, the case in which the overload detection sensors 320*a*, 320*b*, 320*c*, 320*d*, 380 are photo interrupters has been explained, however, the overload detection sensors 320*a*, 320*b*, 320*c*, 320*d*, 380 may be photo reflectors configured to detect presence/absence of light reflection by the detection portions 348*a*, 348*b*, 348*c*, 348*d*, 416, may be magnetic sensors configured to detect magnetism of magnets arranged in the detection portions 348*a*, 348*b*, 348*c*, 348*d*, 416, or may be other types of known contactless detection sensors. Alternatively, the overload detection sensors 320*a*, 320*b*, 320*c*, 320*d*, 380 may be contact detection sensors.

In the above embodiment, the case in which the switching elements 468*a*, 470*a*, 472*a*, 474*a* of the brake circuits 468, 470, 472, 474 are n-channel MOSFETS has been explained, however, the switching elements 468*a*, 470*a*, 472*a*, 474*a* may be p-channel MOSFETs, IGBTs, bipolar transistors, or other types of transistors. Alternatively, the switching elements 468*a*, 470*a*, 472*a*, 474*a* may be other types of electronically variable resistance elements such as thyristors. The switching elements 468*a*, 470*a*, 472*a*, 474*a* may be constituted of Si semiconductors, SiC semiconductors, GaN semiconductors, or other types of semiconductors.

As above, in one or more embodiments, the cart 2 comprises: the right front wheel 192, the left front wheel 212, the right rear wheel 252, and the left rear wheel 272 (examples of driving wheel); the right front wheel motor 232, the left front wheel motor 242, the right rear wheel motor 486, and the left rear wheel motor 492 (examples of motor) configured to rotate the right front wheel 192, the left front wheel 212, the right rear wheel 252, and the left rear wheel 272; the motor drivers 454, 456, 458, 460 (examples of motor drive circuit) configured to drive the right front wheel motor 232, the left front wheel motor 242, the right rear wheel motor 486, and the left rear wheel motor 492; the main MCU 434 and the motor MCU 444, 446, 448, or 450 (examples of control device) configured to control the right front wheel motor 232, the left front wheel motor 242, the right rear wheel motor 486, and the left rear wheel motor 492 via the motor drivers 454, 456, 458, 460 so that the travelling speed of the cart 2 becomes equal to or lower than the upper limit travelling speed; and the trigger switch 100 (example of operation member) arranged on the cart 2 and configured to receive the operation by the user. The cart 2 is configured to operate in a manual mode and an automatic mode, wherein in the manual mode, the right front wheel motor 232, the left front wheel motor 242, the right rear wheel motor 486, and the left rear wheel motor 492 are driven when the trigger switch 100 is on and the right front wheel motor 232, the left front wheel motor 242, the right rear wheel motor 486, and the left rear wheel motor 492 are stopped when the trigger switch 100 is off, and in the automatic mode, the right front wheel motor 232, the left front wheel motor 242, the right rear wheel motor 486, and the left rear wheel motor 492 are driven regardless of whether the trigger switch 100 is on or off. The upper limit travelling speed in the automatic mode (such as 3 km/h) is set lower titan the upper limit travelling speed in the manual mode (such as 5 km/h).

According to the above configuration since the upper limit travelling speed for the case where the cart 2 operates in the automatic mode is set lower than the upper limit travelling speed for the case where the cart 2 operates in the manual mode, the safety for the cart 2 in the case of operating in the automatic mode can be increased.

In one or more embodiments, the cart 2 further comprises the overload detection sensors 320*a*, 320*b*, 320*c*, 320*d* configured to detect in overload of object(s). In the automatic mode, when the overload is detected by the overload detection sensors 320*a*, 320*b*, 320*c*, 320*d*, the cart 2 is prohibited from travelling. In the manual mode, even when the overload is detected by the overload detection sensors 320*a*, 320*b*, 320*c*, 220*d*, the cart 2 is allowed to travel.

According to the above configuration, since the cart 2 is allowed to travel even when the overload is detected in the manual mode, whereas in the automatic mode, the cart 2 is prohibited from travelling when the overload is detected. Thus, the safety for the cart 2 in the case of operating in the automatic mode can be increased.

In one or more embodiments, the cart 2 further comprises the collision detection switches 530, 532 (examples of collision detection sensor) configured to detect frontal collision to the cart 2. In the automatic mode, when the frontal collision is detected by the collision detection switches 530, 532 while the cart 2 is moving backward, the cart 2 is prohibited from travelling. In the manual mode, even when the frontal collision is detected the collision detection switches 530, 532 while the cart 2 is moving backward, the cart 2 is allowed to travel.

According to the above configuration, the cart 2 is allowed to travel even when the frontal collision 10 the cart 2 is detected while the cart 2 is moving backward in the manual mode, whereas in the automatic mode, the cart 2 is prohibited from travelling when the frontal collision to the cart 2 is detected while the cart 2 is moving backward. Thus, the safety for the cart 2 in the case of operating in the automatic mode can be increased.

In one or more embodiments, the cart 2 further comprises the collision detection switches 530, 532 (examples of collision detection sensor) configured to detect rear-end collision to the cart 2. In the automatic mode, when the rear-end collision is detected by the collision detection switches 530, 532 while the cart 2 is moving forward, the cart 2 is prohibited from travelling. In the manual mode, even when the rear-end collision is detected by the collision detection switches 530, 532 while the cart 2 is moving forward, the cart 2 is allowed to travel.

According to the above configuration, the cart 2 is allowed to travel even when the rear-end collision to the cart 2 is detected while the cart 2 is moving forward in the manual mode, whereas in the automatic mode, the cart 2 is prohibited from travelling when the rear-end collision to the cart 2 is detected while the cart 2 is moving forward. Thus, the safety for the cart 2 in the case of operating in the automatic mode can be increased.

In one or more embodiments, in the automatic mode, the cart 2 is configured to execute the tracking operation and the remote control operation, wherein in the tracking operation, the cart 2 moves to track the beacon carried by the user, and in the remote control operation, the cart 2 moves according to the instruction from the remote controller operated by the user.

According to the above configuration, the safety for the cart in cases of executing the tracking operation and the remote control operation in the automatic mode can further be increased.

What is claimed is:

1. A cart comprising:
   a driving wheel;
   a motor configured to rotate the driving wheel;
   a motor drive circuit configured to drive the motor;
   a control device configured to control the motor via the motor drive circuit so that a travelling speed of the cart becomes equal to or lower than an upper limit travelling speed;
   an operation member arranged on the cart and configured to receive an operation by a user; and
   an overload detection sensor configured to detect an overload,
   wherein the cart is configured to operate in a first mode, wherein in the first mode, the motor is driven when the operation member is on, and the motor is stopped when the operation member is off,
   in the first mode, when the overload is detected by the overload detection sensor, the cart is allowed to travel at a state where the upper limit travelling speed is lowered, compared to a case where the overload is not detected,
   the cart is configured to operate in a second mode, wherein in the second mode, the motor is driven regardless of whether the operation member is on or off,
   the upper limit travelling speed in the second mode is set lower than the upper limit travelling speed in the first mode, and
   in the second mode, when the overload is detected by the overload detection sensor, the cart is prohibited from travelling.

2. The cart according to claim 1, further comprising a collision detection sensor configured to detect frontal collision to the cart,
   wherein
   in the second mode, when the frontal collision is detected by the collision detection sensor while the cart is moving backward, the cart is prohibited from travelling, and
   in the first mode, even when the frontal collision is detected by the collision detection sensor while the cart is moving backward, the cart is allowed to travel.

3. The cart according to claim 1, further comprising a collision detection sensor configured to detect rear-end collision to the cart,
   wherein
   in the second mode, when the rear-end collision is detected by the collision detection sensor while the cart is moving forward, the cart is prohibited from travelling, and
   in the first mode, even when the rear-end collision is detected by the collision detection sensor while the cart is moving forward, the cart is allowed to travel.

4. The cart according to claim 1, wherein, in the second mode, the cart is configured to execute a tracking operation and a remote control operation, wherein
   in the tracking operation, the cart moves to track a beacon carried by the user, and
   in the remote control operation, the cart moves according to an instruction from a remote controller operated by the user.

5. The cart according to claim 1, further comprising a collision detection sensor configured to detect frontal collision to the cart,
   wherein
   in the second mode, when the frontal collision is detected by the collision detection sensor while the cart is moving backward, the cart is prohibited from travelling,
   in the first mode, even when the frontal collision is detected by the collision detection sensor while the cart is moving backward, the cart is allowed to travel,
   in the second mode, the cart is configured to execute a tracking operation and a remote control operation,
   in the tracking operation, the cart moves to track a beacon carried by the user, and
   in the remote control operation, the cart moves according to an instruction from a remote controller operated by the user.

6. The cart according to claim 1, further comprising a collision detection sensor configured to detect rear-end collision to the cart,
   wherein
   in the second mode, when the rear-end collision is detected by the collision detection sensor while the cart is moving forward, the cart is prohibited from travelling,
   in the first mode, even when the rear-end collision is detected by the collision detection sensor while the cart is moving forward, the cart is allowed to travel,
   in the second mode, the cart is configured to execute a tracking operation and a remote control operation,
   in the tracking operation, the cart moves to track a beacon carried by the user, and
   in the remote control operation, the cart moves according to an instruction from a remote controller operated by the user.

* * * * *